United States Patent
Tomizaki et al.

(10) Patent No.: US 8,575,259 B2
(45) Date of Patent: Nov. 5, 2013

(54) WATER-BASED PAINT COMPOSITIONS

(75) Inventors: Yasuhiro Tomizaki, Hiratsuka (JP);
Takuya Kawachi, Hiratsuka (JP);
Takahisa Ooya, Hiratsuka (JP)

(73) Assignee: Kansai Paint Co., Ltd., Hyogo (JP)

( * ) Notice: Subject to any disclaimer, the term of this patent is extended or adjusted under 35 U.S.C. 154(b) by 500 days.

(21) Appl. No.: 12/735,046

(22) PCT Filed: Dec. 12, 2008

(86) PCT No.: PCT/JP2008/073137
§ 371 (c)(1),
(2), (4) Date: Jun. 11, 2010

(87) PCT Pub. No.: WO2009/075389
PCT Pub. Date: Jun. 18, 2009

(65) Prior Publication Data
US 2010/0255328 A1 Oct. 7, 2010

(30) Foreign Application Priority Data

Dec. 12, 2007 (JP) ................................ 2007-321244
Dec. 28, 2007 (JP) ................................ 2007-338888

(51) Int. Cl.
*C08F 290/04* (2006.01)
*C08L 83/00* (2006.01)
*C08G 18/62* (2006.01)

(52) U.S. Cl.
USPC ........... 524/504; 524/501; 524/458; 524/577; 523/201; 523/501; 427/385.5; 525/451

(58) Field of Classification Search
USPC ................ 427/385.5; 524/458, 457, 501, 524/512–513, 504, 577; 523/201, 501; 525/451
See application file for complete search history.

(56) References Cited

U.S. PATENT DOCUMENTS

| | | | |
|---|---|---|---|
| 5,539,073 A | 7/1996 | Taylor et al. | |
| 7,838,076 B2 * | 11/2010 | Nakahara et al. | ........ 427/385.5 |
| 7,842,751 B2 * | 11/2010 | Nakane et al. | ................ 524/577 |
| 2001/0024693 A1 | 9/2001 | Morimoto et al. | |
| 2003/0211346 A1 | 11/2003 | Kausch | |
| 2004/0134791 A1 | 7/2004 | Toi et al. | |
| 2004/0228975 A1 | 11/2004 | Takesako et al. | |
| 2007/0237903 A1 | 10/2007 | Hiwara et al. | |
| 2008/0131714 A1 | 6/2008 | Toi et al. | |

FOREIGN PATENT DOCUMENTS

| | | |
|---|---|---|
| GB | 2 453 266 | 4/2009 |
| JP | 8-290102 | 11/1996 |
| JP | 2001-205175 | 7/2001 |
| JP | 2004-358462 | 12/2004 |
| WO | 2004/061025 | 7/2004 |
| WO | 2007/119762 | 10/2007 |

OTHER PUBLICATIONS

Machine Translation of JP 2004/210845.*
International Search Report issued May 7, 2009 in International (PCT) Application No. PCT/JP2008/073137.
PCT Written Opinion issued May 7, 2009 in International (PCT) Application No. PCT/JP2008/073137.

* cited by examiner

*Primary Examiner* — Hannah Pak
(74) *Attorney, Agent, or Firm* — Wenderoth, Lind & Ponack, L.L.P.

(57) ABSTRACT

The invention provides water-based paint compositions capable of forming coating film of excellent smoothness, distinctness of image, water resistance and chipping resistance, which comprise aqueous film-forming resin, curing agent and crosslinked resin particles having a core/shell type multilayer structure composed of the core part of a (co)polymer obtained by (co)polymerizing a monomer component comprising 30-100 mass % of polymerizable unsaturated monomer having $C_{4-22}$ alkyl group and 0-70 mass % of other polymerizable unsaturated monomer, and the shell part having a crosslinked structure.

12 Claims, No Drawings

WATER-BASED PAINT COMPOSITIONS

TECHNICAL FIELD

This invention relates to water-based paint compositions and coating film-forming methods using the water-based paint compositions.

BACKGROUND ART

As coating film-forming methods on car bodies, those widely in which adopted comprise forming multilayer coating film on-electrocoated and heat-cured coating object, by 3-coat-2-bake system application of intermediate paint→curing by baking→application of base coat paint→preheating (preliminary heating)→application of clear paint→curing by baking are successively conducted; or by 2-coat-2-bake system in which application of intermediate paint→curing by heating→application of top coat paint→baking by heating are successively conducted.

Generally the 3-coat-2-bake system is adopted when "metallic colored" coating film is to be formed using effect pigment-containing base coat paint, and the 2-coat-2-bake system is adopted in the occasions of "solid color" coating film such as of white, black or the like, using coloring pigment-containing top coat paint.

Whereas, for energy-saving, attempts are made in recent years to omit the bake-curing step after application of intermediate paint and adopt 3-coat-1-bake system successively conducting application of intermediate paint→preheating (preliminary heating)→application of base coat paint→preheating (preliminary heating)→application of clear paint→curing by baking; or 2-coat-1-bake system successively conducting application of intermediate paint→preheating (preliminary heating)→application of top coat paint→curing by baking. In particular, from the viewpoint of reducing environmental pollution by volatilization of organic solvent, 3-coat-1-bake system and 2-coat-1-bake system using water-based paints as the intermediate paint, base coat paint and top coat paint are in demand.

However, in such 3-coat-1-bake system using water-based intermediate paint and water-based base coat paint or 2-coat-1-bake system using water-based intermediate paint and water-based top coat paint, decrease in water resistance of the formed coating film due to the use of water-soluble or water-dispersible resins or deterioration in smoothness and distinctness of image of the formed coating film due to layer-mixing at the interface between the water-based intermediate paint and water-based base coat paint or that between the water-based intermediate paint and water-based top coat paint are liable to take place, which has been the problem requiring solution.

For instance, JP Hei 8 (1996)-290102A discloses that finished appearance such as gloss or distinctness of image is not impaired in the method using thermosetting water-based intermediate paint (A), thermosetting water-based base coat (B) and thermosetting clear coat paint (C), which comprises wet-on-wet system coating of the water-based intermediate paint (A) and water-based base coat (B), when the neutralization value of the base resin of the water-based intermediate paint (A) is made 10-40 mgKOH/g and that of the base resin of the water-based base coat paint (B) is made greater than the water-based paint (A) by 10-20. The multilayer coating film obtained by the coating method, however, occasionally has insufficient smoothness and water resistance.

JP 2001-205175A discloses that imbibing or inversion at the interface of coating film layers can be controlled to form laminated coating film of excellent appearance can be formed by a coating film-forming method comprising successively forming on an electrocoated substrate an intermediate coating film of a water-based intermediate paint, metallic base coating film of a water-based metallic base paint and clear coating film of a clear paint, in which the water-based intermediate paint contains aqueous dispersion of amido group-containing acrylic resin particles of a size ranging 0.01-1.0 μm, which is obtained by emulsion polymerization of amido group-containing ethylenically unsaturated monomer and other ethylenically unsaturated monomer. The multilayer film obtained by the coating film-forming method, however, occasionally has insufficient smoothness.

JP 2004-358462A discloses a process comprising (1) a step for providing electrocoated object; (2) a step for applying a water-based intermediate paint to form an intermediate coating film; (3) a step for applying on the intermediate coating film without curing the same, successively a water-based base paint and clear paint wet-on-wet, to form a base coating film and clear coating film; and (4) simultaneous baking and curing the intermediate coating film, base coating film and clear coating film, in which layer mixing between the intermediate coating film and the base coating film is effectively prevented and multilayer coating film excelling in surface smoothness can be formed when the water-based intermediate paint contains specific acrylic resin emulsion and urethane resin emulsion and the intermediate coating film formed of the intermediate paint has specific water absorption and water elution. Also the multilayer coating film obtained according to the multilayer coating film-forming process, however, there are occasions failing to produce satisfactory smoothness or distinctness of image.

International Publication WO2004/061025 Pamphlet discloses use as the intermediate paint in 3-coat-1-bake system a water-based intermediate paint composition comprising a copolymer resin emulsion and curing agent, the copolymer resin emulsion being obtained by emulsion polymerization of monomer (a) comprising at least one monomer selected from alkyl (meth)acrylates and, where necessary, at least one monomer selected from the group consisting of styrene monomer, (meth)acrylonitrile and (meth)acrylamide, acid group-containing polymerizable unsaturated monomer (b), hydroxyl group-containing polymerizable unsaturated monomer (c) and crosslinkable monomer (d), said resin having a glass transition point of −50° C.-20° C., an acid value of 2-60 mgKOH/g and hydroxyl value of 10-120 mgKOH/g. The Pamphlet status whereby curing reactability of the copolymer resin emulsion with the curing agent is raised to enable formation of multilayer coating film exhibiting good chipping resistance and water resistance and favorable finished appearance. However, there are occasions that sufficient smoothness or distinctness of image are not achieved even by the multilayer coating film obtained by this multilayer coating film-forming method.

DISCLOSURE OF THE INVENTION

An object of the present invention is to provide water-based paint compositions and coating film-forming method, which can form coating film excelling in smoothness, distinctness of image, water resistance and chipping resistance.

Another object of the present invention is to provide water-based paint compositions and coating film-forming method for forming multilayer coating film excelling in smoothness, distinctness of image, water resistance and chipping resistance when the multilayer film is formed by recoating water-based paints, by suppressing layer-mixing between the water-based paints.

As a result of concentrative studies, we have now discovered that water-based paint compositions containing specific crosslinked resin particles enable to accomplish the above objects, and come to complete the present invention.

Thus, the present invention provides a water-based paint compositions characterized by comprising (A) aqueous film-forming resin, (B) curing agent, and (C) crosslinked resin particles having a core/shell type multilayered structure composed of a core part of (co)polymer (I) obtained by (co)polymerizing monomer component comprising 30-100 mass % of polymerizable unsaturated monomer (c-1) having $C_{4-22}$ alkyl group and 0-70 mass % of other polymerizable unsaturated monomer (c-2) and a shell part having a crosslinked structure.

The invention furthermore provides a multilayer coating film-forming method which comprises (1) a step for applying the above water-based paint composition onto a coating object to form an intermediate coating film, (2) a step for applying onto the formed uncured intermediate coating film a water-based top coat paint to form a top coating film, and (3) a step of simultaneously heat-curing the uncured intermediate coating film and uncured top coating film.

The present invention furthermore provides a multilayer coating film-forming method which comprises (1) a step for applying the above water-based paint composition onto a coating object to form an intermediate coating film, (2) a step for applying onto the formed uncured intermediate coating film a water-based base coat paint composition to form a base coating film, (3) a step for applying onto the formed uncured base coat coating film a clear paint composition to form a clear coating film, and (4) a step of simultaneously heat-curing the uncured intermediate coating film, uncured base coating film and uncured clear coating film.

Using the water-based paint composition of the present invention, multilayer coating film excelling in smoothness, distinctness of image, water resistance and chipping resistance can be formed. Also according to the coating film-forming method of the present invention, multilayer coating film excelling in smoothness, distinctness of image, water resistance and chipping resistance can be formed, when multilayer coating film is formed by recoating of water-based paints.

The reason why the use of the water-based paint composition of the invention enables to form coating film excelling in smoothness, distinctness of image, water resistance and chipping resistance is not fully clear, but it is inferred that the crosslinked resin particles (C) in the water-based paint composition of the invention have at their core parts relatively long chain alkyl groups which lead to formation of coating film having adequate hydrophobic property to suppress layer-mixing between two coating films when a water-based paint is applied onto the coating film, improving distinctness of image. Furthermore, because the crosslinked particles (C) have a crosslinked structure at their shell parts, the shape of the resin particles can be stably maintained in relatively uniform composition, which improves the smoothness, and because the alkyl groups prevent infiltration of water into the formed multilayer coating film, water resistance of the film is improved. Again because the crosslinked resin particles (C) have relatively long chain alkyl groups at their core parts, they exhibit adequate flexibility to absorb the impact incurred on the formed coating film, to contribute to improve the film's chipping resistance.

Modes of Working the Invention

Hereinafter the water-based paint compositions and coating film-forming method of the present invention are explained in further details.

Aqueous Film-forming Resin (A)

As the aqueous film-forming resin (A) in the water-based paint compositions of the present invention, those per se known water-soluble or water-dispersible film-forming resins heretofore used for water-based paint can be similarly used. As the resin species, for example, acrylic resin, polyester resin, alkyd resin and polyurethane resin can be named. The aqueous film-forming resin (A) preferably contains crosslinkable functional groups such as hydroxyl, carboxyl, epoxy and the like groups.

As the aqueous film-forming resin (A), hydroxyl-containing polyester resin (A1) and/or hydroxyl-containing acrylic resin (A2) is preferred, in particular, hydroxyl-containing polyester resin (A1) is preferred.

For improving smoothness and distinctness of image of the coating film, concurrent use of hydroxyl-containing polyester resin (A1) and hydroxyl-containing acrylic resin (A2) is more advantageous. When used concurrently, the use ratio of the two resins based on the combined amount of the hydroxyl-containing polyester resin (A1) and hydroxyl-containing acrylic resin (A2), preferably the former is generally within a range of 10-90 mass %, in particular, 20-80 mass %, inter alia, 25-75 mass %; and the latter, generally within a range of 90-10 mass %, in particular, 80-20 mass %, inter alia, 75-25 mass %, Where the aqueous film-forming resin (A) contains hydroxyl group, it preferably has a hydroxyl value within a range of generally 1-300 mgKOH/g, in particular, 2-250 mgKOH/g, inter alia, 5-180 mgKOH/g. Where the aqueous film-forming resin (A) contains acid groups such as carboxyl group, it preferably has an acid value within a range of generally 1-200 mgKOH/g, in particular, 2-150 mgKOH/g, inter alia, 5-80 mgKOH/g.

Hydroxyl-containing Polyester Resin (A1)

By the use of hydroxyl-containing polyester resin (A1) as the hydroxyl-containing resin (A) in the water-based paint composition of the present invention, smoothness of the resulting coating film can be improved.

Hydroxyl-containing polyester resin (A1) can be usually prepared by esterification reaction or ester-interchange reaction of acid component with alcohol component.

As the acid component, those compounds customarily used as acid component in production of polyester resins can be similarly used, examples of which include aliphatic polybasic acid, alicyclic polybasic acid and aromatic polybasic acid.

The aliphatic polybasic acid encompasses aliphatic compounds having at least two carboxyl groups per molecule, acid anhydrides of the aliphatic compounds and esters of the aliphatic compounds, for example, aliphatic polyvalent carboxylic acids such as succinic acid, glutaric acid, adipic acid, pimelic acid, suberic acid, azelaic acid, sebacic acid, undecanedioic acid, dodecanedioic acid, brassylic acid, octadecanedioic acid and cytric acid; anhydrides of those aliphatic polyvalent carboxylic acids; and lower alkyl esters of those aliphatic polyvalent carboxylic acids, the lower alkyl containing around 1-4 carbon atoms. Those aliphatic polybasic acids can be used either alone or in combination of two or more.

From the viewpoint of smoothness of resulting coating film, use of adipic acid and/or adipic anhydride as the aliphatic polybasic acid is particularly preferred.

The alicyclic polybasic acid encompasses compounds having at least one alicyclic structure which can be mainly 4- to 6-membered ring structure, and at least two carboxyl groups per molecule, acid anhydrides of the compounds and esters of the compounds, for example alicyclic polyvalent carboxylic acids such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexane-dicarboxylic acid, 4-methyl-1,2-cyclo-hexanedicarboxylic acid, 1,2,4-cyclohexanetricarboxylic acid and 1,3,5-cyclohexanetricarboxylic acid; anhydrides of the alicyclic polyvalent carboxylic acids; and lower alkyl esters of the alicyclic polyvalent carboxylic acids, the lower alkyl containing around 1-4 carbon atoms. Those alicyclic polybasic acids can be used either alone or in combination of two or more.

As the alicyclic polybasic acid, use of 1,2-cyclohexanedicarboxylic acid, 1,2-cyclohexanedicarboxylic anhydride, 1,3-cyclohexanedicarboxylic acid, 1,4-cyclohexanedicarboxylic acid, 4-cyclohexene-1,2-dicarboxylic acid or 4-cyclohexene-1,2-dicarboxylic anhydride is preferred from the viewpoint of smoothness of resulting coating film. Of these, it is particularly preferred to use 1,2-cyclohexanedicarboxylic acid and/or 1,2-cyclohexanedicarboxylic anhydride.

The aromatic polybasic acid include aromatic compounds having at least two carboxyl groups per molecule, acid anhydrides of the aromatic compounds and esters of the aromatic compounds, for example, aromatic polyvalent carboxylic acids such as phthalic acid, isophthalic acid, terephthalic acid, naphthalenedicarboxylic acid, 4,4'-biphenyldicarboxylic acid, trimellitic acid and pyromellitic acid; anhydrides of those aromatic polyvalent carboxylic acids; and lower alkyl esters of those aromatic polyvalent carboxylic acids, the lower alkyl containing around 1-4 carbon atoms. Above aromatic polybasic acids can be used either alone or in combination of two or more.

As the aromatic polybasic acid, use of phthalic acid, phthalic anhydride, isophthalic acid, trimellitic acid or trimellitic anhydride is preferred.

Acid components other than the above aliphatic polybasic acid, alicyclic polybasic acid and aromatic polybasic acid can also be used. Such acid components are not particularly limited. For example, fatty acids such as coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid and safflower oil fatty acid; monocarboxylic acids such as lauric acid, myristic acid, palmitic acid, stearic acid, oleic acid, linoleic acid, linolenic acid, benzoic acid, p-tert-butylbenzoic acid, cyclohexanoic acid and 10-phenyloctadecanoic acid; and hydroxycarboxylic acids such as lactic acid, 3-hydroxybutanoic acid and 3-hydroxy-4-ethoxybenzoic acid can be named. These acid components can be used either alone or in combination of two or more.

As the alcohol component, polyhydric alcohol having at least two hydroxyl groups per molecule can be conveniently used, examples of which include dihydric alcohols such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 2-butyl-2-ethyl-1,3-propanediol, 1,2-pentanediol, 1,5-pentanediol, 1,4-pentanediol, 2,4-pentanediol, 2,3-dimethyltrimethylene glycol, tetramethylene glycol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, neopentyl glycol, 1,4-cyclohexanedimethanol, tricyclodecanedimethanol, hydrogenated bisphenol A, hydrogenated bisphenol F and dimethylolpropionic acid; polylactonediols formed by adding lactones such as ε-caprolactone to these dihydric alcohols; ester diols such as bis (hydroxyethyl)terephthalate; polyether diols such as alkylene oxide adduct of bisphenol A, polyethylene glycol, polypropylene glycol and polybutylene glycol; tri- or higher-hydric alcohols such as glycerin, trimethylolethane, trimethylolpropane, diglycerin, triglycerin, 1,2,6-hexanetriol, pentaerythritol, dipentaerythritol, tris(2-hydroxyethyl)isocyanuric acid, sorbitol and mannitol; and polylactonepolyols formed by adding lactones such as ε-caprolactone to these tri- or higher-hydric alcohols.

Alcohol component other than the above polyhydric alcohols can also be used without particular limitation, which include, for example, monoalcohols such as methanol, ethanol, propyl alcohol, butyl alcohol, stearyl alcohol and 2-phenoxyethanol; and alcoholic compounds obtained by reaction of monoepoxy compounds such as propylene oxide, butylene oxide, CARDURA E10 (tradename, HEXION Specialty Chemicals Co., a glycidyl ester of synthetic highly branched saturated fatty acid) with acids.

Production method of hydroxyl-containing polyester resin (A1) is not critical, but conventional methods can be used. For example, a hydroxyl-containing polyester resin can be prepared heating the above-described acid component and alcohol component in gaseous nitrogen current, at temperatures ranging about 150-250° C. for about 5-10 hours to carry out an esterification reaction or ester-interchange reaction of the acid component with the alcohol component.

In the occasion of the esterification or ester-interchange reaction of the acid component with the alcohol component, they may be added to the reactor all at once, or either one or both components may be added as divided portions plural times. After synthesizing a hydroxyl-containing polyester resin first, the resulting hydroxyl-containing polyester resin may be reacted with an acid anhydride to be half-esterified, whereby forming a carboxyl- and hydroxyl-containing polyester resin. Again, a carboxyl-containing polyester resin may be synthesized first, to which then above alcohol component is added to provide a hydroxyl-containing polyester resin.

In the occasion of the esterification or ester-interchange reaction, per se known catalyst such as dibutyltin oxide, antimony trioxide, zinc acetate, manganese acetate, cobalt acetate, calcium acetate, lead acetate, tetrabutyl titanate, tetraisopropyl titanate and the like may be used as a catalyst for promoting the reaction.

The hydroxyl-containing polyester resin (A1) may also be modified, either during or after preparation of the resin, with fatty acid, monoepoxy compound, polyisocyanate compound or the like.

As the fatty acid, for example, coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rape seed oil fatty acid, castor oil fatty acid, dehydrated castor oil fatty acid and safflower oil fatty acid can be named; and as the monoepoxy compound, for example, CARDURA E10 (tradename, HEXION Specialty Chemicals Co., a glycidyl ester of synthetic highly branched saturated fatty acid) can be favorably used.

As the polyisocyanate compound, for example, aliphatic diisocyanates such as lysine diisocyanate, hexamethylene diisocyanate and trimethylhexane diisocyanate; alicyclic diisocyanates such as hydrogenated xylylene diisocyanate, isophorone diisocyanate, methylcyclohexane-2,4-diisocyanate, methylcyclohexane-2,6-diisocyanate, 4,4'-methylenebis-(cyclohexylisocyanate) and 1,3-(isocyanatomethyl) cyclohexane; aromatic diisocyanates such as tolylene diisocyanate, xylylene diisocyanate and diphenylmethane diisocyanate; organic polyisocyanates themselves such as tri- or higher-valent polyisocyanates like lysine triisocyanate; adducts of each of these organic polyisocyanates with polyhydric alcohol, low molecular weight polyester resin, water or the like; or mutually cyclized polymers of these organic polyisocyanates (e.g., isocyanurates) and biuret type adducts can be named. These polyisocyanate compounds can be used either alone or in combination of two or more.

In the hydroxyl-containing polyester resin (A1), preferably the combined content of aliphatic polybasic acid and alicyclic polybasic acid in the starting acid component lies within a range of generally 30-100 mol %, in particular, 40-97 mol %, inter alia, 50-80 mol %, based on the total amount of the acid component, from the viewpoint of excellent water resistance and chipping resistance of resulting coating film. Particularly for chipping resistance of the coating film, it is preferred that the aliphatic polybasic acid is adipic acid and/or adipic anhydride, and the alicyclic polybasic acid is 1,2-cyclohexanedicarboxylic acid and/or 1,2-cyclohexanedicarboxylic anhydride.

The hydroxyl-containing polyester resin (A1) can have a hydroxyl value within a range of generally 10-300 mgKOH/g, in particular, 50-250 mgKOH/g, inter alia, 80-180 mgKOH/g. Where the hydroxyl-containing polyester resin (A1) has also carboxyl groups, it can have an acid value within a range of generally 1-200 mgKOH/g, in particular, 15-100 mgKOH/g, inter alia, 20-60 mgKOH/g. Furthermore, the hydroxyl-containing polyester resin (A1) can have a number-average molecular weight within a range of generally 500-50,000, in particular, 1,000-30,000, inter alia, 1,200-10,000.

In the present specification, "number-average molecular weight" and "weight-average molecular weight" are the values obtained by converting the number-average molecular weight or weight-average molecular weight as measured with gel permeation chromatograph (GPC), using the molecular weight of standard polystyrene as the basis.

Hydroxyl-containing Acrylic Resin (A2)

Hydroxyl-containing acrylic resin (A2) can be normally prepared by copolymerizing hydroxyl-containing polymerizable unsaturated monomer with other polymerizable unsaturated monomer(s) which are copolymerizable with the hydroxyl-containing polymerizable unsaturated monomer by the means known per se, for example, solution polymerization method in organic solvent, emulsion polymerization method in water, or the like.

Hydroxyl-containing polymerizable unsaturated monomer is a compound having at least one each of hydroxyl group and polymerizable unsaturated bond per molecule, examples of which include monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate; ε-caprolatone modification products of such monoesters of (meth)acrylic acid with $C_{2-8}$ dihydric alcohols; N-hydroxymethyl (meth)acrylamide; allyl alcohol; and (meth)acrylates having hydroxyl-terminated polyoxyethylene chain.

In the present specification, "(meth)acrylate" means acrylate or methacrylate, "(meth)acrylic acid" means acrylic acid or methacrylic acid, "(meth)acryloyl" means acryloyl or methacryloyl, and "(meth)acrylamide" means acrylamide or methacrylamide.

The other polymerizable unsaturated monomers which are copolymerizable with the hydroxyl-containing polymerizable unsaturated monomer can be suitably selected and used according to characteristic properties desired for the hydroxyl-containing acrylic resin (A2). Specific examples of such monomers are enumerated in the following, which can be used each alone or in combination of two or more:

(i) alkyl or cycloalkyl (meth)acrylates: for example, methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate and tricyclodecanyl (meth)acrylate and the like;

(ii) polymerizable unsaturated monomers having isobornyl group: for example, isobornyl (meth)acrylate and the like;

(iii) polymerizable unsaturated monomers having adamantyl group: for example, adamantyl (meth)acrylate and the like;

(iv) polymerizable unsaturated monomers having tricyclodecenyl group: for example, tricyclodecenyl (meth)acrylate and the like;

(v) aromatic ring-containing polymerizable unsaturated monomers: for example, benzyl (meth)acrylate, styrene, α-methylstyrene, vinyltoluene and the like;

(vi) polymerizable unsaturated monomers having alkoxysilyl group: for example, vinyltrimethoxysilane, vinyltriethoxysilane, vinyltris(2-methoxyethoxy)silane, γ-(meth)acryloyloxypropyl-trimethoxysilane, γ-(meth)acryloyloxypropyltriethoxysilane and the like;

(vii) polymerizable unsaturated monomer having fluorinated alkyl group: for example, perfluoroalkyl (meth)acrylates such as perfluorobutylethyl (meth)acrylate, perfluorooctylethyl (meth)acrylate; fluoroolefin, and the like;

(viii) polymerizable unsaturated monomers having photopolymerizable functional group like maleimide group;

(ix) vinyl compounds: for example, N-vinylpyrrolidone, ethylene, butadiene, chloroprene, vinyl propionate, vinyl acetate and the like;

(x) phosphoric acid group-containing polymerizable unsaturated monomers: for example, 2-acryloyloxyethyl acid phosphate, 2-methacryloyloxyethyl acid phosphate, 2-acryloyloxypropyl acid phosphate, 2-methacryloyloxypropyl acid phosphate and the like;

(xi) carboxyl-containing polymerizable unsaturated monomers: for example, (meth)acrylic acid, maleic acid, crotonic acid, β-carboxyethyl acrylate and the like;

(xii) nitrogen-containing polymerizable unsaturated monomers: for example, (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, methylenebis(meth)acrylamide, ethylenebis(meth)acrylamide, 2-(methacryloyloxy)ethyltrimethyl ammonium chloride, addition products of glycidyl (meth)acrylate with amines and the like;

(xiii) polymerizable unsaturated monomers having at least two polymerizable unsaturated groups per molecule: for example, allyl (meth)acrylate, 1,6-hexanediol di(meth)acrylate and the like;

(xiv) epoxy-containing polymerizable unsaturated monomers: for example, glycidyl (meth)acrylate, β-methylglycidyl (meth)acrylate, 3,4-epoxycyclohexylmethyl (meth)

acrylate, 3,4-epoxycyclohexylethyl (meth)acrylate, 3,4-epoxycyclohexylpropyl (meth)acrylate, allyl glycidyl ether and the like;

(xv) (meth)acrylates having alkoxy-terminated polyoxyethylene chain;

(xvi) sulfonic acid group-containing polymerizable unsaturated monomers: for example, 2-acrylamido-2-methylpropane-sulfonic acid, 2-sulfoethyl (meth)acrylate, allylsulfonic acid, 4-styrenesulfonic acid; and sodium salts or ammonium salts of these acids;

(xvii) polymerizable unsaturated monomers having UV absorbing functional group: for example, 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)-benzophenone, 2,2'-dihydroxy-4-(3-acryloyloxy-2-hydroxypropoxy)-benzophenone, 2-(2'-hydroxy-5'-methacryloyloxyethylphenyl)-2H-benzotriazole and the like;

(xviii) photostable polymerizable unsaturated monomers: for example, 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethyl-piperidine, 1-(meth)acryloyl-4-cyano-4-(meth)acryloylamino-2,2,6,6-tetramethylpiperidine, 4-crotonoyloxy-2,2,6,6-tetramethyl-piperidine, 4-crotonoylamino-2,2,6,6-tetramethylpiperidine, 1-crotonoyl-4-crotonoyloxy-2,2,6,6-tetramethylpiperidine and the like;

(xix) carbonyl group-containing polymerizable unsaturated monomers: for example, acrolein, diacetonacrylamide, diacetonmethacrylamide, acetoacetoxyethyl methacrylate, formylstyrol, $C_{4-7}$ vinyl alkyl ketones (e.g., vinyl methyl ketone, vinyl ethyl ketone, vinyl butyl ketone) and the like.

It is permissible for the hydroxyl-containing acrylic resin (A2) to be concurrently used, as a part thereof, with "urethane-modified acrylic resin" which is formed by extending polyisocyanate compound at a part of hydroxyl groups in the resin by urethanation reaction to give the resin higher molecular weight.

The hydroxyl-containing acrylic resin (A2) preferably has a hydroxyl value within a range of generally 1-200 mgKOH/g, in particular, 2-100 mgKOH/g, inter alia, 5-60 mgKOH/g, from the viewpoint of storage stability and water resistance of resulting coating film. The hydroxyl-containing acrylic resin (A2) preferably has an acid value within a range of generally 1-200 mgKOH/g, in particular, 2-150 mgKOH/g, inter alia, 5-80 mgKOH/g, from the viewpoint of water resistance of resulting coating film.

The hydroxyl-containing acrylic resin (A2) furthermore preferably has a weight-average molecular weight within a range of generally 2,000-5,000,000, in particular, 10,000-3,500,000, inter alia, 100,000-2,000,000, from the viewpoint of appearance, water resistance and the like of resulting coating film.

As the polyurethane resin, for example, one which is prepared by the steps of making a urethane prepolymer by reaction of aliphatic and/or alicyclic diisocyanates; at least one diol selected from polyetherdiol, polyesterdiol and polycarbonatediol; low molecular weight polyhydroxy compound; and dimethanolalkanoic acid; neutralizing the prepolymer with tertiary amine and emulsion-dispersing it in water; and, where necessary, mixing the emulsion-dispersion with an aqueous medium containing chain extending agent such as polyamine, crosslinking agent and/or suspending agent and carrying out the reaction until isocyanate groups substantially disappear. According to the above method, normally a self-emulsifying type polyurethane resin having an average particle size ranging from about 0.001-about 3 µm can be obtained. As examples of such polyurethane resin which are commercially available, U-COAT UX-5000 and U-COAT UX-8100 (tradenames, Sanyo Chemical Industries, Ltd.) can be named.

Curing Agent (B)

The curing agent (B) used in the water-based paint compositions of the present invention is a compound which can react with the crosslinkable functional groups in the aqueous film-forming resin (A) such as hydroxyl, carboxyl, epoxy and the like, to cure the composition of the invention. As the curing agent (B), for example, amino resin, polyisocyanate compound, blocked polyisocyanate compound, epoxy-containing compound, carboxyl-containing compound, carbodiimido group-containing compound and the like can be named. Of these, amino resin, polyisocyanate compound and blocked polyisocyanate compound which are reactable with hydroxyl group; and carbodiimido group-containing compound reactable with carboxyl group are preferred. From the viewpoint of storage stability of the paint, amino resin is particularly preferred. The curing agents (B) can be used each alone or in combination of two or more.

As the amino resin, partially methylolated amino resin or wholly methylolated amino resin obtained through a reaction of amino component with aldehyde component can be used. Examples of the amino component include melamine, urea, benzoguanamine, acetoguanamine, steroguanamine, spiroguanamine, dicyandiamide; and also as the aldehyde component, for example, formaldehyde, paraformaldehyde, acetaldehyde, benzaldehyde and the like can be named.

As the amino resin, those formed by partially or wholly etherifying those methylol groups in the methylolated amino resins with suitable alcohol. As the alcohol to be used for the etherification, for example, methyl alcohol, ethyl alcohol, n-propyl alcohol, i-propyl alcohol, n-butyl alcohol, i-butyl alcohol, 2-ethyl-1-butanol, 2-ethyl-1-hexanol and the like can be named.

As the amino resin, melamine resin is preferred. In particular, methyl-etherified melamine resin formed by partially or wholly etherifying methylol groups in partially or wholly methylolated melamine resin with methyl alcohol; butyl-etherified melamine resin formed by partially or wholly etherifying methylol groups in partially or wholly methylolated melamine resin with butyl alcohol; and methyl-butyl mixed-etherified melamine resin formed by partially or wholly etherifying methylol groups in partially or wholly methylolated melamine resin with methyl alcohol and butyl alcohol; are preferred. In particular, methyl-butyl mixed-etherified melamine resin is preferred.

It is particularly advantageous to use, as the aqueous film-forming resin (A), hydroxyl-containing polyester resin (A1') in which the combined content of the aliphatic polybasic acid and alicyclic polybasic acid in the starting acid component is 30-97 mol % and the content of the aromatic polybasic acid is 3-70 mol %, based on the total amount of the acid component; and to use as the curing agent (B) at least one of alkyl-etherified melamine resin among the methyl-etherified melamine resin, butyl-etherified melamine resin and methyl-butyl mixed-etherified melamine resin; for obtaining multi-layer coating film of excellent distinctness of image and water resistance.

The melamine resin also preferably has a weight-average molecular weight within a range of 400-6,000, in particular, 500-4,000, inter alia, 600-3,000.

Commercially available melamine resins are also useful, examples of which include CYMEL 202, CYMEL 203, CYMEL 204, CYMEL 211, CYMEL 238, CYMEL 251, CYMEL 303, CYMEL 323, CYMEL 324, CYMEL 325, CYMEL 327, CYMEL 350, CYMEL 385, CYMEL 1156, CYMEL 1158, and CYMEL 1116 (Nippon Cytec Industries, Inc.); U-VAN 120, U-VAN 20HS, U-VAN 20SE60, U-VAN 2021, U-VAN 2028, and U-VAN 28-60 (Mitsui Chemicals, Inc.).

When melamine resin is used as the curing agent (B), sulfonic acids such as paratoluenesulfonic acid, dodecylbenzenesulfonic acid and dinonylnaphthalenesulfonic acid; and salts of such sulfonic acids with amine compounds can be used as the catalyst.

The polyisocyanate compounds are those compounds which contain at least two isocyanate groups per molecule, for example, aliphatic polyisocyanate, alicyclic polyisocyanate, aromatic-aliphatic polyisocyanate, aromatic polyisocyanate and derivatives of these polyisocyanates.

Examples of the aliphatic polyisocyanate include aliphatic diisocyanates such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, dimeric acid diisocyanate, methyl 2,6-diisocyanatohexanoate (common name: lysine diisocyanate) and the like; and aliphatic triisocyanates such as 2-isocyanatoethyl 2,6-diisocyanatohexanoate, 1,6-diisocyanato-3-isocyanatomethylhexane, 1,4,8-triisocyanatooctane, 1,6,11-triisocyanatoundecane, 1,8-diisocyanato-4-isocyanato-1,3,6-triisocyanatohexane, 2,5,7-trimethyl-1,8-diisocyanato-5-isocyanatomethyloctane and the like.

Examples of the alicyclic polyisocyanate include alicyclic diisocyanates such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), methyl-2,4-cyclohexane diisocyanate, methyl-2,6-cyclohexane diisocyanate, 1,3- or 1,4-bis(isocyanato-methyl)cyclohexane (common name: hydrogenated xylylene diisocyanate) or mixtures thereof, norbornane diisocyanate and the like; and alicyclic triisocyanates such as 1,3,5-triisocyanatocyclo-hexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1)heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1)heptane, 5-(2-isocyanatoethyl)-2-isocyanatomethyl-2-(3-isocyanatopropyl)-bicyclo(2.2.1)heptane, 6-(2-isocyanatoethyl)-2-isocyanatomethyl-2-(3-isocyanatopropyl)-bicyclo(2.2.1)heptane and the like.

Examples of the aromatic-aliphatic polyisocyanate include aromatic-aliphatic diisocyanates such as 1,3- or 1,4-xylylene diisocyanate or mixtures thereof, ω,ω'-diisocyanato-1,4-diethylbenzene, 1,3- or 1,4-bis(1-isocyanato-1-methylethyl)benzene (common name: tetramethylxylylene diisocyanate) or mixtures thereof; and aromatic-aliphatic triisocyanates such as 1,3,5-triisocyanatomethylbenzene and the like.

Examples of the aromatic polyisocyanate include aromatic diisocyanates such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, 4,4'-diphenylether diisocyanate and the like; aromatic triisocyanates such as triphenylmethane-4,4',4''-triisocyanate, 1,3,5-triisocyanatobenzene, 2,4,6-triisocyanatotoluene and the like; and aromatic tetraisocyanates such as 4,4'-diphenylmethane-2,2',5,5'-tetraisocyanate and the like.

Also as the polyisocyanate derivatives, for example, dimers, trimers, biurets, allophanates, urethodiones, urethoimines, isocyanurates, oxadiazintrione, polymethylene polyphenyl polyisocyanate (crude MDI, polymeric MDI), crude TDI and the like of above polyisocyanate compounds can be named.

Above polyisocyanates and derivatives thereof can be used either alone or in combination of two or more. It is preferable to use, either singly or in combination of two or more, aliphatic diisocyanates, alicyclic diisocyanates and their derivatives, among these polyisocyanates.

It is also possible to use, as the polyisocyanate compound, prepolymers formed by urethanation reaction of above polyisocyanates or derivatives thereof with polyhydric alcohol, low molecular weight polyester resin or water, under a condition that the isocyanate groups are in excess.

As the polyisocyanate compound, use of water-dispersible polyisocyanate compound is preferred from the viewpoint of smoothness of resultant coating film. While any polyisocyanate compound which can be stably dispersed in an aqueous medium can be used as the water-dispersible polyisocyanate compound without limitation, particularly such hydrophilic polyisocyanate compound which has been modified to be imparted with hydrophilicity, or polyisocyanate compound to which dispersibility in water is imparted by mixing it with a surfactant in advance, can be conveniently used.

As the hydrophilic polyisocyanate compound, for example, anionic hydrophilic polyisocyanate compound obtained through reaction of active hydrogen group in active hydrogen group-containing compound having anionic group with isocyanate group in the polyisocyanate compound; and nonionic hydrophilic polyisocyanate compound obtained through reaction of hydrophilic polyether alcohol such as monoalcohol of polyoxyethylene with polyisocyanate compound can be named, which can be used each alone or in combination of two or more.

Above active hydrogen group-containing compound having anionic group covers those compounds having anionic groups such as carboxyl, sulfonic acid or phosphoric acid groups, and betaine structure-containing group; and also active hydrogen group reactable with isocyanate group, such as hydroxyl, amino and the like groups. Through reaction of the compound with polyisocyanate compound, hydrophilicity can be imparted to the polyisocyanate compound.

The active hydrogen group-containing compound having anionic group is not particularly limited and, for example, those compounds having one anionic group and at least two active hydrogen groups can be used. More specifically, examples of active hydrogen group-containing compound having carboxyl group include dihydroxycarboxylic acids such as 2,2-dimethylolacetic acid, 2,2-dimethylollactic acid, 2,2-dimethylolpropionic acid, 2,2-dimethylolbutanoic acid, dimethylolheptanoic acid, dimethylolnonanoic acid, 2,2-dimethylolbutyric acid, 2,2-dimethylolvaleric acid and the like; diaminocarboxylic acids such as 1-carboxy-1,5-pentylenediamine, dihydroxybenzoic acid, 3,5-diaminobenzoic acid, lysine, alginine and the like; and half-ester compounds of polyoxypropylenetriol with maleic anhydride or phthalic anhydride.

Examples of active hydrogen group-containing compound having sulfonic acid group include N,N-bis(2-hydroxyethyl)-2-aminoethanesulfonic acid, 1,3-phenylenediamine-4,6-disulfonic acid, diaminobutanesulfonic acid, 3,6-diamino-2- toluenesulfonic acid, 2,4-diamino-5-toluenesulfonic acid, 2-(cyclohexylamino)-ethanesulfonic acid, 3-(cyclohexylamino)-propanesulfonic acid and the like.

Examples of active hydrogen group-containing compound having phosphoric acid group include 2,3-dihydroxypropylphenyl phosphate and the like.

Examples of active hydrogen group-containing compound having betaine structure-containing group include sulfobetaine group-containing compounds obtained through reaction of tertiary amine such as N-methyldiethanolamine with 1,3-propanesultone.

These active hydrogen group-containing compounds having anionic group can be converted to alkylene oxide-modified compounds, by addition of alkylene oxide such as ethylene oxide or propylene oxide.

These active hydrogen group-containing compounds having anionic group can be used either alone or in combination of two or more.

As the anionic hydrophilic polyisocyanate compound, use of the anionic hydrophilic polyisocyanate compound obtained by reaction of active hydrogen groups in active hydrogen group-containing compound having sulfonic acid group and/or phosphoric acid group with isocyanate groups of polyisocyanate compound is particularly preferred, from the viewpoint of smoothness of resulting coating film.

As polyisocyanate compounds which can be modified to be made hydrophilic, those polyisocyanate compounds listed in the above can be used, among which aliphatic diisocyanate, alicyclic diisocyanate and their derivatives are preferred, specific examples including hexamethylene diisocyanate (HMDI), derivatives of hexamethylene diisocyanate (HMDI), isophorone diisocyanate (IPDI) and derivatives of isophorone diisocyanate (IPDI).

In case of imparting water dispersibility to polyisocyanate compound by mixing it with surfactant in advance, anionic surfactant and/or nonionic surfactant are preferred as the surfactant, anionic surfactant being particularly preferred.

From the viewpoint of water resistance of resultant coating film, it is suitable to use the polyisocyanate compound at such a ratio that renders the equivalent ratio (NCO/OH) of isocyanate groups in the polyisocyanate compound to hydroxyl groups in the aqueous film-forming resin (A) to be within a range of normally 0.5-2.0, in particular, 0.8-1.5.

The blocked polyisocyanate compounds are those having at least two isocyanate groups per molecule, whose isocyanate groups are blocked with blocking agent.

Examples of the polyisocyanate compound having at least two isocyanate groups per molecule include aliphatic diisocyanates such as hexamethylene diisocyanate, trimethylhexamethylene diisocyanate, dimeric acid diisocyanate, lysine diisocyanate and the like; alicyclic diisocyanates such as hydrogenated xylylene diisocyanate, cyclohexylene diisocyanate, isophorone diisocyanate and the like; aromatic diisocyanates such as tolylene diisocyanate, phenylene diisocyanate, 4,4'-diphenylmethane diisocyanate, xylylene diisocyanate, tetramethylxylylene diisocyanate, naphthalene diisocyanate and the like; tri- or higher-valent organic polyisocyanate compounds such as 2-isocyanatoethyl-2,6-diisocyanatocaproate, 3-isocyanatomethyl-1,6-hexamethylene diisocyanate, 4-isocyanatomethyl-1,8-octamethylene diisocyanate (common name: triaminononane triisocyanate) and the like; dimers or trimers (biuret, isocyanurate and the like) of these polyisocyanate compounds; and prepolymers formed by urethanation reaction of these polyisocyanate compounds with polyhydric alcohol, low molecular weight polyester resin or water, under isocyanate group-excessive condition.

Examples of blocking agent include phenolic compounds such as phenol, cresol, xylenol, nitrophenol, ethylphenol, hydroxydiphenyl, butylphenol, isopropylphenol, nonylphenol, octylphenol, methyl hydroxybenzoate and the like; lactam compounds such as $\epsilon$-caprolactam, $\delta$-valerolactam, $\gamma$-butyrolactam, $\beta$-propiolactam and the like; aliphatic alcoholic compounds such as methanol, ethanol, propyl alcohol, butyl alcohol, amyl alcohol, lauryl alcohol and the like; ether compounds such as ethylene glycol monomethyl ether, ethylene glycol monoethyl ether, ethylene glycol monobutyl ether, diethylene glycol monomethyl ether, diethylene glycol monoethyl ether, propylene glycol monomethyl ether, methoxymethanol and the like; alcoholic compounds such as benzyl alcohol, glycolic acid, methyl glycolate, ethyl glycolate, butyl glycolate, lactic acid, methyl lactate, ethyl lactate, butyl lactate, methylolurea, methylolmelamine, diacetone alcohol, 2-hydroxyethyl acrylate, 2-hydroxyethyl methacrylate and the like; oxime compounds such as formamidoxime, acetamidoxime, acetoxime, methyl ethyl ketoxime, diacetylmonooxime, benzophenone-oxime, cyclohexane-oxime and the like; active methylene compounds such as dimethyl malonate, diethyl malonate, ethyl acetoacetate, methyl acetoacetate, acetylacetone and the like; mercaptan compounds such as butyl mercaptan, t-butyl mercaptan, hexyl mercaptan, t-dodecyl mercaptan, 2-mercaptobenzothiazole, thiophenol, methylthiophenol, ethylthiophenol and the like; acid amide compounds such as acetanilide, acetanisidide, acetotoluide, acrylamide, methacrylamide, acetamide, stearamide, benzamide and the like; imide compounds such as succinimide, phathalimide, maleimide and the like; amine compounds such as diphenylamine, phenylnaphthylamine, xylidine, N-phenylxylidine, carbazole, aniline, naphthylamine, butylamine, dibutylamine, butylphenylamine and the like; urea compounds such as urea, thiourea, ethyleneurea, ethylenethiourea, diphenylurea and the like; carbamic acid ester compounds such as phenyl N-phenylcarbamate; imine compounds such as ethyleneimine, propyleneimine and the like; and sulfurous acid salt compounds such as sodium bisulfite, potassium bisulfite and the like; and azole compounds. Examples of azole compound include pyrazole or pyrazole derivatives such as pyrazole, 3,5-dimethylpyrazole, 3-methylpyrazole, 4-benzyl-3,5-dimethylpyrazole, 4-nitro-3,5-dimethylpyrazole, 4-bromo-3,5-dimethylpyrazole, 3-methyl-5-phenylpyrazole and the like; imidazole or imidazole derivatives such as imidazole, benzimidazole, 2-methylimidazole, 2-ethylimidazole, 2-phenylimidazole and the like; and imidazoline derivatives such as 2-methylimidazoline, 2-phenylimidazoline and the like.

Of these, preferred blocking agents are oximes, active methylenes and pyrazole or pyrazole derivatives.

As the blocking agent, hydroxycarboxylic acid which has at least one hydroxyl group and at least one carboxyl group, such as hydroxypivalic acid, dimethylolpropionic acid and the like can also be used. In particular, blocked polyisocyanate compounds which are rendered water-dispersible by blocking their isocyanate groups with the hydroxycarboxylic acid and thereafter neutralizing the carboxyl group(s) in the hydroxycarboxylic acid can be conveniently used.

As the carbodiimido-containing compound, for example, those formed by mutual de-carbon dioxide reaction of isocyanate groups in the polyisocyanate compounds can be used. As the carbodiimido-containing compounds, use of polycarbodiimide compounds having at least two carbodiimido groups per molecule is preferred.

Use of water-soluble or water-dispersible polycarbodiimide compound as the polycarbodiimide compound is preferred from the viewpoint of smoothness of resultant coating film. As such water-soluble or water-dispersible polycarbodiimide compound, any polycarbodiimide compound which is stably soluble or dispersible in aqueous medium can be used without particular limitation.

Specific examples of water-soluble polycarbodiimide compound include CARBODILITE SV-02, CARBODILITE V-02, CARBODILITE V-02-L2 and CARBODILITE V-04 (tradename, Nisshinbo Industries, Inc.). Also as the water-dispersible polycarbodiimide compound, for example, CARBODILITE E-01 and CARBODILITE E-02 (tradename, Nisshinbo Industries, Inc.) can be used.

Above polycarbodiimide compounds can be used either alone or in combination of two or more.

The blend ratio of the aqueous film-forming resin (A) and the curing agent (B) in the water-based paint compositions of the present invention is preferably as follows, from the viewpoint of improving smoothness and water resistance of the coating film: based on the combined amount of the two, the aqueous film-forming resin is generally within a range of 30-95 mass %, in particular, 50-90 mass %, inter alia, 60-80 mass %; and the curing agent (B), generally within a range of 5-70 mass %, in particular, 10-50 mass %, inter alia, 20-40 mass %.

Where the water-based paint composition of the present invention contains, as at least one component of the aqueous film-forming resin (A) therein, the hydroxyl-containing polyester resin (A1), the blended amount of the hydroxyl-containing polyester resin (A1) preferably is within a range of generally 2-80 mass %, in particular, 10-60 mass %, inter alia, 20-50 mass %, based on the combined amount of the aqueous film-forming resin (A) and curing agent (B).

Again, where the water-based paint composition of the present invention contains, as at least one component of the aqueous film-forming resin (A), the hydroxyl-containing acrylic resin (A2), the blended amount of the hydroxyl-containing acrylic resin (A2) preferably is within a range of generally 2-80 mass %, in particular, 5-60 mass %, inter alia, 10-50 mass %, based on the combined amount of the aqueous film-forming resin (A) and curing agent (B).

Crosslinked Resin Particles (C)

The crosslinked resin particles (C) used in the water-based paint compositions have the core/shell type multilayer structure formed of the core of (co)polymer (I) which is obtained by (co)polymerization of a monomer component consisting of 30-100 mass % of polymerizable unsaturated monomer (c-1) having $C_{4-22}$ alkyl group and 0-70 mass % of other polymerizable unsaturated monomer (c-2), and the shell having crosslinked structure.

As above crosslinked resin particles (C), for example, crosslinked resin particles (C1) and/or crosslinked resin particles (C2) as hereinafter described can be conveniently used.

Crosslinked Resin Particles (C1)

Crosslinked resin particles (C1) have the core/shell type multilayer structure formed of the core of (co)polymer (I) which is obtained by (co)polymerizing a monomer component consisting of 30-100 mass % of polymerizable unsaturated monomer (c-1) having $C_{4-22}$ alkyl group and 0-70 mass % of other polymerizable unsaturated monomer (c-2), and the shell of copolymer (II) which is obtained by copolymerizing a monomer component consisting of 0.1-40 mass % of polymerizable unsaturated monomer (c-3) having at least two polymerizable unsaturated groups per molecule and 60-99.9 mass % of polymerizable unsaturated monomer (c-4) having one polymerizable unsaturated group per molecule.

As the polymerizable unsaturated monomer (c-1) having $C_{4-22}$, preferably $C_{6-18}$, inter alia, $C_{8-13}$, alkyl group, which is used as the monomer component for producing the (co)polymer (I), for example, alkyl or cycloalkyl (meth)acrylates such as n-butyl (meth)acrylate, iso-butyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, isobornyl (meth)acrylate, adamantyl (meth)acrylate, tricyclodecanyl (meth)acrylate and the like can be named. These monomers can be used either alone or in combination of two or more. From the viewpoint of smoothness of formed coating film, among these 2-ethylhexyl acrylate, dodecyl methacrylate and tridodecyl methacrylate, in particular, 2-ethylhexyl acrylate, are preferred.

The use ratio of the polymerizable unsaturated monomer (c-1) having $C_{4-22}$ alkyl group preferably is within a range of generally 30-100 mass %, in particular, 50-100 mass %, inter alia, 75-100 mass %, and for the best result, 90-100 mass %, based on the combined amount of the $C_{4-22}$ alkyl group-containing polymerizable unsaturated monomer (c-1) and the other polymerizable unsaturated monomer (c-2), from the viewpoint of smoothness and distinctness of image of formed coating film.

As the other polymerizable unsaturated monomers (c-2) useful for the monomer component for producing the (co)polymer (I), for example, $C_{1-3}$ alkyl group-containing alkyl (meth)acrylates such as methyl (meth)acrylate, ethyl (meth)acrylate, n-propyl (meth)acrylate and isopropyl (meth)acrylate; aromatic ring-containing polymerizable unsaturated monomers such as benzyl (meth)acrylate, styrene, α-methylstyrene and vinyltoluene; alkoxysilyl group-containing polymerizable unsaturated monomers such as vinyl trimethoxysilane, vinyl triethoxysilane, vinyl tris(2-methoxyethoxy) silane, γ-(meth)acryloyloxypropyl trimethoxysilane and γ-(meth)acryloyloxypropyl triethoxysilane; perfluoroalkyl (meth)acrylates such as perfluorobutylethyl (meth)acrylate and perfluorooctylethyl (meth)acrylate; fluorinated alkyl group-containing polymerizable unsaturated monomers such as fluoroolefin; polymerizable unsaturated monomers having photo-polymerizable functional group such as maleimide group; vinyl compounds such as N-vinylpyrrolidone, ethylene, butadiene, chloroprene, vinyl propionate and vinyl acetate; monoesters of (meth)acrylic acid with $C_{2-8}$ dihydric alcohol such as 2-hydroxyethyl (meth)acrylate, 2-hydroxypropyl (meth)acrylate, 3-hydroxypropyl (meth)acrylate and 4-hydroxybutyl (meth)acrylate; hydroxyl-containing polymerizable unsaturated monomers such as ε-caprolactone-modified monoesters of (meth)acrylic acid with $C_{2-8}$ dihydric alcohol, N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; polymerizable unsaturated monomers having at least two polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth) acrylate, 1,1,1-trishydroxymethylpropane tri(meth)acrylate, triallyl isocyanurate, diallyl terephthalate and divinylbenzene; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, and adducts of glycidyl (meth)acrylate with amines; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether; isocyanate group-containing polymerizable unsaturated monomers such as 2-isocyanatoethyl (meth)acrylate and m-isopropenyl-α,α-dimethylbenzyl isocyanate; (meth)acrylate having alkoxy group-terminated polyoxyethylene chain; and carbonyl group-containing polymerizable unsaturated monomers such as acrolein, diacetone acrylamide, diacetone methacrylamide, acetoacetoxyethyl methacrylate, formyl styrol, vinyl alkyl ketones having 4-7 carbon atoms (e.g., vinyl methyl ketone, vinyl ethyl ketone and vinyl butyl ketone) and the like can be named. These monomers can be used either alone or in combination of two or more.

Also from the viewpoint of smoothness and distinctness of image of formed coating film, the (co)polymer (I) preferably has crosslinked structure. As the means for introducing crosslinked structure into the (co)polymer (I), for example, that of using a polymerizable unsaturated monomer having at least two polymerizable unsaturated groups per molecule as a part of the other polymerizable unsaturated monomer (c-2); or that of using polymerizable unsaturated monomers having mutually reactable functional group and polymerizable unsaturated group as a part of the other polymerizable unsaturated monomer (c-2); can be adopted. Of these, the means of introducing crosslinked structure by using a polymerizable unsaturated monomer having at least two polymerizable unsaturated groups per molecule as a part of the other polymerizable unsaturated monomer (c-2) is preferred.

Examples of such polymerizable unsaturated monomer having at least two polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra (meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl isocyanurate, divinylbenzene, methylenebisacrylamide and ethylenebisacrylamide. These monomers can be used either alone or in combination of two or more.

As the polymerizable unsaturated monomers having at least two polymerizable unsaturated groups per molecule, allyl (meth)acrylate, ethylene glycol di(meth)acrylate, 1,4-butanediol di(meth)acrylate, neopentyl glycol di(meth)acrylate and 1,6-hexanediol di(meth)acrylate can be preferably used among the above-enumerated.

When the polymerizable unsaturated monomer having at least two polymerizable unsaturated groups per molecule is used, its normally preferred use ratio, based on the combined amount of the $C_{4-22}$ alkyl group-containing polymerizable unsaturated monomer (c-1) and other polymerizable unsaturated monomer (c-2), is generally within a range of 0.1-30 mass %, in particular, 0.5-20 mass %, inter alia, 1-10 mass %.

The polymerizable unsaturated monomers having mutually reactable functional group and polymerizable unsaturated group refer to a combination of two kinds of polymerizable unsaturated monomers respectively having functional groups which are mutually reactable and include, for example, combinations of epoxy-containing polymerizable unsaturated monomer such as glycidyl (meth)acrylate with carboxyl-containing polymerizable unsaturated monomer such as (meth)acrylic acid, and those of hydroxyl-containing polymerizable unsaturated monomer with isocyanato-containing polymerizable unsaturated monomer.

Examples of the polymerizable unsaturated monomer (c-3) having at least two polymerizable unsaturated groups per molecule, which is used as the monomer component for producing the copolymer (II) include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra (meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl terephthalate and divinylbenzene. These monomers can be used either alone or in combination of two or more.

As the polymerizable unsaturated monomer (c-3) having at least two polymerizable unsaturated groups per molecule, allyl (meth)acrylate, ethylene glycol di(meth)acrylate, 1,4-butanediol di(meth)acrylate, neopentyl glycol di(meth)acrylate and 1,6-hexanediol di(meth)acrylate can be preferably used among the above-enumerated.

Preferred use ratio of the polymerizable unsaturated monomer (c-3) having at least two polymerizable unsaturated groups per molecule for improving smoothness and distinctness of image of formed coating film is within a range of generally 0.1-40 mass %, in particular, 0.5-25 mass %, inter alia, 1-15 mass %, based on the total amount of the polymerizable unsaturated monomer (c-3) having at least two polymerizable unsaturated groups per molecule and polymerizable unsaturated monomer (c-4) having one polymerizable unsaturated group per molecule.

Examples of the polymerizable unsaturated monomer (c-4) having one polymerizable unsaturated group per molecule, which is used as a monomer component for producing the copolymer (II) include alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, tricyclodecanyl (meth)acrylate and the like; isobornyl group-containing polymerizable unsaturated monomers such as isobornyl (meth)acrylate; adamantyl group-containing polymerizable unsaturated monomers such as adamantyl (meth)acrylate; tricyclodecenyl group-containing polymerizable unsaturated monomers such as tricyclodecenyl (meth)acrylate; aromatic ring-containing polymerizable unsaturated monomers such as benzyl (meth)acrylate, styrene, α-methylstyrene, vinyltoluene and the like; alkoxysilyl group-containing polymerizable unsaturated monomers such as vinyltrimethoxysilane, vinyltriethoxysilane, vinyltris (2-methoxyethoxy)silane, γ-(meth)acryloyloxypropyltrimethoxysilane, γ-(meth)acryloyloxypropyltriethoxysilane and the like; perfluoroalkyl (meth)acrylates such as perfluorobutylethyl (meth)acrylate, perfluorooctylethyl (meth)

acrylate and the like; polymerizable unsaturated monomers having fluorinated alkyl groups such as fluoroolefin; polymerizable unsaturated monomers having photo-polymerizable functional groups such as maleimide group; vinyl compounds such as N-vinylpyrrolidone, ethylene, butadiene, chloroprene, vinyl propionate, vinyl acetate and the like; hydroxyl group-containing polymerizable unsaturated monomers such as monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate, 4-hydroxybutyl (meth)acrylate and the like, ε-caprolactone-modified products of the monoesters of (meth)acrylic acid with $C_{2-8}$ dihydric alcohols, N-hydroxymethyl (meth)acrylamide, allyl alcohol, (meth)acrylates having hydroxyl-terminated polyoxyethylene chain and the like; carboxyl group-containing polymerizable unsaturated monomers such as (meth)acrylic acid, maleic acid, crotonic acid, β-carboxyethyl acrylate and the like; nitrogen-containing polymerizable unsaturated monomers such as (meth)acrylonitrile, (meth)acrylamide, N,N-dimethylaminoethyl (meth) acrylate, N,N-diethylaminoethyl (meth)acrylate, N,N-dimethylaminopropyl (meth)acrylamide, adducts of glycidyl (meth)acrylates with amines and the like; epoxy group-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate, allyl glycidyl ether and the like; and (meth)acrylates having alkoxy group-terminated polyoxyethylene chain. These monomers can be used either alone or in combination of two or more, according to the performance required for the crosslinked resin particles (C1).

The polymerizable unsaturated monomer (c-4) having one polymerizable unsaturated group per molecule, to be used as a monomer component for producing the copolymer (II) preferably contains, as at least a part thereof, hydroxyl-containing polymerizable unsaturated monomer.

Hydroxyl-containing polymerizable unsaturated monomer has the function to improve stability of the crosslinked resin particles (C1) in aqueous medium as well as to improve water resistance of coating film, by introducing into the resultant crosslinked resin particles (C1) hydroxyl groups which react with the curing agent (B) to form crosslinkage.

As such hydroxyl-containing polymerizable unsaturated monomer, for example, those exemplified in the foregoing explanation of the polymerizable unsaturated monomer (c-4) having one polymerizable unsaturated group per molecule can be used. These monomers can be used either alone or in combination of two or more.

In particular, as the hydroxyl-containing polymerizable unsaturated monomer, 2-hydroxyethyl (meth)acrylate, 2-hydroxypropyl (meth)acrylate, 3-hydroxypropyl (meth)acrylate and 4-hydroxybutyl (meth)acrylate can be conveniently used.

When the polymerizable unsaturated monomer (c-4) having one polymerizable unsaturated group per molecule contains hydroxyl-containing polymerizable unsaturated monomer, the use ratio of the hydroxyl-containing polymerizable unsaturated monomer preferably is within a range of generally 1-60 mass %, in particular, 2-55 mass %, inter alia, 3-45 mass %, based on the combined amount of the polymerizable unsaturated monomer (c-3) having at least two polymerizable unsaturated groups per molecule and the polymerizable unsaturated monomer (c-4) having one polymerizable unsaturated group per molecule, from the viewpoint of excellent stability of the crosslinked resin particles (C1) in aqueous medium and water resistance of formed coating film.

The polymerizable unsaturated monomer (c-4) having one polymerizable unsaturated group per molecule can also contain, as at least a part thereof, carboxyl-containing polymerizable unsaturated monomer.

As the carboxyl-containing polymerizable unsaturated monomer, for example, those exemplified in the foregoing explanation of the polymerizable unsaturated monomer (c-4) having one polymerizable unsaturated group per molecule can be used. These monomers can be used either alone or in combination of two or more. In particular, use of acrylic acid and/or methacrylic acid is preferred.

When the polymerizable unsaturated monomer (c-4) having one polymerizable unsaturated group per molecule contains carboxyl-containing polymerizable unsaturated monomer, the use ratio of the carboxyl-containing polymerizable unsaturated monomer preferably is within a range of generally 1-30 mass %, in particular, 3-20 mass %, inter alia, 5-15 mass %, based on the combined amount of the polymerizable unsaturated monomer (c-3) having at least two polymerizable unsaturated groups per molecule and the polymerizable unsaturated monomer (c-4) having one polymerizable unsaturated group per molecule, from the viewpoint of excellent stability of the crosslinked resin particles (C1) in aqueous medium.

Also from the viewpoint of improving water resistance of formed coating film, the polymerizable unsaturated monomer (c-4) having one polymerizable unsaturated group per molecule preferably contains, as at least a part thereof, polymerizable unsaturated monomer having $C_1$ or $C_2$ alkyl group.

As the polymerizable unsaturated monomer having $C_1$ or $C_2$ alkyl group; for example, methyl (meth)acrylate and ethyl (meth)acrylate can be named. These monomers can be used either alone or in combination of two or more.

As the polymerizable unsaturated monomer having $C_1$ or $C_2$ alkyl group, use of methyl methacrylate and/or ethyl methacrylate, in particular, use of methyl methacrylate, is preferred from the viewpoint of improving smoothness, distinctness of image and water resistance of formed coating film.

Where the polymerizable unsaturated monomer (c-4) having one polymerizing unsaturated group per molecule contains the polymerizable unsaturated monomer having $C_1$ or $C_2$ alkyl group, the use ratio of the polymerizable unsaturated monomer having $C_1$ or $C_2$ alkyl group preferably is within a range of generally 20-99.9 mass %, in particular, 30-99.5 mass %, inter alia, 40-99 mass %, based on the combined amount of the polymerizable unsaturated monomer (c-3) having at least two polymerizable unsaturated groups per molecule and the polymerizable unsaturated monomer (c-4) having one polymerizable unsaturated group per molecule, from the viewpoint of improving smoothness and distinctness of image of formed coating film.

The ratio of the (co)polymer (I)/copolymer (II) in the crosslinked resin particles (C1) preferably is, in terms of solid mass ratio, generally 5/95-95/5, in particular, 50/50-90/10, inter alia, 65/35-85/15, from the viewpoint of improving smoothness of coating film.

The crosslinked resin particles (C1) preferably have a hydroxyl value within a range of generally 1-150 mgKOH/g, in particular, 2-100 mgKOH/g, inter alia, 5-60 mgKOH/g, from the viewpoint of excellent water resistance of formed coating film. From the viewpoint of excellent smoothness and distinctness of image of the coating film, the crosslinked resin particles (C1) furthermore preferably have an acid value within a range of generally 0-50 mgKOH/g, in particular, 0-20 mgKOH/g, inter alia, from 0 mgKOH/g to less than 10 mgKOH/g, in particular, from 0 mgKOH/g to less than 2 mgKOH/g.

In the water-based paint compositions of the present invention, the (co)polymer (I) obtained by (co)polymerization of polymerizable unsaturated monomer (c-1) having $C_{4-22}$ alkyl and other polymerizable unsaturated monomer (c-2), preferably has a glass transition temperature ($Tg_1$) within a range of normally from −65 to −10° C., in particular, from −60 to −20° C., inter alia, from −55 to −40° C., from the viewpoint of smoothness and distinctness of image of formed coating film.

Also the copolymer (II) obtained by copolymerization of the polymerizable unsaturated monomer (c-3) having at least two polymerizable unsaturated groups per molecule and the polymerizable unsaturated monomer (c-4) having one polymerizable unsaturated group per molecule preferably has a glass transition temperature ($Tg_2$) within a range of normally from −50 to 150° C., in particular, from −5 to 120° C., inter alia, from 10 to 110° C. It is furthermore preferred that $Tg_2$ is higher than $Tg_1$ and the difference between $Tg_2$ and $Tg_1$ is within a range of generally 5-200° C., in particular, 30-180° C., inter alia, 50-160° C.

In the present invention, the glass transition temperature Tg (absolute temperature) is the value calculated by the following equation:

$$1/Tg = W_1/T_1 + W_2/T_2 + \ldots Wn/Tn$$

in the equation, $W_1$, $W_2$ ... Wn are the mass fractions of respective monomers, and $T_1$, $T_2$ ... Tn are the glass transition temperature (absolute temperature) of homopolymers of respective monomers.

Glass transition temperatures of homopolymers of respective monomers are those given on Polymer Handbook, 4th Edition, ed. by J. Brandrup, E. h. Immergut, E. A. Grulke (1999). Glass transition temperatures of monomers not given in the literature were measured of homopolymers of the monomers which were synthesized to have each a weight-average molecular weight of approx. 50,000, by means of differential scanning calorimeter.

The crosslinked resin particles (C1) can be produced, for example, emulsion (co)polymerizing a monomer mixture containing 30-100 mass % of the polymerizable unsaturated monomer (c-1) to having $C_{4-22}$ alkyl group and 0-70 mass % of other polymerizable unsaturated monomer (c-2), adding to the resulting emulsion containing the (co)polymer (I) a monomer mixture of 0.1-40 mass % of the polymerizable unsaturated monomer (c-3) having at least two polymerizable unsaturated groups per molecule and 60-99.9 mass % of the polymerizable unsaturated monomer (c-4) having one polymerizable unsaturated group per molecule, and forming the copolymer (II) by further emulsion polymerization.

The emulsion polymerization for making an emulsion of the (co)polymer (I) can be carried out by the means known per se, for example, seed polymerization process, mini-emulsion polymerization process or the like, e.g., by emulsion polymerization of the monomer mixture using a polymerization initiator in the presence of an emulsifier.

As the emulsifier, anionic or nonionic emulsifiers are suitable. Examples of anionic emulsifier include sodium salts or ammonium salts of such acids as alkylsulfonic acid, alkylbenzenesulfonic acid, alkylphosphoric acid and the like, and examples of nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan tristearate, sorbitan trioleate, polyoxyethylene sorbitan monolaurate and the like. It is also permissible to use polyoxyalkylene group-containing anionic emulsifier containing an anionic group and polyoxyalkylene group such as polyoxyethylene, polyoxypropylene or the like group per molecule, or reactive anionic emulsifier containing an anionic group and polymerizable unsaturated group per molecule.

The emulsifier can be used within a range of normally 0.1-15 mass %, preferably 0.5-10 mass %, inter alia, 1-5 mass %, based on the total mass of all of the monomers used.

As the polymerization initiator, for example, organic peroxides such as benzoyl peroxide, octanoyl peroxide, lauroyl peroxide, stearoyl to peroxide, cumene hydroperoxide, tert-butyl peroxide, tert-butyl peroxylaurate, tert-butyl peroxyisopropylcarbonate, tert-butyl peroxyacetate, diisopropylbenzene hydroperoxide and the like; azo compounds such as azobisisobutyronitrile, azobis(2,4-dimethylvarelonitrile), azobis(2-methylpropionitrile), azobis(2-methylbutyronitrile), 4,4'-azobis(4-cyanobutanoic acid), dimethylazobis(2-methyl propionate), azobis[2-methyl-N-(2-hydroxyethyl)-propionamide], azobis{2-methyl-N-[2-(1-hydroxybutyl]-propionamide} and the like; and persulfates such as potassium persulfate, ammonium persulfate, sodium persulfate and the like. These polymerization initiators can be used either alone or in combination of two or more. Furthermore, where necessary, such a polymerization initiator may be co-used with reducing agent such as sugar, sodium formaldehyde sulfoxylate, iron complex and the like to form a redox initiator.

The polymerization initiator is preferably used within a range of normally around 0.1-5 mass %, in particular, around 0.2-3 mass %, based on the total mass of all of the monomers used. Method of adding the polymerization initiator is not particularly limited and can be suitably selected according to its kind and amount. For example, it may be advancedly contained in the monomer mixture or aqueous medium, or may be added in lump or dropwise at the time of polymerization.

The monomer mixture may contain chain transfer agent, for adjusting molecular weight of resulting crosslinked resin particles (C1). The chain transfer agent includes mercapto group-containing compounds, specific examples including lauryl mercaptan, t-dodecylmercaptan, octylmercaptan, 2-ethylhexyl thioglycolate, 2-methyl-5-tert-butylthiophenol, mercaptoethanol, thioglycerol, mercaptoacetic acid (thioglycolic acid), mercaptopropionate, n-octyl-3-mercaptopropionate and the like. When the chain transfer agent is used, its suitable use ratio is normally within a range of 0.05-10 mass %, in particular, 0.1-5 mass %, based on the total amount of all the monomers used.

Where necessary, the monomer mixture may be blended with organic solvent, for example, long chain saturated hydrocarbon solvent such as hexadecane or long chain alcoholic solvent such as hexadecanol.

The crosslinked resin particles (C1) can be formed by adding to the emulsion of (co)polymer (I) as obtained in the above a monomer mixture of the polymerizable unsaturated monomer (c-3) having at least two polymerizable unsaturated groups per molecule and polymerizable unsaturated monomer (c-4) having one polymerizable unsaturated group per molecule, and further polymerizing the system to form the copolymer (II).

The monomer mixture for forming the copolymer (II) can suitably contain such components as the emulsifier, polymerization initiator, reducing agent, chain transfer agent and the like, where necessary. The monomer mixture may be added dropwise as it is, but it is generally desirable to disperse it in an aqueous medium and to add the resultant monomer emulsion dropwise. The particle size of the monomer emulsion in this case is not particularly limited.

As polymerization method of the monomer mixture for forming the copolymer (II), for example, one comprising adding the monomer mixture or emulsion thereof in lump or slowly to the emulsion of (co)polymer (I) and heating the same to an adequate temperature under stirring can be adopted.

Thus obtained crosslinked resin particles (C1) normally have a multilayer structure having as the core part the (co)polymer (I) of the monomer mixture of the polymerizable unsaturated monomer (c-1) having $C_{4-22}$ alkyl group and other polymerizable unsaturated monomer (c-2) and, as the shell part, the copolymer (II) of the monomer mixture of the polymerizable unsaturated monomer (c-3) having at least two polymerizable unsaturated groups per molecule and polymerizable unsaturated monomer (c-4) having one polymerizable unsaturated group per molecule.

The crosslinked resin particles (C1), furthermore, may be caused to consist of three or more layers, by adding a step or steps comprising supplying polymerizable unsaturated monomer (one or a mixture of at least two monomers) to form other layer(s) and emulsion polymerizing the monomer(s), between the step of obtaining the (co)polymer (I) and the step of obtaining the copolymer (II).

In the present invention, "shell part" of the crosslinked resin particles (C1) signifies the polymeric layer present as the outermost layer of each resin particle, "core part" signifies the polymeric layer(s) inside the resin particles other than the shell part, and "core/shell structure", a structure having the core part and the shell part. The core/shell structure in general takes layer structure such that the core part is completely covered by the shell part, but depending on the mass ratio of the core part to the shell part, it may occur that the amount of the monomer for the shell part is insufficient for forming the layer structure. In that case, a complete layer structure as above is not essential but a structure, wherein the shell partially covers the core or the polymerizable unsaturated monomers which are the constituent elements of the shell are graft-polymerized at a part of the core, may be taken. The concept of the multilayer structure of above core/shell structure is applicable similarly to the case wherein the multilayer structure is formed as the core in the crosslinked resin particles (C1) of the present invention.

The crosslinked resin particles (C1) can have an average particle size within a range of generally 0.01-5 μm, preferably 0.05-3.5 μm, inter alia, 0.1-1 μm.

In the present specification, the average particle size of the crosslinked resin particles (C1) is the value measured of the particles which are diluted with deionized water according to the accepted practice at 20° C., with a submicron particle size distribution measuring device. As the submicron particle size distribution analyser, for example, COULTER N4 Model (tradename, Beckman Coulter, Inc.) can be used.

Where the crosslinked resin particles (C1) contain acidic groups such as carboxyl group, it is desirable to neutralize the acidic groups with a neutralizer to improve mechanical stability of the crosslinked resin particles (C1). The neutralizer is subject to no particular limitation, so long as it can neutralize acidic groups. Examples of the neutralizer include sodium hydroxide, potassium hydroxide, trimethylamine, 2-(dimethylamino)ethanol, 2-amino-2-methyl-1-propanol, triethylamine, aqueous ammonia and the like. These neutralizers are desirably used in an amount to render pH of the aqueous dispersion of crosslinked resin particles (C1) after the neutralization around 6.0-9.0.

Crosslinked Resin Particles (C2)

Crosslinked resin particles (C2) have the core/shell type multilayer structure formed of the core of (co)polymer (I) which is obtained by (co)polymerizing a monomer component consisting of 30-100 mass % of polymerizable unsaturated monomer (c-1) having $C_{4-22}$ alkyl group and 0-70 mass % of other polymerizable unsaturated monomer (c-2), and the shell of (co)polymer (III) which is obtained by (co)polymerizing a monomer component consisting of 0.1-60 mass % of functional group-containing polymerizable unsaturated monomer (c-5), 0-60 mass % of polymerizable unsaturated monomer (c-6) having a functional group complementally reactable with the functional group in the polymerizable unsaturated monomer (c-5), and 0-99.9 mass % of other polymerizable unsaturated monomer (c-7).

Examples of the polymerizable unsaturated monomer (c-1) having $C_{4-22}$ alkyl which is used as a monomer for the (co)polymer (I) include alkyl or cycloalkyl (meth)acrylates such as n-butyl (meth)acrylate, iso-butyl (meth)acrylate, tert-butyl (meth)acrylate, pentyl (meth)acrylate, hexyl (meth)acrylate, octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate, isobornyl (meth)acrylate, adamantyl (meth)acrylate, tricyclodecanyl (meth)acrylate and the like. There monomers can be used either alone or in combination of two or more.

As the $C_{4-22}$ alkyl-containing polymerizable unsaturated monomers (c-1), $C_{6-18}$ alkyl-, in particular, $C_{8-13}$ alkyl-containing polymerizable unsaturated monomers among the above-named are preferred. From the viewpoint of smoothness of formed coating film, 2-ethylhexyl acrylate, dodecyl methacrylate and tridodecyl methacrylate, in particular, 2-ethylhexyl acrylate, are preferred among these.

The use ratio of the polymerizable unsaturated monomer (c-1) having $C_{4-22}$ alkyl group preferably is within a range of generally 30-100 mass %, in particular, 50-100 mass %, inter alia, 75-100 mass %, and for the best result, 90-100 mass %, based on the combined amount of the $C_{4-22}$ alkyl group-containing polymerizable unsaturated monomer (c-1) and the other polymerizable unsaturated monomer (c-2), from the viewpoint of smoothness and distinctness of image of formed coating film.

As the other polymerizable unsaturated monomers (c-2) useful for the monomer component for producing the (co)polymer (I), for example, $C_{1-3}$ alkyl group-containing alkyl (meth)acrylates such as methyl (meth)acrylate, ethyl (meth)acrylate, n-propyl (meth)acrylate and iso-propyl (meth)acrylate; aromatic ring-containing polymerizable unsaturated monomers such as benzyl (meth)acrylate, styrene, α-methylstyrene and vinyltoluene; alkoxysilyl group-containing polymerizable unsaturated monomers such as vinyl trimethoxysilane, vinyl triethoxysilane, vinyl tris(2-methoxyethoxy) silane, γ-(meth)acryloyloxypropyl trimethoxysilane and γ-(meth)acryloyloxypropyl triethoxysilane; perfluoroalkyl (meth)acrylates such as perfluorobutylethyl (meth)acrylate and perfluorooctylethyl (meth)acrylate; fluorinated alkyl group-containing polymerizable unsaturated monomers such as fluoroolefin; polymerizable unsaturated monomers having photo-polymerizable functional group such as maleimide group; vinyl compounds such as N-vinylpyrrolidone, ethylene, butadiene, chloroprene, vinyl propionate and vinyl acetate; monoesters of (meth)acrylic acid with $C_{2-8}$ dihydric alcohol such as 2-hydroxyethyl (meth)acrylate, 2-hydroxypropyl (meth)acrylate, 3-hydroxypropyl (meth)acrylate and 4-hydroxybutyl (meth)acrylate; hydroxyl-containing polymerizable unsaturated monomers such as ε-caprolactone-modified monoesters of (meth)acrylic acid with $C_{2-8}$ dihydric alcohol, N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; polymerizable unsaturated monomers having at least two polymerizable unsaturated groups per molecule, such as allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra (meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl telephthalate and divinylbenzene; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide, and adducts of glycidyl (meth)acrylate with amines; epoxy-containing polymerizable unsaturated monomers such as glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether; isocyanate group-containing polymerizable unsaturated monomers such as 2-isocyanatoethyl (meth)acrylate and m-isopropenyl-α,α-dimethylbenzyl isocyanate; (meth)acrylate having alkoxy group-terminated polyoxyethylene chain; and carbonyl group-containing polymerizable unsaturated monomers such as acrolein, diacetone acrylamide, diacetone methacrylamide, acetoacetoxyethyl methacrylate, formyl styrol, vinyl alkyl ketones having 4-7 carbon atoms (e.g., vinyl methyl ketone, vinyl ethyl ketone and vinyl butyl ketone) and the like can be named. These monomers can be used either alone or in combination of two or more.

Also from the viewpoint of smoothness and distinctness of image of formed coating film, the (co)polymer (I) preferably has crosslinked structure. As the means for introducing crosslinked structure into the (co)polymer (I), for example, that of using a polymerizable unsaturated monomer having at least two polymerizable unsaturated groups per molecule as a part of the other polymerizable unsaturated monomer (c-2); or that of using as a part of the other polymerizable unsaturated monomer (c-2), later described functional group-containing polymerizable unsaturated monomer (c-5) and polymerizable unsaturated monomer (c-6) having a functional group complementally reactable with the functional group in the polymerizable unsaturated monomer (c-5). Of these, the means of introducing crosslinked structure by using a polymerizable unsaturated monomer having at least two polymerizable unsaturated groups per molecule as a part of the other polymerizable unsaturated monomer (c-2) is preferred.

Examples of such polymerizable unsaturated monomer having at least two polymerizable unsaturated groups per molecule include allyl (meth)acrylate, ethylene glycol di(meth)acrylate, triethylene glycol di(meth)acrylate, tetraethylene glycol di(meth)acrylate, 1,3-butylene glycol di(meth)acrylate, trimethylolpropane tri(meth)acrylate, 1,4-butanediol di(meth)acrylate, neopentyl glycol di(meth)acrylate, 1,6-hexanediol di(meth)acrylate, pentaerythritol di(meth)acrylate, pentaerythritol tetra(meth)acrylate, glycerol di(meth)acrylate, 1,1,1-trishydroxymethylethane di(meth)acrylate, 1,1,1-trishydroxymethylethane tri(meth)acrylate, 1,1,1-trishydroxymethylpropane tri(meth)acrylate, triallyl isocyanurate, diallyl isocyanurate, divinylbenzene, methylenebisacrylamide and ethylenebisacrylamide. These monomers can be used either alone or in combination of two or more.

As the polymerizable unsaturated monomers having at least two polymerizable unsaturated groups per molecule, allyl (meth)acrylate, ethylene glycol di(meth)acrylate, 1,4-butanediol di(meth)acrylate, neopentyl glycol di(meth)acrylate and 1,6-hexanediol di(meth)acrylate can be preferably used among the above-enumerated.

When the polymerizable unsaturated monomer having at least two polymerizable unsaturated groups per molecule is used, its use ratio can be suitably determined according to the degree of crosslinkage of the crosslinked resin particles (C2), it being preferred that the use ratio falls within a range of normally 0.1-30 mass %, in particular, 0.5-20 mass %, inter alia, 1-10 mass %, based on the total amount of the $C_{4-22}$ alkyl-containing polymerizable unsaturated monomer (c-1) and other polymerizable unsaturated monomer (c-2).

As the functional group-containing polymerizable unsaturated monomer (c-5) to be used as a monomer for the (co)polymer (III), for example, epoxy group-containing polymerizable unsaturated monomer, methylol group-containing polymerizable unsaturated monomer, alkoxysilyl group-containing polymerizable unsaturated monomer and isocyanato group-containing polymerizable unsaturated monomer can be conveniently used.

Examples of the epoxy group-containing polymerizable unsaturated monomer include glycidyl (meth)acrylate, β-methylglycidyl (meth)acrylate, 3,4-epoxycyclohexylmethyl (meth)acrylate, 3,4-epoxycyclohexylethyl (meth)acrylate, 3,4-epoxycyclohexylpropyl (meth)acrylate and allyl glycidyl ether. These can be used either alone or in combination of two or more. In particular, use of glycidyl methacrylate is preferred.

Examples of the methylol group-containing polymerizable unsaturated monomer include N-(hydroxymethyl) (meth)acrylamide, N-(n-butoxymethyl) (meth)acrylamide and N-(iso-butoxymethyl) (meth)acrylamide, which can be used either alone or in combination of two or more. In the present invention, the methylol group-containing polymerizable unsaturated monomer encompasses polymerizable unsaturated monomer having methylol group and polymerizable unsaturated monomer having etherified methylol group. As the methylol group-containing polymerizable unsaturated monomer, N-(hydroxymethyl) (meth)acrylamide and N-(n-butoxymethyl) (meth)acrylamide can be conveniently used.

Examples of the alkoxysilyl group-containing polymerizable unsaturated monomer include vinyltrimethoxysilane, vinyltriethoxysilane, vinyl tris(2-methoxyethoxy)silane, γ-(meth)acryloyloxypropyltrimethoxysilane and γ-(meth)acryloyloxypropyltriethoxysilane, which can be used either alone or in combination of two or more. Of these, γ-acryloyloxy-propyltrimethoxysilane and γ-methacryloyloxytrimethoxysilane can be conveniently used.

Examples of the isocyanato group-containing polymerizable unsaturated monomer include 2-isocyanatoethyl (meth)acrylate and m-isopropenyl-α,α-dimethylbenzyl isocyanate, which can be used either alone or in combination of two or more. Of these, m-isopropenyl-α,α-dimethylbenzyl isocyanate can be conveniently used.

The use ratio of the functional group-containing polymerizable unsaturated monomer (c-5) preferably is within a range of generally 0.1-60 mass %, in particular, 1-30 mass %, inter alia, 2-20 mass %, based on the combined amount of the functional group-containing polymerizable unsaturated monomer (c-5), polymerizable unsaturated monomer (c-6) having a functional group complementally reactable with the functional group in the functional group-containing polymerizable unsaturated monomer (c-5) and other polymerizable unsaturated monomer (c-7), for improving smoothness and distinctness of image of formed coating film.

The polymerizable unsaturated monomer (c-6) used as a monomer for the (co)polymer (III) is a polymerizable unsaturated monomer having a functional group complementary reactable with the functional group in the polymerizable unsaturated monomer (c-5). More specifically, for example when an epoxy group-containing polymerizable unsaturated monomer is used as the polymerizable unsaturated monomer (c-5), a carboxyl-containing polymerizable unsaturated monomer can be used as the polymerizable unsaturated monomer (c-6). As the carboxyl-containing polymerizable unsaturated monomer, for example, (meth)acrylic acid, maleic acid, fumaric acid, crotonic acid, itaconic acid and β-carboxyethyl acrylate can be named, which can be used either alone or in combination of two or more. Of these, use of acrylic acid or methacrylic acid is preferred.

Where a methylol group-containing polymerizable unsaturated monomer is used as the polymerizable unsaturated monomer (c-5), for example, hydroxyl-containing polymerizable unsaturated monomer can be used as the polymerizable unsaturated monomer (c-6). As the hydroxyl-containing polymerizable unsaturated monomer, for example, 2-hydroxyethyl (meth)acrylate, 2-hydroxypropyl (meth)acrylate, 3-hydroxypropyl (meth)acrylate and 4-hydroxybutyl (meth)acrylate can be named, which can be used either alone or in combination of two or more. Of these, use of 4-hydroxybutyl acrylate is preferred.

Where an alkoxysilyl group-containing polymerizable unsaturated monomer is used as the polymerizable unsaturated monomer (c-5), for example, hydroxyl-containing polymerizable unsaturated monomer can be used as the polymerizable unsaturated monomer (c-6). As the hydroxyl-containing polymerizable unsaturated monomer, for example, above-exemplified hydroxyl-containing polymerizable unsaturated monomers can be named, which can be used either alone or in combination of two or more. Of these, use of 4-hydroxybutyl acrylate is preferred.

Where an isocyanato group-containing polymerizable unsaturated monomer is used as the polymerizable unsaturated monomer (c-5), for example, hydroxyl-containing polymerizable unsaturated monomer can be used as the polymerizable unsaturated monomer (c-6). As the hydroxyl-containing polymerizable unsaturated monomer, for example, above-exemplified hydroxyl-containing polymerizable unsaturated monomers can be named, which can be used either alone or in combination of two or more. Of these, use of 4-hydroxybutyl acrylate is preferred.

In the present specification, polymerizable unsaturated monomers having functional groups which mutually react to self-crosslink are covered by above functional group-containing polymerizable unsaturated monomer (c-5). As such polymerizable unsaturated monomer, for example, aforesaid methylol group-containing polymerizable unsaturated monomers can be named. For example, when such methylol group-containing polymerizable unsaturated monomer is used as the functional group-containing polymerizable unsaturated monomer (c-5), the methylol groups in the methylol group-containing polymerizable unsaturated monomers mutually react and crosslink to form the shell part having the crosslinked structure. In this case, the shell part having the crosslinked structure can be formed in the absence of any polymerizable unsaturated monomer (c-6) having a functional group complementally reactable with the functional group in the polymerizable unsaturated monomer (c-5).

The use ratio of the polymerizable unsaturated monomer (c-6) having a functional group complementally reactable with a functional group in the polymerizable unsaturated monomer (c-5) preferably is, when the polymerizable unsaturated monomer having the functional group (c-5) contains such a polymerizable unsaturated monomer having a functional group reactable with each other to self-crosslink, within a range of generally 0-60 mass %, in particular, 1-30 mass %, inter alia, 2-20 mass %, based on the total amount of the functional group-containing polymerizable unsaturated monomer (c-5), polymerizable unsaturated monomer (c-6) having a functional group complementally reactable with the functional group in the polymerizable unsaturated monomer (c-5) and other polymerizable unsaturated monomer (c-7), from the viewpoint of improving smoothness and distinctness of image of formed coating film.

When the polymerizable unsaturated monomer (c-5) does not contain such a polymerizable unsaturated monomer having a functional group reactable with each other to self-crosslink, the use ratio of the polymerizable unsaturated monomer (c-6) having a functional group complementally reactable with the functional group in the polymerizable unsaturated monomer (c-5) preferably is within a range of generally 0.1-60 mass %, in particular, 1-30 mass %, inter alia, 2-20 mass %, based on the total amount of the functional group-containing polymerizable unsaturated monomer (c-5), polymerizable unsaturated monomer (c-6) having a functional group complementally reactable with the functional group in the polymerizable unsaturated monomer (c-5) and other polymerizable unsaturated monomer (c-7), from the viewpoint of improving smoothness and distinctness of image of formed coating film.

The other polymerizable unsaturated monomer (c-7) to be used as that for the (co)polymer (III) includes polymerizable unsaturated monomers other than the functional group-containing polymerizable unsaturated monomer (c-5) and the polymerizable unsaturated monomer (c-6) having a functional group complementally reactable with the functional group in the polymerizable unsaturated monomer (c-5), examples of which include: alkyl or cycloalkyl (meth)acrylates such as methyl (meth)acrylate, ethyl (meth)acrylate, n-propyl (meth)acrylate, i-propyl (meth)acrylate, n-butyl (meth)acrylate, i-butyl (meth)acrylate, tert-butyl (meth)acrylate, n-hexyl (meth)acrylate, n-octyl (meth)acrylate, 2-ethylhexyl (meth)acrylate, nonyl (meth)acrylate, tridecyl (meth)acrylate, lauryl (meth)acrylate, stearyl (meth)acrylate, isostearyl (meth)acrylate, cyclohexyl (meth)acrylate, methylcyclohexyl (meth)acrylate, t-butylcyclohexyl (meth)acrylate, cyclododecyl (meth)acrylate and tricyclodecanyl (meth)acrylate; polymerizable unsaturated monomers having isobornyl group, such as isobornyl (meth)acrylate; polymerizable unsaturated monomers having adamantyl group, such as adamantyl (meth)acrylate; polymerizable unsaturated monomers having tricyclodecenyl group, such as tricyclodecenyl (meth)acrylate; aromatic ring-containing polymerizable unsaturated monomers such as benzyl (meth)acrylate, styrene, α-methylstyrene and vinyltoluene; perfluoroalkyl (meth)acrylates such as perfluorobutylethyl (meth)acrylate and perfluorooctylethyl (meth)acrylate; polymerizable unsaturated monomers having fluorinated alkyl group such as fluoroolefin; polymerizable unsaturated monomers having photopolymerizable functional group like maleimido group; vinyl compounds such as N-vinylpyrrolidone, ethylene, butadiene, chloroprene, vinyl propionate and vinyl acetate; hydroxyl-containing polymerizable unsaturated monomers such as monoesters of (meth)acrylic acid with $C_{2-8}$ dihydric alcohols such as 2-hydroxyethyl (meth)acrylate, 2-hydroxypropyl (meth)acrylate, 3-hydroxypropyl (meth)acrylate and 4-hydroxybutyl (meth)acrylate, ε-caprolactone-modified monoesters of (meth)acrylic acid with $C_{2-8}$ dihydric alcohols as above, N-hydroxymethyl (meth)acrylamide, allyl alcohol and (meth)acrylate having hydroxyl-terminated polyoxyethylene chain; carboxyl-containing polymerizable unsaturated monomers such as (meth)acrylic acid, maleic acid, crotonic acid and β-carboxyethyl acrylate; nitrogen-containing polymerizable unsaturated monomers such as (meth)acrylonitrile, (meth)acrylamide, N,N-dimethylaminoethyl (meth)acrylate, N,N-diethylaminoethyl (meth)acrylate, N,N-dimethylaminopropyl (meth)acrylamide and addition products of glycidyl (meth)acrylate with amines; and (meth)acrylates having alkoxy-terminated polyoxyethylene chain. These can be used either alone or in combination of two or more:

The monomer(s) for the (co)polymer (III) composed of 0.1-60 mass % of the functional group-containing polymerizable unsaturated monomer (c-5), 0-60 mass % of the polymerizable unsaturated monomer (c-6) having a functional group complementally reactable with the functional group in the polymerizable unsaturated monomer (c-5), and 0-99.9 mass % of the still other polymerizable unsaturated monomer (c-7) preferably contain, as at least a part thereof, hydroxyl-containing polymerizable unsaturated monomer. Hydroxyl-containing polymerizable unsaturated monomer has a function to improve water resistance of coating film, as it introduces hydroxyl groups that react with the curing agent (B) to form crosslinkage into the resulting crosslinked resin particles (C2) and to concurrently improve stability of the crosslinked resin particles (C2) in an aqueous medium.

As the hydroxyl-containing polymerizable unsaturated monomer, for example, those exemplified in the explanation of polymerizable unsaturated monomer (c-6) or the other polymerizable unsaturated monomer (c-7) can be named. These monomers can be used either alone or in combination of two or more.

Of these, 2-hydroxyethyl (meth)acrylate, 2-hydroxypropyl (meth)acrylate, 3-hydroxypropyl (meth)acrylate and 4-hydroxybutyl (meth)acrylate can be conveniently used as the hydroxyl-containing polymerizable unsaturated monomer.

Where the monomer(s) for the (co)polymer (III) contain hydroxyl-containing polymerizable unsaturated monomer, the use ratio of the hydroxyl-containing polymerizable unsaturated monomer preferably is within a range of generally 1-60 mass %, in particular, 2-55 mass %, inter alia, 3-45 mass %, based on the total amount of the functional group-containing polymerizable unsaturated monomer (c-5), polymerizable unsaturated monomer (c-6) having a functional group complementally reactable with the functional group in the polymerizable unsaturated monomer (c-5) and other polymerizable unsaturated monomer (c-7), from the viewpoint of improving stability of the crosslinked resin particles (C2) in an aqueous medium and water resistance of formed coating film.

The monomer(s) for the (co)polymer (III) can also contain, as at least a part thereof, carboxyl-containing polymerizable unsaturated monomer.

As the carboxyl-containing polymerizable unsaturated monomer, for example, those carboxyl-containing polymerizable unsaturated monomers exemplified in the explanation of the other polymerizable unsaturated monomer (c-7) can be named, which can be used either alone or in combination of two or more. Of these, use of acrylic acid and/or methacrylic acid is preferred.

Where the monomer(s) for the (co)polymer (III) contain carboxyl-containing polymerizable unsaturated monomer, the use ratio of the carboxyl-containing polymerizable unsaturated monomer preferably is within a range of generally 1-30 mass %, in particular, 1-15 mass %, inter alia, 1-5 mass %, based on the total amount of the functional group-containing polymerizable unsaturated monomer (c-5), polymerizable unsaturated monomer (c-6) having a functional group complementally reactable with the functional group in the polymerizable unsaturated monomer (c-5) and other polymerizable unsaturated monomer (c-7), from the viewpoint of excellent stability of the crosslinked resin particles (C2) in an aqueous medium.

The other polymerizable unsaturated monomer (c-7) furthermore preferably contains, as at least a part thereof, $C_1$ or $C_2$ alkyl group-containing polymerizable unsaturated monomer, from the viewpoint of improving water resistance of formed coating film.

As the polymerizable unsaturated monomer having $C_1$ or $C_2$ alkyl group, for example, methyl (meth)acrylate and ethyl (meth)acrylate can be named. These monomers can be used either alone or in combination of two or more.

As the polymerizable unsaturated monomer having $C_1$ or $C_2$ alkyl group, use of methyl methacrylate and/or ethyl methacrylate, in particular, use of methyl methacrylate, is preferred from the viewpoint of improving smoothness, distinctness of image and water resistance of formed coating film.

Where the other polymerizable unsaturated monomer (c-7) contains the polymerizable unsaturated monomer having $C_1$ or $C_2$ alkyl group, the use ratio of the polymerizable unsaturated group having $C_1$ or $C_2$ alkyl group preferably is within a range of generally 20-99.9 mass %, in particular, 30-99.5 mass %, inter alia, 40-99 mass %, based on the total amount of the functional group-containing polymerizable unsaturated monomer (c-5), polymerizable unsaturated monomer (c-6) having a functional group complementally reactable with the functional group in the polymerizable unsaturated monomer (c-5) and other polymerizable unsaturated monomer (c-7), from the viewpoint of improving smoothness and distinctness of image of formed coating film.

The ratio of the (co)polymer (I)/(co)polymer (III) in the crosslinked resin particles (C2) preferably is, in terms of solid mass ratio, within a range of generally 5/95-95/5, in particular, 50/50-90/10, inter alia, 65/35-85/15, from the viewpoint of improving smoothness of coating film.

The crosslinked resin particles (C2) preferably have a hydroxyl value within a range of generally 1-150 mgKOH/g, in particular, 2-100 mgKOH/g, inter alia, 5-60 mgKOH/g, from the viewpoint of excellent water resistance of formed coating film. From the viewpoint of excellent smoothness and distinctness of image of the coating film, the crosslinked resin particles (C2) furthermore preferably have an acid value within a range of generally 0-50 mgKOH/g, in particular, 0-20 mgKOH/g. In particular, it is advantageous that the acid value is from 0 mgKOH/g to less than 10 mgKOH/g, and more advantageously, from 0 mgKOH/g to less than 2 mgKOH/g.

In the water-based paint compositions of the present invention, the (co)polymer (I) obtained by (co)polymerization of polymerizable unsaturated monomer (c-1) having $C_{4-22}$ alkyl and other polymerizable unsaturated monomer (c-2) preferably has a glass transition temperature ($Tg_1$) within a range of normally from −65 to −10° C., in particular, from −60 to −20°

C., inter alia, from −55 to −40° C., from the viewpoint of smoothness and distinctness of image formed coating film.

Also from the viewpoint of excellent smoothness and distinctness of image of formed coating film, the (co)polymer (III), which is obtained by (co)polymerizing the functional group-containing polymerizable unsaturated monomer (c-5), polymerizable unsaturated monomer (c-6) having a functional group complementally reactable with the functional group in the polymerizable unsaturated monomer (c-5) and other polymerizable unsaturated monomer (c-7), preferably has a glass transition temperature ($Tg_3$) within a range of generally from −50 to 150° C., in particular, from −5 to 120° C., inter alia, from 10 to 110° C.

Again from the viewpoint of excellent smoothness and distinctness of image of formed coating film, it is preferable that $Tg_3$ is greater than $Tg_1$ and the difference between $Tg_3$ and $Tg_1$ is within a range of generally 5-200° C., in particular, 30-180° C., inter alia 50-160° C.

The crosslinked resin particles (C2) can be produced by, for example, emulsion copolymerizing a monomer mixture containing 30-100 mass % of the polymerizable unsaturated monomer (c-1) having $C_{4-22}$ alkyl group and 0-70 mass % of other polymerizable unsaturated monomer (c-2), adding to the resulting emulsion containing the (co)polymer (I) a monomer mixture of 0.1-60 mass % of functional group-containing monomer (c-5), 0-60 mass % of polymerizable unsaturated monomer (c-6) having a functional group complementally reactable with the functional group in the polymerizable unsaturated monomer (c-5) and 0-99.9 mass % of still other polymerizable unsaturated monomer (c-7), and forming the (co)polymer (III) by further emulsion polymerization.

The emulsion polymerization for making an emulsion of the (co)polymer (I) can be carried out by the means known per se, for example, seed polymerization process, mini-emulsion polymerization process or the like, e.g., by emulsion polymerization of the monomer mixture using a polymerization initiator in the presence of an emulsifier.

As the emulsifier, anionic or nonionic emulsifiers are suitable. Examples of anionic emulsifier include sodium salts or ammonium salts of such acids as alkylsulfonic acid, alkylbenzenesulfonic acid, alkylphosphoric acid and the like, and examples of nonionic emulsifier include polyoxyethylene oleyl ether, polyoxyethylene stearyl ether, polyoxyethylene lauryl ether, polyoxyethylene tridecyl ether, polyoxyethylene phenyl ether, polyoxyethylene nonylphenyl ether, polyoxyethylene octylphenyl ether, polyoxyethylene monolaurate, polyoxyethylene monostearate, polyoxyethylene monooleate, sorbitan monolaurate, sorbitan monostearate, sorbitan tristearate, sorbitan trioleate, polyoxyethylene sorbitan monolaurate and the like. It is also permissible to use polyoxyalkylene group-containing anionic emulsifier containing an anionic group and polyoxyalkylene group such as polyoxyethylene, polyoxypropylene or the like group per molecule, or reactive anionic emulsifier containing an anionic group and polymerizable unsaturated group per molecule.

The emulsifier can be used within a range of normally 0.1-15 mass %, preferably 0.5-10 mass %, inter alia, 1-5 mass %, based on the total mass of all of the monomers used.

As the polymerization initiator, for example, organic peroxides such as benzoyl peroxide, octanoyl peroxide, lauroyl peroxide, stearoyl peroxide, cumene hydroperoxide, tert-butyl peroxide, tert-butyl peroxylaurate, tert-butyl peroxyisopropylcarbonate, tert-butyl peroxyacetate, diisopropylbenzene hydroperoxide and the like; azo compounds such as azobisisobutyronitrile, azobis(2,4-dimethylvaleronitrile), azobis(2-methylpropionitrile), azobis(2-methylbutyronitrile), 4,4'-azobis(4-cyanobutanoic acid), dimethylazobis(2-methyl propionate), azobis[2-methyl-N-(2-hydroxyethyl)-propionamide], azobis{2-methyl-N-[2-(1-hydroxybutyl)]-propionamide} and the like; and persulfates such as potassium persulfate, ammonium persulfate, sodium persulfate and the like. These polymerization initiators can be used either alone or in combination of two or more. Furthermore, where necessary, such a polymerization initiator may be co-used with reducing agent such as sugar, sodium formaldehyde sulfoxylate, iron complex and the like to form a redox initiator.

The polymerization initiator is preferably used within a range of normally around 0.1-5 mass %, in particular, around 0.2-3 mass %, based on the total mass of all of the monomers used. Method of adding the polymerization initiator is not particularly limited and can be suitably selected according to its kind and amount. For example, it may be advancedly contained in the monomer mixture or aqueous medium, or may be added in lump or dropwise at the time of polymerization.

The monomer mixture may contain chain transfer agent, for adjusting molecular weight of resulting crosslinked resin particles (C2). The chain transfer agent includes mercapto group-containing compounds, specific examples including lauryl mercaptan, t-dodecylmercaptan, octylmercaptan, 2-ethylhexyl thioglycolate, 2-methyl-5-tert-butylthiophenol, mercaptoethanol, thioglycerol, mercaptoacetic acid (thioglycolic acid), mercaptopropionate, n-octyl-3-mercaptopropionate and the like. When the chain transfer agent is used, its suitable use ratio is normally within a range of 0.05-10 mass %, in particular, 0.1-5 mass %, based on the total amount of all the monomers used.

Where necessary, the monomer mixture may be blended with organic solvent, for example, long chain saturated hydrocarbon solvent such as hexadecane or long chain alcoholic solvent such as hexadecanol.

The crosslinked resin particles (C2) can be formed by adding to the emulsion of (co)polymer (I) as obtained in the above a monomer mixture of the functional group-containing polymerizable unsaturated monomer (c-5), polymerizable unsaturated monomer (c-6) having a functional group complementally reactable with the functional group in the polymerizable saturated monomer (c-5) and other polymerizable saturated monomer (c-7), and further polymerizing the system to form the (co)polymer (III).

The monomer mixture for forming the (co)polymer (III) can suitably contain such components as the emulsifier, polymerization initiator, reducing agent, chain transfer agent and the like, where necessary. The monomer mixture may be added dropwise as it is, but it is generally desirable to disperse it in an aqueous medium and to add the resultant monomeric emulsion dropwise. The particle size of the monomeric emulsion in this case is not particularly limited.

As polymerization method of the monomer mixture for forming the (co)polymer (III), for example, one comprising adding the monomer mixture or emulsion thereof in lump or slowly to the emulsion of (co)polymer (I) and heating the same to an adequate temperature under stirring can be adopted.

Thus obtained crosslinked resin particles (C2) normally have a multilayer structure having as the core part the (co)polymer (I) of the monomer mixture of the polymerizable unsaturated monomer (c-1) having $C_{4-22}$ alkyl group and other polymerizable unsaturated monomer (c-2) and, as the shell part, the (co)polymer (III) of the functional group-containing polymerizable unsaturated monomer (c-5), polymerizable unsaturated monomer (c-6) having a functional group complementally reactable with the functional group in the polymerizable unsaturated monomer (c-5) and other polymerizable unsaturated monomer (c-7).

The crosslinked resin particles (C2), furthermore, may be caused to consist of three or more layers, by adding a step or steps comprising supplying polymerizable unsaturated monomer (one or a mixture of at least two monomers) to form other layer(s) and emulsion polymerizing the monomer(s), between the step of obtaining the (co)polymer (I) and the step of obtaining the (co)polymer (III).

In the present invention, "shell part" of the crosslinked resin particles (C2) signifies the polymeric layer present as the outermost layer of each resin particle, "core part" signifies the polymeric layer(s) inside the resin particles other than the shell part, and "core/shell structure", a structure having the core part and the shell part. The core/shell structure in general takes layer structure such that the core part is completely covered by the shell part, but depending on the mass ratio of the core part to the shell part, it may occur that the amount of the monomer for the shell part is insufficient for forming the layer structure. In that case, a complete layer structure as above is not essential but a structure, wherein the shell partially covers the core or the polymerizable unsaturated monomers which are the constituent elements of the shell are graftpolymerized at a part of the core, may be taken. The concept of the multilayer structure of above core/shell structure is applicable similar to the case wherein the multilayer structure is formed as the core in the crosslinked resin particles (C2) of the present invention.

The crosslinked resin particles (C2) can have an average particle size within a range of generally 0.01-5 μm, preferably 0.05-3.5 μm, inter alia, 0.1-1 μm.

In the present specification, the average particle size of the crosslinked resin particles (C2) is the value measured of the particles which are diluted with deionized water according to the accepted practice at 20° C., with a submicron particle size distribution measuring device. As the submicron particle size distribution analyser, for example, COULTER N4 Model (tradename, Beckman Coulter, Inc.) can be used.

Where the crosslinked resin particles (C2) contain acidic groups such as carboxyl group, it is desirable to neutralize the acidic groups with a neutralizer to improve mechanical stability of the crosslinked resin particles (C2). The neutralizer is subject to no particular limitation, so long as it can neutralize acidic groups. Examples of the neutralizer include sodium hydroxide, potassium hydroxide, trimethylamine, 2-(dimethylamino)ethanol, 2-amino-2-methyl-1-propanol, triethylamine, aqueous ammonia and the like. These neutralizers are desirably used in an amount to render pH of the aqueous dispersion of crosslinked resin particles (C2) after the neutralization around 6.0-9.0.

Water-based Paint Compositions

The water-based paint compositions according to the invention are formed of above-described aqueous film-forming resin (A), curing agent (B) and crosslinked resin particles (C), as contained in an aqueous medium.

The blend ratios of the aqueous film-forming resin (A), curing agent (B) and crosslinked resin particles (C) preferably are within the following ranges, per 100 mass parts in total of the aqueous film-forming resin (A) and curing agent (B):

aqueous film-forming resin (A): 30-95 mass parts, preferably 50-90 mass parts, inter alia, 60-80 mass parts;
curing agent (B): 5-70 mass parts, preferably 10-50 mass parts, inter alia, 20-40 mass parts;
crosslinked resin particles (C): 1-100 mass parts, preferably 5-50 mass parts, inter alia, 10-40 mass parts.

The water-based paint compositions of the present invention furthermore preferably contain pigment (D). As the pigment (D), for example, coloring pigment, extender pigment, effect pigment and the like can be named. Pigment (D) is used either alone or in combination of two or more.

Where the water-based paint compositions of the invention contain pigment (D), the blended amount of the pigment (D) can be within a range of generally 1-200 mass parts, preferably 20-150 mass parts, inter alia, 50-120 mass parts, per 100 mass parts in total of the aqueous film-forming resin (A), curing agent (B) and crosslinked resin particles (C) in individual water-based paint composition according to the invention.

As the coloring pigment, for example, titanium dioxide, zinc oxide, carbon black, molybdenum red, Prussian Blue, cobalt blue, azo pigment, phthalocyanine pigment, quinacridone pigment, isoindoline pigment, vat pigment, perylene pigment and the like can be named, among which titanium dioxide and carbon black can be conveniently used.

Where a water-based paint composition according to the present invention contains coloring pigment, the blended amount of the coloring pigment can be within a range of normally 1-120 mass parts, preferably 3-100 mass parts, inter alia, 5-90 mass parts, per 100 mass parts in total of the aqueous film-forming resin (A), curing agent (B) and crosslinked resin particles (C) in the water-based paint composition of the present invention.

As the extender pigment, for example, clay, kaolin, barium sulfate, barium carbonate, calcium carbonate, talc, silica and alumina white can be named. Of those, use of barium sulfate and/or talc is preferred. It is advantageous for the composition to contain as the extender pigment the barium sulfate having an average primary particle size not more than 1 μM, in particular, that within a range of 0.01-0.8 μm, for obtaining a multilayer coating film of excellent smoothness, and of excellent appearance with high flip-flop property and little metallic mottling when a paint containing effect pigment is used as the water-based base coat paint or water-based top coat paint.

The average primary particle size of barium sulfate as referred to in this invention is the value determined by observing barium sulfate with scanning type electron microscope and averaging the maximum diameters of 20 barium sulfate particles present on a randomly drawn straight line on the electron micrograph.

Where a water-based paint composition of the present invention contains above extender pigment, the blended amount of the extender pigment can be within a range of normally 1-120 mass parts, preferably 5-100 mass parts, inter alia, 10-80 mass parts, per 100 mass parts in total of the aqueous film-forming resin (A), curing agent (B) and crosslinked resin particles (C) in the water-based paint composition of the present invention.

Also as the effect pigment, for example, aluminum (including vapor-deposited aluminum), copper, zinc, brass, nickel, aluminum oxide, mica, aluminum oxide covered with titanium oxide or iron oxide, mica covered with titanium oxide or iron oxide, glass flakes, hologram pigment and the like can be named. These effect pigments can be used either alone or in combination of two or more. While aluminum pigment includes leafing type aluminum and non-leafing type aluminum, both types are useful.

Where a water-based paint composition of the present invention contains such effect pigment, the blended amount of the effect pigment can be within a range of normally 1-50 mass parts, preferably 2-30 mass parts, inter alia, 3-20 mass parts, per 100 mass parts in total of the aqueous film-forming resin (A), curing agent (B) and crosslinked resin particles (C) in the water-based paint composition of the present invention.

From the viewpoint of improving smoothness and distinctness of image, water-based paint compositions of the invention preferably further contain hydrophobic solvent (E).

As the hydrophobic solvent (E,) an organic solvent whose mass soluble in 100 g of water at 20° C. is not more than 10 g, preferably not more than 5 g, inter alia, not more than 1 g, is preferred, examples of which include hydrocarbon solvents such as rubber gasoline, mineral spirit, toluene, xylene, solvent naphtha and the like; alcoholic solvents such as 1-hexanol, 1-octanol, 2-octanol, 2-ethyl-1-hexanol, 1-decanol, benzyl alcohol, ethylene glycol mono-2-ethylhexyl ether, propylene glycol mono-n-butyl ether, dipropylene glycol mono-n-butyl ether, tripropylene glycol mono-n-butyl ether, propylene glycol mono-2-ethylhexyl ether, propylene glycol monophenyl ether and the like; ester solvents such as n-butyl acetate, isobutyl acetate, isoamyl acetate, methylamyl acetate, ethylene glycol acetate monobutyl ether and the like; and ketone solvents such as methyl isobutyl ketone, cyclohexanone, ethyl n-amyl ketone, diisobutyl ketone and the like. These can be used either alone or in combination of two or more.

As the hydrophobic solvent (E), use of alcoholic hydrophobic solvent is preferred. In particular, $C_{7-14}$ alcoholic hydrophobic solvents, inter alia, at least one alcoholic solvent selected from the group consisting of 1-octanol, 2-octanol, 2-ethyl-1-hexanol, ethylene glycol mono-2-ethylhexyl ether, propylene glycol mono-n-butyl ether and dipropylene glycol mono-n-butyl ether, are preferred.

Where a water-based paint composition of the present invention contains such hydrophobic solvent (E), its blended amount is preferably within a range of generally 3-50 mass parts, in particular, 5-40 mass parts, inter alia, 8-30 mass parts, per 100 mass parts in total of the aqueous film-forming resin (A), curing agent (B) and crosslinked resin particles (C).

From the viewpoint of improving smoothness and distinctness of image of the formed coating film, the water-based paint compositions of the present invention can furthermore contain the diester compound (F) represented by the following general formula (1);

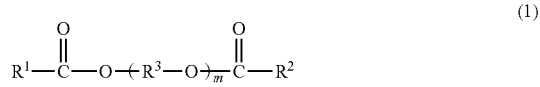
(1)

in the formula, $R^1$ and $R^2$ each independently stands for $C_{4-18}$ hydrocarbon group, $R^3$ stands for $C_{2-4}$ alkylene group, m is an integer of 3-25, and the m $R^3$s may be the same or different.

As the hydrocarbon groups, $C_{5-11}$ alkyl groups, in particular, $C_{5-9}$ alkyl groups, inter alia, $C_{6-8}$ alkyl groups, are preferred. Especially when the $R^1$ and $R^2$ are $C_{6-8}$ branched alkyl groups, excellent smoothness and distinctness of image can be imparted to the formed coating film, even after the paint was stored for a relatively long time before its application.

Above diester compound (F) can be obtained, for example, by diesterification reaction of polyoxyalkylene glycol having two terminal hydroxyl groups with monocarboxylic acid having $C_{4-18}$ hydrocarbon group.

Examples of the polyoxyalkylene glycol include polyethylene glycol, polypropylene glycol, polyethylene glycol/propylene glycol copolymer, polybutylene glycol and the like, polyethylene glycol being particularly preferred among these. These polyoxyalkylene glycols preferably have a number-average molecular weight within a range of generally 100-1,200, in particular, 150-600, inter alia, 200-400.

Monocarboxylic acid having $C_{4-18}$ hydrocarbon group includes, for example, pentanoic acid, hexanoic acid, 2-ethylbutanoic acid, 3-methylpentanoic acid, benzoic acid, cyclohexanecarboxylic acid, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, decanoic acid, 2-ethyloctanoic acid, 4-ethyloctanoic acid, dodecanoic acid, hexadecanoic acid and octadecanoic acid. Of those, monocarboxylic acid having $C_{5-9}$ alkyl groups, such as hexanoic acid, heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid, decanoic acid, 2-ethyloctanoic acid, 4-ethyloctanoic acid and the like are preferred. In particular, monocarboxylic acid having $C_{6-8}$ alkyl groups, such as heptanoic acid, 2-ethylpentanoic acid, 3-ethylpentanoic acid, octanoic acid, 2-ethylhexanoic acid, 4-ethylhexanoic acid, nonanoic acid, 2-ethylheptanoic acid and the like are more favorable, and monocarboxylic acid having $C_{6-8}$ branched alkyl groups, such as 2-ethylpentanoic acid, 3-ethylpentanoic acid, 2-ethylhexanoic acid, 4-ethylhexanoic acid, 2-ethylheptanoic acid and the like are the most favorable.

The diesterification reaction of the polyoxyalkylene glycol with monocarboxylic acid having $C_{4-18}$ hydrocarbon group can be carried out by the means known per se. The polyoxyalkylene glycol and the monocarboxylic acid having $C_{4-18}$ hydrocarbon group can be each used either alone or in combination of two or more. The resultant diester compound (F) preferably has a molecular weight within a range of generally 320-1,400, in particular, 450-1,000, inter alia, 500-800, and 500-700 for the best.

Where the water-based paint composition of the invention contains the diester compound (F), its blended amount preferably is within a range of generally 1-30 mass parts, in particular, 3-20 mass parts, inter alia, 5-15 mass parts, per 100 mass parts of the total solid content of the aqueous film-forming resin (A), curing agent (B) and crosslinked resin particles (C).

The water-based paint compositions of the invention can further contain, where necessary, paint additives such as thickener, curing catalyst, UV absorber, light stabilizer, defoaming agent, plasticizing agent, organic solvent other than the hydrophobic solvent (E), surface regulating agent, antisettling agent and the like.

As the thickener, for example, inorganic thickeners such as silicate, metal silicate, montmorillonite, colloidal alumina and the like; polyacrylic acid thickeners such as copolymers of (meth)acrylic acid with (meth)acrylic acid esters, sodium polyacrylate and the like; association type thickeners having hydrophilic moiety and hydrophobic moiety per molecule, which exhibit effective thickening action as the hydrophobic moiety adsorbs onto surfaces of the pigment or emulsion particles in the paint or the hydrophobic moieties mutually associate, in an aqueous medium; cellulose derivative thickeners such as carboxymethyl cellulose, methyl cellulose, hydroxyethyl cellulose and the like; protein thickeners such as casein, sodium caseinate, ammonium caseinate and the like; alginic acid thickeners such as sodium alginate; polyvinyl thickeners such as polyvinyl alcohol, polyvinylpyrrolidone, polyvinyl benzyl ether copolymers and the like; polyether thickeners such as Pluronic polyether, polyether dialkyl ester, polyether dialkyl ether, polyether epoxy-modified products and the like; maleic anhydride copolymer thickeners such as partial esters of vinyl methyl ether-maleic anhydride copolymers; and polyamide thickeners such as polyamide amine salts and the like can be named.

Polyacrylic acid thickeners are commercially available, under the tradenames as, for example, PRIMAL ASE-60, PRIMAL TT-615 and PRIMAL RM-5 of Rohm & Haas Co.; SN Thickener 613, SN Thickener 618, SN Thickener 630, SN Thickener 634, SN Thickener 636 of SAN NOPCO, Ltd. and the like. As commercially available association type thickeners, for example, UH-420, UH-450, UH-462, UH-472, UH-540, UH-752, UH-756 VF and UH-814N (all tradenames) of ADEKA Corporation; PRIMAL RM-8W, PRIMAL RM-825, PRIMAL RM-2020 NPR, PRIMAL RM-12W and PRIMAL SCT-275 (all tradenames) of Rohm & Haas Co.; SN Thickener 612, SN Thickener 621N, SN Thickener 625N, SN Thickener 627N and SN Thickener 660T (all tradenames) of SAN NOPCO, Ltd. can be named.

As the thickener, polyacrylic acid thickeners and/or association type thickeners, in particular, association type thickeners, inter alia, urethane association type thickener having terminal hydrophobic group and containing urethane linkage in its molecular chain, are preferred. As such urethane association type thickeners, for example, UH-420, UH-462, UH-472, UH-540, UH-752, UH-756 VF and UH-814N (all tradenames) of ADEKA Corporation; SN Thickener 612, SN Thickener 621N, SN Thickener 625N, SN Thickener 627N and SN Thickener 660T (all tradenames) of SAN NOPCO, Ltd. (all tradenames) can be named.

Where a water-based paint composition of the present invention contains such a thickener, the amount of the thickener to be blended is suitably within a range of normally 0.01-10 mass parts, in particular, 0.05-3 mass parts, inter alia, 0.1-2 mass parts, per 100 mass parts in total of the solid content of the aqueous film-forming resin (A), curing agent (B) and crosslinked resin particles (C).

Preparation of Water-based Paint Compositions

Water-based paint compositions of the invention can be prepared by mixing and dispersing in an aqueous medium the aqueous film-forming resin (A), curing agent (B) and crosslinked resin particles (C), and where necessary, pigment (D), hydrophobic solvent (E), diester compound (F) and other paint additives, by the means known per se. As the aqueous medium, deionized water or a mixture of deionized water and hydrophilic organic solvent can be used. As the hydrophilic organic solvent, for example, propylene glycol monomethyl ether and the like can be named.

The water-based paint compositions of the invention can have a solid concentration within a range of generally 30-80 mass %, preferably 40-70 mass %, inter alia, 45-60 mass %.

Coating Film-forming Method

The water-based paint compositions of the present invention can be applied onto various coating objects, whereby forming coating film excelling in smoothness, distinctness of image, water resistance and chipping resistance. In particular, because the water-based paint compositions of the invention are capable of forming multilayer coating film of excellent smoothness, distinctness of image, water resistance and chipping resistance, their use as the water-based paint for underlayer coating film in multilayer coating film-forming method of recoating water-based paints one on the other is advantageous.

Coating Objects

The coating objects to which the water-based paint compositions of the invention are applicable are subject to no particular limitation. By way of example, outer panel portions of car bodies such as of automobiles, trucks, motorcycles, buses and the like; car parts; outer panel portions of mobile phones, audio instruments and the like can be named. Of these, outer panel portions of cars and car parts are preferred.

Materials of such coating objects are not particularly limited and include, for example, metallic materials such as iron, aluminium, brass, copper, tin plate, stainless steel, zinc-plated steel, zinc alloys (Zn—Al, Zn—Ni, Zn—Fe and the like), and plated steel; plastic materials such as resins, e.g., poyethylene resin, polypropylene resin, acrylonitrile-butadiene-styrene (ABS) resin, polyamide resin, acrylic resin, vinylidene chloride resin, polycarbonate resin, polyurethane resin and epoxy resin, and various FRP's; inorganic materials such as glass, cement, concrete and the like; wood; and fibrous materials such as paper, cloth and the like. Of these, metallic materials and plastic materials are preferred as the coating objects.

The coating objects may also be metallic surfaces of such metallic substrates as outer panel portions of car bodies, house electric appliances, sheet steel constituting the foregoing and the like, said surfaces having been given a surface treatment such as phosphate treatment, chromate treatment, complex oxide treatment or the like. Furthermore, the coating objects may be such metallic surfaces on which an undercoat film and/or intermediate coat film is formed. Of these, car bodies onto which an undercoat film has been applied with electrodeposition paint are preferred, car bodies onto which an undercoat film has been applied with a cationic electrodeposition paint being particularly preferred.

Coating Method

Coating method of the water-based paint compositions of the present invention is subject to no particular limitation and, for example, air spray coating, airless spray coating, rotary atomizing coating, curtain flow coating and the like may be used. Wet coating films can be formed by these methods. Of these, air spray coating and rotary atomizing coating are preferred. During the coating, static electricity may be impressed where necessary.

The application rate of a water-based paint composition of the present invention can be such that will form its cured coating film having a thickness within a range of normally about 5-about 70 µm, preferably about 10-about 50 µm, inter alia, about 20-about 40 µm.

Curing of wet coating film can be effected by heating, after applying a present water-based paint composition of the invention onto a coating object. Heating can be given by per se known heating means, for example, drying oven such as hot air oven, electric oven or infrared ray induction heating oven. Suitable heating temperature normally ranges about 80-about 180° C., preferably about 100-about 170° C., inter alia, about 120-about 160° C. While the heating time is not critical, it can be normally around 10-60 minutes, preferably around 20-40 minutes.

After applying a water-based paint composition of the invention, it is preferred to perform, before effecting the heat-curing, preheating, air blowing or the like under such heating conditions as will not substantially cure the coating film, for preventing occurrence of defect in the coating film such as foaming. The preheating temperature normally ranges about 40-about 100° C., preferably about 50-about 90° C., inter alia, about 60-about 80° C. The preheating time can range normally around 30 seconds-15 minutes, preferably around 1-10 minutes, inter alia, around 2-5 minutes. The air blowing can be carried out by blowing against the coated surface of the coating object, normally air of ambient temperature or air heated to a temperature of 25-about 80° C., for around 30 seconds-15 minutes.

The water-based paint compositions of the present invention can be conveniently used for forming intermediate coating film, when a multilayer coating film composed of intermediate coating film and top coat film is formed by 2-coat-1-bake system. The coating film-forming method in this case can be carried out according to the following method I.

Method I

A coating film-forming method comprising
(1) a step of applying a water-based paint composition of the invention onto a coating object to form an intermediate coating film,
(2) a step of applying onto the formed uncured intermediate coating film a water-based top coat paint composition to form a top coating film, and
(3) a step of simultaneously heat-curing the formed uncured intermediate coating film and uncured top coating film.

As the coating object in the above method I, car bodies or the like on which an undercoat film of cationic electrodeposition paint has been formed are preferred. In the present specification, "uncured coating film" includes coating film in set-to-touch dry condition and that in semi-cured dry condition.

When a water-based paint composition of the invention is applied by the 2-coat-1-bake system of the method I, its coated film thickness in terms of cured film thickness preferably is within a range of normally about 5-about 60 μm, in particular, about 10-about 50 inter alia, about 15-about 40 μm. Also the coated film thickness in terms of cured film thickness of the water-based top coat paint composition is preferably within a range of about 10-about 80 μm, in particular, about 15-about 60 μm, inter alia, about 20-about 50 μm.

Also in the method I, after applying a water-based paint composition of the invention, it is preferred to carry out preheating or air blowing under the heating conditions as will not substantially cure the coating film, to prevent occurrence of defect in the coating film such as foaming. The preheating temperature normally ranges about 40-about 100° C., preferably about 50-about 90° C., inter alia, about 60-about 80° C. The preheating time can range normally around 30 seconds-15 minutes, preferably around 1-10 minutes, inter alia, around 2-5 minutes. The air blowing can be normally carried out by blowing against the coated surface of the coating object, air of ambient temperature or air heated to a temperature of 25-about 80° C., for around 30 seconds-15 minutes. It is also preferred to perform above preheating, air blowing or the like under the heating conditions as will not substantially cure the coating film, after applying the above water-based top coat paint composition.

The heat-curing of the two uncured coating films of the intermediate coating film and top coating film can be performed by above-described means known per se. The heating temperature can be within a range of normally about 80-about 180° C., preferably about 100-about 170° C., inter alia, about 120-about 160° C. The heating time is not particularly limited, while normally around 10-60 minutes, in particular, around 20-40 minutes, are preferred. By this heating, the two coating films of intermediate coating film and top coating film can be simultaneously cured.

The water-based top coat paint composition used in the above method I generally aims at imparting excellent appearance to the coated objects, and any of known thermosetting water-based top coat paint compositions for car bodies or the like can be used. For example, those paints formulated by dissolving or dispersing in water, resin component composed of a base resin having crosslinkable functional groups such as carboxyl, hydroxyl or the like, such as acrylic resin, polyester resin, alkyd resin, urethane resin, epoxy resin or the like; and a curing agent such as optionally blocked polyisocyanate compound, melamine resin, urea resin or the like; concurrently with pigment and other additives, can be used. In particular, thermosetting water-based paint comprising the hydroxyl-containing polyester resin (A1) and/or hydroxyl-containing acrylic resin (A2) as the base resin and melamine resin as the curing agent can be suitably used.

As the pigment, earlier described coloring pigment, extender pigment, effect pigment and the like can be used. In particular, the water-based top coat paint composition preferably contains coloring pigment, as at least one of the pigments.

As the coloring pigments, for example, titanium oxide, zinc oxide, carbon black, molybdenum red, Prussian Blue, cobalt blue, azo pigment, phthalocyanine pigment, quinacridone pigment, isoindoline pigment, vat pigment, perylene pigment and the like, as exemplified in the explanation of the water-based paint compositions of the invention can be named.

Where the water-based top coat paint composition contains such coloring pigment, the blended amount of the coloring pigment can be within a range of normally 1-120 mass parts, preferably 3-100 mass parts, inter alia, 5-90 mass parts, per 100 mass parts of the solid resin content in the water-based top coat paint composition.

The water-based top coat paint composition furthermore can contain, where necessary, ordinary paint additives such as curing catalyst, thickener, UV absorber, light stabilizer, defoamer, plasticizer, organic solvent, surface-regulating agent, antisettling agent and the like, either alone or in combination of two or more.

The water-based paint compositions of the present invention can be conveniently used for forming intermediate coating film, when a multilayer coating film composed of intermediate coating film, base coating film and top coating film is formed by 3-coat-1-bake system. The coating film-forming method in this case can be carried out according to the following method II.

Method II

A coating film-forming method comprising
(1) a step of applying a water-based paint composition of the invention onto a coating object to form an intermediate coating film,
(2) a step of applying onto the formed uncured intermediate coating film a water-based base coat paint composition to form a base coating film,
(3) a step of applying onto the formed uncured base coating film a clear paint composition to form a clear coating film, and
(4) a step of simultaneously heat-curing the formed uncured intermediate coating film, uncured base coating film and uncured clear coating film.

As the coating object in the above method II, car bodies or the like on which an undercoat film of cationic electrodeposition paint has been formed.

In the method II, the coated film thickness of a water-based paint composition of the present invention in terms of cured film thickness preferably is within a range of normally about 5-about 60 μm, in particular, about 10-about 50 μm, inter alia, about 15-about 40 μm. Also the coated film thickness in terms of cured film thickness of the water-based base coat paint composition is preferably within a range of normally about 5-about 30 μm, in particular, about 8-about 25 μm, inter alia, about 10-about 20 μm; and the coated film thickness of the clear paint composition in terms of cured coating film thickness is preferably within a range of about 10-about 80 μm, in particular, about 15-about 60 μm, inter alia, about 20 about 50 μm.

Also in the method II, after applying a water-based paint composition of the invention, it is preferred to carry out preheating or air blowing under the heating conditions as will not substantially cure the coating film, to prevent occurrence of defect in the coating film such as foaming. The preheating temperature normally ranges about 40-about 100° C., preferably about 50-about 90° C., inter alia, about 60-about 80° C. The preheating time can range normally around 30 seconds-15 minutes, preferably around 1-10 minutes, inter alia, around 2-5 minutes. The air blowing can be normally carried out by blowing against the coated surface of the coating object, air of ambient temperature or air heated to a temperature of 25-about 80° C., for around 30 seconds-15 minutes.

It is also preferred to perform above preheating, air blowing or the like under the heating conditions as will not substantially cure the coating film, after applying the above water-based base coat paint composition.

Furthermore, after applying the clear paint composition, an interval at room temperature of around 1-60 minutes may be taken or preheating at about 40-about 80° C. for about 1-60 minutes may be given, where necessary.

The heat-curing of the 3-layered coating film consisting of above uncured intermediate coat film, uncured base coat film and uncured top coat film can be carried out by per se known heating means as previously described. The heating temperature can be within a range of normally about 80-about 180° C., preferably about 100-about 170° C., inter alia, about 120-about 160° C. While the heating time is not particularly limited, it can be normally around 10-60 minutes, preferably around 20-40 minutes. By this heating the 3-layered coating film formed of the intermediate coat film, base coat film and clear coat film can be simultaneously cured.

As the water-based base coat paint composition used in the method II, any of thermosetting water-based base coat paint compositions known as those for car bodies and the like can be used. For example, those paints formulated by dissolving or dispersing in water, resin component composed of a base resin having crosslinkable functional groups such as carboxyl, hydroxyl or the like, such as acrylic resin, polyester resin, alkyd resin, urethane resin, epoxy resin or the like; and a curing agent such as optionally blocked polyisocyanate compound, melamine resin, urea resin or the like; concurrently with pigment and other additives, can be used. In particular, thermosetting water-based paint comprising the hydroxyl-containing polyester resin (A1) and/or hydroxyl-containing acrylic resin (A2) as the base resin and melamine resin as the curing agent can be suitably used.

As the pigment, earlier described coloring pigment, extender pigment, effect pigment and the like can be used. In particular, the water-based base coat paint composition preferably contains effect pigment, as at least one of the pigments.

As the effect pigment, for example, aluminum (including vapor-deposited aluminum), copper, zinc, brass, nickel, aluminum oxide, mica, aluminum oxide covered with titanium oxide or iron oxide, mica covered with titanium oxide or iron oxide, glass flakes, hologram pigment and the like can be named. Of these, use of aluminum, aluminum oxide, mica, aluminum oxide coated with titanium oxide or iron oxide, and mica coated with titanium oxide or iron oxide is preferred, in particular, use of aluminum being preferred. These effect pigments can be used either alone or in combination of two or more.

It is also preferred that the effect pigment is flaky. As the effect pigments, those having the longitudinal dimension within a range of normally 1-100 μm, in particular, 5-40 μm, and the thickness, within a range of normally 0.0001-5 μm, in particular, 0.001-2 μm are suitable.

Where the water-based base coat paint composition contains effect pigment, the blended amount of the effect pigment preferably is within a range of normally 1-50 mass parts, in particular, 2-30 mass parts; inter alia, 3-20 mass parts, per 100 mass parts of the solid resin content of the water-based base coat paint composition.

The water-based base coat paint composition also suitably contains the hydrophobic solvent (E). As the hydrophobic solvent (E), use of alcoholic hydrophobic solvent is preferred for excellent brilliance of formed coating film. In particular, $C_{7-14}$ alcoholic hydrophobic solvent, for example, at least one of alcoholic hydrophobic solvent selected from the group consisting of 1-octanol, 2-octanol, 2-ethyl-1-hexanol, ethylene glycol mono-2-ethylhexyl ether, propylene glycol mono-n-butyl ether and dipropylene glycol mono-n-butyl ether is even more suitable.

Where the water-based base coat paint composition contains the hydrophobic solvent (E), its blended amount preferably is within a range of normally 2-70 mass parts, in particular, 11-60 mass parts, inter alia 16-50 mass parts, per 100 mass parts of the solid resin content in the water-based base coat paint composition, for excellent brilliance of formed coating film.

The water-based base coat paint composition can further contain, where necessary, such ordinary paint additives as curing catalyst, thickener, UV absorber, light stabilizer, defoamer, plasticizer, organic solvent, surface-regulating agent, antisettling agent and the like, either alone or in combination of two or more.

As the clear paint composition used in the method II, any of thermosetting clear paint compositions known as those for coating car bodies and the like can be used. For example, organic solvent-based thermosetting paint compositions, water-based thermosetting paint compositions, powder thermosetting paint compositions, which comprise base resin having crosslinkable functional groups and crosslinking agent, can be named.

Examples of the crosslinkable functional group include carboxyl, hydroxyl, epoxy, silanol and the like groups. As species of the base resin, for example, acrylic resin, polyester resin, alkyd resin, urethane resin, epoxy resin and fluorinated resin can be named. Examples of the crosslinking agent include polyisocyanate compound, blocked polyisocyanate compound, melamine resin, urea resin, carboxyl-containing compound, carboxyl-containing resin, epoxy group-containing resin, epoxy group-containing compound and the like.

As combinations of the base resin/crosslinking agent in the clear paint composition, carboxyl-containing resin/epoxy group-containing resin, hydroxyl-containing resin/polyisocyanate compound, hydroxyl-containing resin/blocked polyisocyanate compound, hydroxyl-containing resin/melamine resin or the like are preferred.

The clear paint composition may be of one-package type paint or multi-package type paint such as two-package type urethane resin paint.

The clear paint composition may also contain, where necessary, coloring pigment, effect pigment, dye or the like to an extent not impairing transparency, and furthermore, suitably extender pigment, UV absorber, light stabilizer, defoamer, thickener, rust-proofing agent, surface-regulating agent and the like.

In the above methods I and II, application of water-based top coat paint composition, water-based base coat paint composition and clear paint composition can be done by per se known method, for example, such methods as air spray coating, airless spray coating, rotary atomizing coating and the like.

EXAMPLES

Hereinafter the invention is explained more specifically, referring to working Examples and Comparative Examples, it being understood that the invention is not limited to these Examples only. "Part" and "%" are invariably by mass.

Preparation of Hydroxyl-containing Polyester Resin (A1)

Production Example 1

A reactor equipped with a thermometer, thermostat, stirrer, reflux condenser and water-separator was charged with 174 parts of trimethylolpropane, 327 parts of neopentyl glycol, 352 parts of adipic acid, 109 parts of isophthalic acid and 101 parts of 1,2-cyclohexanedicarboxylic anhydride, and the temperature therein was raised from 160° C. to 230° C. over 3 hours. While maintaining the temperature at 230° C. and distilling off the formed water of condensation with the water separator, the reaction was carried out until the acid value became no higher than 3 mgKOH/g. To the reaction product 59 parts of trimellitic anhydride was added, followed by 30 minutes' addition reaction at 170° C. Cooling the reaction product to 50° C. or lower, an equivalent to the acid groups therein of 2-(dimethylamino)ethanol was added for neutralization. Then deionized water was gradually added to provide a hydroxyl-containing polyester resin solution (A1-1) having a solid content of 45% and pH of 7.2. The combined content of the aliphatic polybasic acid and alicyclic polybasic acid was 76 mol % and the aromatic polybasic acid content was 24 mol % in the resultant hydroxyl-containing polyester resin, based on its total acid component. The resin had an acid value of 35 mgKOH/g, hydroxyl value of 128 mgKOH/g and number-average molecular weight of 1,480.

Production Example 2

A reactor equipped with a thermometer, thermostat, stirrer, reflux condenser and water-separator was charged with 168 parts of trimethylolpropane, 316 parts of neopentyl glycol, 93 parts of adipic acid, 211 parts of isophthalic acid and 65 parts of 1,2-cyclohexanedicarboxylic anhydride, and the temperature therein was raised from 160° C. to 230° C. over 3 hours. While maintaining the temperature at 230° C. and distilling off the formed water of condensation with the water separator, the reaction was carried out until the acid value became no higher than 3 mgKOH/g. To the reaction product 59 parts of trimellitic anhydride was added, followed by 30 minutes' addition reaction at 170° C. Cooling the reaction product to 50° C. or lower, an equivalent to the acid groups therein of 2-(dimethylamino)ethanol was added for neutralization. Then deionized water was gradually added to provide a hydroxyl-containing polyester resin solution (A1-2) having a solid content of 45% and pH of 7.2. The combined content of the aliphatic polybasic acid and alicyclic polybasic acid was 27 mmol % and the aromatic polybasic acid content was 73 mol % in the resultant hydroxyl-containing polyester resin, based on its total acid component. The resin had an acid value of 35 mgKOH/g, hydroxyl value of 124 mgKOH/g and number-average molecular weight of 1,530.

Production Example 3

A reactor equipped with a thermometer, thermostat, stirrer, reflux condenser and water-separator was charged with 166 parts of trimethylolpropane, 314 parts of neopentyl glycol, 338 parts of adipic acid and 194 parts of 1,2-cyclohexanedicarboxylic anhydride, and the temperature therein was raised from 160° C. to 230° C. over 3 hours. While maintaining the temperature at 230° C. and distilling off the formed water of condensation with the water separator, the reaction was carried out until the acid value became no higher than 3 mgKOH/g. To the reaction product 94 parts of 1,2-cyclohexanedicarboxylic anhydride was added, followed by 30 minutes' addition reaction at 170° C. Cooling the reaction product to 50° C. or lower, an equivalent to the acid groups therein of 2-(dimethylamino)ethanol was added for neutralization. Then deionized water was gradually added to provide a hydroxyl-containing polyester resin solution (A1-3) having a solid content of 45% and pH of 7.2. The combined content of the aliphatic polybasic acid and alicyclic polybasic acid was 100 mol % and the aromatic polybasic acid content was 0 mol % in the resultant hydroxyl-containing polyester resin, based on its total acid component. The resin had an acid value of 35 mgKOH/g, hydroxyl value of 106 mgKOH/g and number-average molecular weight of 1,540.

Production Example 4

A reactor equipped with a thermometer, thermostat, stirrer, reflux condenser and water-separator was charged with 51.3 parts of trimethylolpropane, 355 parts of parts of neopentyl glycol, 165 parts of adipic acid, 187 parts of isophthalic acid and 174 parts of 1,2-cyclohexanedicarboxylic anhydride, and the temperature therein was raised from 160° C. to 230° C. over 5 hours. While maintaining the temperature at 230° C. and distilling off the formed water of condensation with the water separator, the reaction was carried out until the acid value became no higher than 2.5 mgKOH/g. To the reaction product 170 parts of trimellitic anhydride was added, followed by an hour's addition reaction at 170° C. Cooling the reaction product to 85° C. or lower, an equivalent to the acid groups therein of 2-(dimethylamino)ethanol was added for neutralization. Then deionized water was gradually added to provide a hydroxyl-containing polyester resin solution (A1-4) having a solid content of 45% and pH of 7.1. The combined content of the aliphatic polybasic acid and alicyclic polybasic acid was 53 mol % and the aromatic polybasic acid content was 47 mol % in the resultant hydroxyl-containing polyester resin based on its total acid component. The resin had an acid value of 100 mgKOH/g, hydroxyl value of 15 mgKOH/g and number-average molecular weight of 2,450.

Preparation of Hydroxyl-containing Polyester Resin (A2)

Production Example 5

A flask equipped with a thermometer, thermostat, stirrer, reflux condenser, nitrogen inlet pipe and a dropping device was charged with 30 parts of propylene glycol monopropyl ether whose temperature was then raised to 85° C. Into the flask a mixture of 6 parts of styrene, 30 parts of methyl methacrylate, 25 parts of n-butyl acrylate, 20 parts of 2-ethylhexyl acrylate, 13 parts of 4-hydroxybutyl acrylate, 6 parts of acrylic acid, 10 parts of propylene glycol monopropyl ether and 2 parts of 2,2'-azobis(2,4-dimethylvaleronitrile) was added dropwise over 4 hours. After completion of the dropping, the reaction mixture was aged for an hour. Then a mixture of 5 parts of propylene glycol monopropyl ether and 1 part of 2,2'-azobis(2,4-dimethylvaleronitrile) was added to the flask dropwise over an hour, followed by an hour's aging. Further 7.4 parts of 2-(dimethylamino)ethanol was added for neutralization, and deionized water was gradually added to provide a hydroxyl-containing acrylic resin solution (A2-1) having a solid content of 40%. The resultant hydroxyl-containing acrylic resin had an acid value of 47 mgKOH/g, hydroxyl value of 51 mgKOH/g and weight-average molecular weight of 50,000.

Production Example 6

A reactor equipped with a thermometer, thermostat, stirrer, reflux condenser, nitrogen inlet pipe and dropping device was charged with 100 parts of deionized water and 1 part of ADEKARIASOAP SR-1025 (tradename, ADEKA Corporation, ammonium salt of α-sulfo-ω-(1-(alkoxy)methyl-2-(2-propenyloxy)ethoxy)-poly(oxy-1,2-ethan-di-yl), active ingredient, 25%), which were then stirred and mixed in nitrogen current. The temperature rose to 75° C. Then 3% of the total amount of the later specified monomer emulsion and 10 parts of 0.5% aqueous ammonium persulfate solution were introduced into the reactor and kept at 75° C. for 2 hours. Then the rest of the monomer emulsion was dropped into the reactor over 5 hours, followed by 6 hours' aging. After cooling the reaction mixture to 30° C., the solid content and pH were adjusted to 40% and 6.8, respectively, using 5% aqueous 2-(dimethylamino)ethanol solution and deionized water. Then the reaction mixture was discharged while being filtered through a 200 mesh Nylon cloth, to provide a hydroxyl-containing acrylic resin dispersion (A2-2) having a solid content of 40%. The resultant hydroxyl-containing acrylic resin had an acid value of 11 mgKOH/g, hydroxyl value of 24 mgKOH/g and weight-average molecular weight of 1,800,000.

Monomer emulsion: Mixing and stirring 55 parts of deionized water, 4 parts of LATEMUL E-118B (tradename, Kao Corporation, sodium polyoxyethylene alkyl ether sulfate, active ingredient 26%), 10 parts of styrene, 53.5 parts of methyl methacrylate, 30 parts of n-butyl acrylate, 5 parts of 2-hydroxyethyl acrylate, 1.5 parts of acrylic acid and 0.2 part of 2,2'-azobis[2-(2-imidazolin-2-yl)propane, the monomer emulsion was obtained.

Production of Crosslinked Resin Particles (C)

Production of Crosslinked Resin Particles (C1)

Production Example 7

A reactor equipped with a thermometer, thermostat, stirrer, reflux condenser, nitrogen inlet pipe and dropping device was charged with 130 parts of deionized water and 0.52 part of AQUALON KH-10 (tradename, Daiichi Kogyo Seiyaku Co., Ltd., polyoxyethylene alkyl ether sulfate ester ammonium salt, active ingredient, 97%), which were stirred and mixed in nitrogen gas current, and the temperature was raised to 80° C. Then 1% of the total amount of the following monomer emulsion (1) and 5.3 parts of 6% aqueous ammonium persulfate solution were introduced into the reactor and kept at 80° C. for 15 minutes. The remainder of the monomer emulsion (1) was dropped into the reactor which was maintained at the same temperature, over 3 hours, followed by 1 hour's aging. Thereafter the following monomer emulsion (2) was added dropwise over an hour, and after the subsequent 1 hour's aging, the reactor was cooled at 30° C. under gradual addition of 40 parts of 5% aqueous 2-(dimethylamino)ethanol solution to provide a dispersion of crosslinked resin particles (C1-1) having a solid content of 30% and an average particle size of 138 nm [measured with a submicron particle size distribution-measuring device, COULTER N4 Model (tradename, Beckman Coulter, Inc.) as diluted with deionized water, at 20° C.]. The resultant crosslinked resin particles had a hydroxyl value of 19 mgKOH/g and acid value of 0 mgKOH/g.

Monomer emulsion (1): Mixing by stirring 42 parts of deionized water, 0.72 part of AQUALON KH-10, 8.4 parts of n-butyl acrylate, 58.8 parts of 2-ethylhexyl acrylate and 2.8 parts of allyl methacrylate, monomer emulsion (1) was obtained.

Monomer emulsion (2): Mixing by stirring 18 parts of deionized water, 0.31 part of AQUALON KH-10, 0.03 part of ammonium persulfate, 1.2 parts of allyl methacrylate, 4.8 parts of 4-hydroxybutyl acrylate and 24 parts of methyl methacrylate, the monomer emulsion (2) was obtained.

Production Examples 8-12, 15-31

Production Example 7 was repeated except that the compositions of the monomer emulsions (1) and (2) were changed as shown in the later appearing Table 1, to provide crosslinked resin particle dispersions (C1-2)-(C1-6) and (C1-9)-(C1-25). The solid contents, acid values, hydroxyl values, glass transition temperatures and average particle sizes of the crosslinked resin particle dispersions (C1-1)-(C1-6) and (C1-9)-(C1-25), concurrently with those of Production Example 7, are shown in the Table 1.

Production Example 13

A reactor equipped with a thermometer, thermostat, stirrer, reflux condenser, nitrogen inlet pipe and dropping device was charged with the following monomer emulsion (1). After raising its temperature to 85° C., 16 parts of 6% aqueous ammonium persulfate solution was introduced into the reactor, followed by 2 hours' stirring, while the same temperature was maintained. Thus a resin dispersion having an average particle size of 150 nm was obtained. Then the following monomer emulsion (2) was added dropwise over an hour, aged for another hour and cooled to 40° C. Deionized water and 2-(dimethylamino)ethanol were introduced into the reaction mixture to provide a crosslinked resin particle dispersion (C1-7) having pH of 8.0, solid content of 30% and average particle size of 165 nm. Thus obtained crosslinked resin particles had a hydroxyl value of 19 mgKOH/g and an acid value of 0 mgKOH/g.

Monomer emulsion (1): The monomer emulsion (1) having an average particle size of 160 nm was obtained by mixing by stirring 70 parts of deionized water, 7 parts of NEWCOL 707SF (tradename, Nippon Nyukazai Co., Ltd., ammonium polyoxyethylene alkylbenzenesulfonate, active ingredient 30%), 33.6 parts of dodecyl methacrylate, 33.6 parts of tridecyl methacrylate and 2.8 parts of allyl methacrylate; and further subjecting the mixture to a high pressure treatment with a high-pressure emulsifier at 100 MPa, in which high-pressure energy was exerted to cause the fluid-to-fluid collision.

Monomer emulsion (2): The monomer emulsion (2) was obtained by mixing by stirring 14 parts of deionized water, 3 parts of NEWCOL 707SF, 1.2 parts of allyl methacrylate, 4.8 parts of 4-hydroxybutyl acrylate and 24 parts of methyl methacrylate.

Production Example 14

A reactor equipped with a thermometer, thermostat, stirrer, reflux condenser, nitrogen inlet pipe and dropping device was charged with the following monomer emulsion (1). After raising its temperature to 85° C., 16 parts of 6% aqueous ammonium persulfate solution was introduced into the reactor, followed by 2 hours' stirring, while the same temperature was maintained. Thus a resin dispersion having an average particle size of 155 nm was obtained. Then the following monomer emulsion (2) was added drop wise over an hour, aged for another hour and cooled to 40° C. Deionized water and 2-(dimethylamino)ethanol were introduced into the reaction mixture to provide a crosslinked resin particle dispersion (C1-8) having pH of 8.0, solid content of 30% and average particle size of 167 nm. Thus obtained crosslinked resin particles had a hydroxyl value of 19 mgKOH/g and an acid value of 0 mgKOH/g.

Monomer emulsion (1): The monomer emulsion (1) having an average particle size of 162 nm was obtained by mixing by stirring 70 parts of deionized water, 7 parts of NEWCOL 707SF, 46.2 parts of 2-ethylhexyl acrylate, 21 parts of Isostearyl Acrylate (tradename, Osaka Organic Chemical Industry, Ltd., branched higher alkyl acrylate) and 2.8 parts of allyl methacrylate, and further subjecting the mixture to a high pressure treatment with a high-pressure emulsifier at 100 MPa, in which high-pressure energy was exerted to cause the fluid-to-fluid collision.

Monomer emulsion (2): The monomer emulsion (2) was obtained by mixing by stirring 14 parts of deionized water, 3 parts of NEWCOL 707SF, 1.2 parts of allyl methacrylate, 4.8 parts of 4-hydroxybutyl acrylate and 24 parts of methyl methacrylate.

TABLE 1

| | | | | Production Example | | | | | | | | |
|---|---|---|---|---|---|---|---|---|---|---|---|---|
| | | | | 7 | 8 | 9 | 10 | 11 | 12 | 13 | 14 | 15 |
| | Crosslinked resin particle dispersion | | | C1-1 | C1-2 | C1-3 | C1-4 | C1-5 | C1-6 | C1-7 | C1-8 | C1-9 |
| Monomer emulsion (1) | | deionized water | | 42 | 42 | 42 | 42 | 42 | 42 | 70 | 70 | 36 |
| | | AQUALON KH-10 | | 0.72 | 0.72 | 0.72 | 0.72 | 0.72 | 0.72 | | | 0.62 |
| | | Newcol 707 SF | | | | | | | | 7 | 7 | |
| | Monomer (c-1) | $C_{4-22}$ alkyl group-containing polymerizable unsaturated monomer | n-butyl acrylate | 8.4 | | | | | | | | 6 |
| | | | 2-ethylhexyl acrylate | 58.8 | 67.2 | 28 | 49 | 61.6 | 67.2 | | 46.2 | 51.6 |
| | | | dodecyl methacrylate | | | | | | | 33.6 | | |
| | | | tridecyl methacrylate | | | | | | | 33.6 | | |
| | | | Isostearyl Acrylate | | | | | | | | 21 | |
| | Monomer (c-2) | polymerizable unsaturated monomer having at least two polymerizable unsaturated groups per molecule | allyl methacrylate | 2.8 | 2.8 | 2.8 | 2.8 | 2.8 | 2.8 | 2.8 | 2.8 | 2.4 |
| | | | ethyl acrylate | | | | 39.2 | 18.2 | | | | |
| | | | styrene | | | | | | 5.6 | | | |
| Monomer emulsion (2) | | deionized water | | 18 | 18 | 18 | 18 | 18 | 18 | 14 | 14 | 24 |
| | | AQUALON KH-10 | | 0.31 | 0.31 | 0.31 | 0.31 | 0.31 | 0.31 | | | 0.41 |
| | | Newcol 707 SF | | | | | | | | 3 | 3 | |
| | | ammonium persulfate | | 0.03 | 0.03 | 0.03 | 0.03 | 0.03 | 0.03 | | | 0.04 |
| | Monomer (c-3) | polymerizable unsaturated monomer having at least two polymerizable unsaturated groups per molecule | allyl methacrylate | 1.2 | 1.2 | 1.2 | 1.2 | 1.2 | 1.2 | 1.2 | 1.2 | 1.6 |
| | Monomer (c-4) | hydroxyl-containing polymerizable unsaturated monomer | 4-hydroxybutyl acrylate | 4.8 | | 4.8 | 4.8 | 4.8 | 4.8 | 4.8 | 4.8 | 6.4 |
| | | $C_1$ or $C_2$ alkyl group-containing polymerizable unsaturated monomer | methyl methacrylate | 24 | 28.8 | 24 | 24 | 24 | 24 | 24 | 24 | 32 |
| | | Solid content (%) | | 30 | 30 | 30 | 30 | 30 | 30 | 30 | 30 | 30 |
| | | Hydroxyl value (mgKOH/g) | | 19 | 0 | 19 | 19 | 19 | 19 | 19 | 19 | 25 |
| | | Acid value (mgKOH/g) | | 0 | 0 | 0 | 0 | 0 | 0 | 0 | 0 | 0 |
| Glass transition temp. Tg (° C.) | | glass transition temp. ($Tg_1$) of (co)polymer (I) | | −51 | −51 | −24 | −39 | −43 | −51 | −63 | −29 | −51 |
| | | glass transition temp. ($Tg_2$) of copolymer (II) | | 59 | 100 | 59 | 59 | 59 | 59 | 59 | 59 | 59 |
| | Average particle size (nm) | | | 138 | 142 | 172 | 164 | 155 | 151 | 165 | 167 | 161 |

| | | | | Production Example | | | | | | | |
|---|---|---|---|---|---|---|---|---|---|---|---|
| | | | | 16 | 17 | 18 | 19 | 20 | 21 | 22 | 23 |
| | Crosslinked resin particle dispersion | | | C1-10 | C1-11 | C1-12 | C1-13 | C1-14 | C1-15 | C1-16 | C1-17 |
| Monomer emulsion (1) | | deionized water | | 42 | 42 | 42 | 42 | 42 | 42 | 42 | 42 |
| | | AQUALON KH-10 | | 0.72 | 0.72 | 0.72 | 0.72 | 0.72 | 0.72 | 0.72 | 0.72 |
| | Monomer (c-1) | $C_{4-22}$ alkyl group-containing polymerizable unsaturated monomer | n-butyl acrylate | | | | 8.4 | 8.4 | | | |
| | | | 2-ethylhexyl acrylate | 67.2 | 67.2 | 67.2 | 59.5 | 59.5 | 70 | 67.2 | 67.2 |

TABLE 1-continued

|  |  |  |  |  |  |  |  |  |  |  |
|---|---|---|---|---|---|---|---|---|---|---|
| | Monomer (c-2) | polymerizable unsaturated monomer having at least two polymerizable unsaturated groups per molecule | allyl methacrylate | 2.8 | 2.8 | 2.8 | 2.1 | 2.1 | | 2.8 | 2.8 |
| Monomer emulsion (2) | | deionized water | | 18 | 18 | 18 | 18 | 18 | 18 | 18 | 18 |
| | | AQUALON KH-10 | | 0.31 | 0.31 | 0.31 | 0.31 | 0.31 | 0.31 | 0.31 | 0.31 |
| | | ammonium persulfate | | 0.03 | 0.03 | 0.03 | 0.03 | 0.03 | 0.03 | 0.03 | 0.03 |
| | Monomer (c-3) | polymerizable unsaturated monomer having at least two polymerizable unsaturated groups per molecule | allyl methacrylate | 1.2 | 1.2 | 1.2 | 1.5 | 1.5 | 1.2 | | 2.4 |
| | | | 1,6-hydroxybutyl acrylate | | | | | | | 1.8 | |
| | Monomer (c-4) | hydroxyl-containing polymerizable unsaturated monomer | 2-hydroxyethyl acrylate | | | | | | | 1.8 | |
| | | | 2-hydroxypropyl acrylate | 4.2 | | | | | | | |
| | | | 4-hydroxybutyl acrylate | | 4.8 | 4.8 | 4.2 | 4.2 | 4.8 | 4.2 | 4.8 |
| | | carboxyl-containing polymerizable unsaturated monomer | methacrylic acid | | 1.2 | 2.1 | | | | | |
| | | $C_1$ or $C_2$ alkyl group-containing polymerizable unsaturated monomer | methyl methacrylate | 24.6 | 22.8 | 21.9 | 21.3 | 21.3 | 24 | 22.2 | 22.8 |
| | | | diacetone acrylamide | | | | 3 | | | | |
| | | | γ-methacryloxypropyltri-methoxysilane | | | | | 3 | | | |
| | Solid content (%) | | | 30 | 30 | 30 | 30 | 30 | 30 | 30 | 30 |
| | Hydroxyl value (mgKOH/g) | | | 18 | 19 | 19 | 16 | 16 | 19 | 25 | 19 |
| | Acid value (mgKOH/g) | | | 0 | 8 | 14 | 0 | 0 | 0 | 0 | 0 |
| | Glass transition temp. Tg (° C.) | glass transition temp. ($Tg_1$) of (co)polymer (I) | | −51 | −51 | −51 | −52 | −52 | −53 | −51 | −51 |
| | | glass transition temp. ($Tg_2$) of copolymer (II) | | 64 | 62 | 64 | 61 | 50 | 59 | 45 | 55 |
| | Average particle size (nm) | | | 145 | 155 | 153 | 162 | 165 | 159 | 148 | 140 |

| | | | | Production Example | | | | | | | |
|---|---|---|---|---|---|---|---|---|---|---|---|
| | | | | 24 | 25 | 26 | 27 | 28 | 29 | 30 | 31 |
| | Crosslinked resin particle dispersion | | | C1-18 | C1-19 | C1-20 | C1-21 | C1-22 | C1-23 | C1-24 | C1-25 |
| Monomer emulsion (1) | | deionized water | | 42 | 42 | 42 | 42 | 42 | 42 | 42 | 60 |
| | | AQUALON KH-10 | | 0.72 | 0.72 | 0.72 | 0.72 | 0.72 | 0.72 | 0.72 | 1.03 |
| | | ammonium persulfate | | | | | | | | | 0.07 |
| | Monomer (c-1) | $C_{4-22}$ alkyl group-containing polymerizable unsaturated monomer | n-butyl acrylate | | | | | 18.2 | 49 | 49 | 56 |
| | | | 2-ethylhexyl acrylate | 67.2 | 67.2 | 67.2 | 18.2 | | | | |
| | Monomer (c-2) | hydroxyl-containing polymerizable unsaturated monomer | 4-hydroxybutyl acrylate | | | | | | | | 5 |
| | | carboxyl-containing polymerizable unsaturated monomer | methacrylic acid | | | | | | | | 2 |
| | | polymerizable unsaturated monomer having at least two polymerizable unsaturated groups per molecule | allyl methacrylate | 2.8 | 2.8 | 2.8 | 2.8 | 2.8 | | 2.8 | 4 |
| | | | methyl methacrylate | | | | | | 21 | 21 | 18.2 | 25 |
| | | | ethyl acrylate | | | | 49 | 28 | | | |
| | | | styrene | | | | | | | | 8 |
| Monomer emulsion (2) | | deionized water | | 18 | 18 | 18 | 18 | 18 | 18 | 18 | |
| | | AQUALON KH-10 | | 0.31 | 0.31 | 0.31 | 0.31 | 0.31 | 0.31 | 0.31 | |
| | | ammonium persulfate | | 0.03 | 0.03 | 0.03 | 0.03 | 0.03 | 0.03 | 0.03 | |
| | Monomer (c-3) | polymerizable unsaturated monomer having at least two polymerizable unsaturated groups per molecule | allyl methacrylate | 1.2 | 1.2 | 1.2 | 1.2 | 1.2 | | | |
| | Monomer (c-4) | hydroxyl-containing polymerizable unsaturated monomer | 2-hydroxyethyl acrylate | 1.2 | | | | | | 1.2 | |
| | | | 4-hydroxybutyl acrylate | 3.6 | 4.8 | 4.2 | 4.8 | 4.8 | 4.2 | 4.2 | |

TABLE 1-continued

| | | | | | | | | | |
|---|---|---|---|---|---|---|---|---|---|
| $C_1$ or $C_2$ alkyl group-containing polymerizable unsaturated monomer | methyl methacrylate | | 18 | | 24 | 24 | 25.8 | 24.6 | |
| | ethyl methacrylate | 24 | | | | | | | |
| | isobornyl acrylate | | | 6 | | | | | |
| | 2-ethylhexyl acrylate | | | | 24.6 | | | | |
| Solid content (%) | | 30 | 30 | 30 | 30 | 30 | 30 | 30 | 30 |
| Hydroxyl value (mgKOH/g) | | 20 | 19 | 16 | 19 | 19 | 16 | 22 | 19 |
| Acid value (mgKOH/g) | | 0 | 0 | 0 | 0 | 0 | 0 | 0 | 13 |
| Glass transition temp. Tg (° C.) | glass transition temp ($Tg_1$) of (co)polymer (I) | −51 | −51 | −51 | −16 | 6 | −22 | −25 | −13 |
| | glass transition temp. ($Tg_2$) of copolymer (II) | 34 | 58 | −52 | 59 | 59 | 68 | 59 | |
| Average particle size (nm) | | 156 | 161 | 165 | 152 | 148 | 166 | 154 | 162 |

Of the above crosslinked resin particle dispersions (C1-1)-(C1-25), crosslinked resin particle dispersions (C1-1)-(C1-20) contain the crosslinked resin particles (C1) of the present invention.

Production of Crosslinked Resin Particles (C2)

Production Example 32

A reactor equipped with a thermometer, thermostat, stirrer, reflux condenser, nitrogen-inlet pipe and dropping device was charged with 130 parts of deionized water and 0.52 part of AQUALON KH-10 (tradename, Daiichi Kogyo Seiyaku Co., Ltd., polyoxyethylene alkyl ether sulfate ester ammonium salt, active ingredient, 97%) which were stirred and mixed in gaseous nitrogen current. The temperature was raised to 80° C., and then 1% of the total amount of a later specified monomer emulsion (1) and 5.3 parts of 6% aqueous ammonium persulfate solution were introduced into the reactor and kept at 80° C. for 15 minutes. Then the remainder of the monomer emulsion (1) was dropped into the reactor which was maintained at the same temperature, over 3 hours, followed by an hour's aging. Thereafter a monomer emulsion (2) as specified later was added dropwise over an hour, aged for an hour, and the reaction mixture was cooled to 30° C. under gradual addition of 40 parts of a 5% aqueous 2-(dimethylamino)ethanol solution into the reactor. Thus a crosslinked resin particle dispersion (C2-1) having a solid content of 30% was obtained, the average particle size being 141 nm [as measured with a submicron particle size distribution measuring device, COULTER N4 Model (tradename, Beckman Coulter, Inc.), as to a sample diluted with deionized water at 20° C.]. Thus obtained crosslinked resin particles had a hydroxyl value of 18 mgKOH/g and an acid value of 0 mgKOH/g.

Monomer emulsion (1): the monomer emulsion (1) was obtained by mixing by stirring 42 parts of deionized water, 0.72 part of AQUALON KH-10, 8.4 parts of n-butyl acrylate, 58.8 parts of 2-ethylhexyl acrylate and 2.8 parts of allyl methacrylate.

Monomer emulsion (2): the monomer emulsion (2) was obtained by mixing by stirring 18 parts of deionized water, 0.31 part of AQUALON KH-10, 0.03 part of ammonium persulfate, 1.4 parts of glycidyl methacrylate, 0.8 part of methacrylic acid, 4.5 parts of 4-hydroxybutyl acrylate and 23.3 parts of methyl methacrylate.

Production Examples 33-37, 40-53

Production Example 32 was repeated except that the compositions of the monomer mixtures (1) and (2) were changed as shown in the later appearing Table 2, to provide crosslinked resin particle dispersions (C2-2)-(C2-6) and (C2-9)-(C2-22). The solid contents, acid values, hydroxyl values, glass transition temperatures and average particle sizes of the crosslinked resin particle dispersions (C2-1)-(C2-6) and (C2-9)-(C2-22) are shown in the Table 2, concurrently with the results of Production Examples 32.

Production Example 38

A reactor equipped with a thermometer, thermostat, stirrer, reflux condenser, nitrogen inlet pipe and dropping device was charged with the following monomer emulsion (1). After raising its temperature to 85° C., 16 parts of 6% aqueous ammonium persulfate solution was introduced into the reactor, followed by 2 hours' stirring, while the same temperature was maintained. Thus a resin dispersion having an average particle size of 150 nm was obtained. Then the following monomer emulsion (2) was added dropwise over an hour, aged for another hour and cooled to 40° C. Deionized water and 2-(dimethylamino)ethanol were introduced into the reaction mixture to provide a crosslinked resin particle dispersion (C2-7) having pH of 8.0, solid content of 30% and average particle size of 166 nm. Thus obtained crosslinked resin particles had a hydroxyl value of 18 mgKOH/g and an acid value of 0 mgKOH/g.

Monomer emulsion (1): the monomer emulsion (1) having an average particle diameter of 160 nm was obtained by mixing by stirring 70 parts of deionized water, 7 parts of Newcol 707SF (tradename, Nihon Nyukazai Co., Ltd., ammonium polyoxyethylenealkylbenzenesulfonate), 33.6 parts of dodecyl methacrylate, 33.6 parts of tridecyl methacrylate and 2.8 parts of allyl methacrylate; and subjecting the emulsion to a high pressure treatment at 100 MPa with a high-pressure emulsifying device in which high pressure energy was exerted to cause the fluid-to-fluid collision.

Monomer emulsion (2): the monomer emulsion (2) was obtained by mixing by stirring 14 parts of deionized water, 3 parts of Newcol 707SF, 1.4 parts of glycidyl methacrylate, 0.8 part of methacrylic acid, 4.5 parts of 4-hydroxybutyl acrylate and 23.3 parts of methyl methacrylate.

Production Example 39

A reactor equipped with a thermometer, thermostat, stirrer, reflux condenser, nitrogen inlet pipe and dropping device was charged with the following monomer emulsion (1). After raising its temperature to 85° C., 16 parts of 6% aqueous ammonium persulfate solution was introduced into the reactor, followed by 2 hour's stirring, while the same temperature was maintained. Thus a resin dispersion having an average particle size of 155 nm was obtained.

Then the following monomer emulsion (2) was added dropwise over an hour, aged for another hour and cooled to 40° C. Deionized water and 2-(dimethylamino)ethanol were introduced into the reaction mixture to provide a crosslinked resin particle dispersion (C2-8) having pH of 8.0, solid content of 30% and average particle size of 169 nm. Thus obtained crosslinked resin particles had a hydroxyl value of 18 mgKOH/g and an acid value of 0 mgKOH/g.

Monomer emulsion (1): The monomer emulsion (1) having an average particle size of 162 nm was obtained by mixing and stirring 70 parts of deionized water, 7 parts of NEWCOL 707SF, 46.2 parts of 2-ethylhexyl acrylate, 21 parts of Isostearyl Acrylate (tradename, Osaka Organic Chemical Industry, Ltd., branched higher alkyl acrylate) and 2.8 parts of allyl methacrylate, and further subjecting the mixture to a high pressure treatment with a high-pressure emulsifier at 100 MPa, in which high-pressure energy was exerted to cause the fluid-to-fluid collision.

Monomer emulsion (2): The monomer emulsion (2) was obtained by mixing by stirring 14 parts of deionized water, 3 parts of NEWCOL 707SF, 1,4 parts of glycidyl methacrylate, 0.8 part of methacrylic acid, 4.5 parts of 4-hydroxybutyl acrylate and 23.3 parts of methyl methacrylate.

TABLE 2

| | | | Production Example | | | | | | | | | | | |
|---|---|---|---|---|---|---|---|---|---|---|---|---|---|---|
| | | | 32 | 33 | 34 | 35 | 36 | 37 | 38 | 39 | 40 | 41 | 42 |
| | | | C2-1 | C2-2 | C2-3 | C2-4 | C2-5 | C2-6 | C2-7 | C2-8 | C2-9 | C2-10 | C2-11 |
| Monomer emulsion (1) | Crosslinked resin particle dispersion | | 42 | 42 | 42 | 42 | 42 | 42 | 70 | 70 | 36 | 42 | 42 |
| | deionized water | | 0.72 | 0.72 | 0.72 | 0.72 | 0.72 | 0.72 | | | 0.62 | 0.72 | 0.72 |
| | AQUALON KH-10 | | | | | | | | | | | | |
| | Newcol 707 SF | | 8.4 | | | | | | | | | | |
| | monomer (c-1) C$_{4-22}$ alkyl group-containing polymerizable unsaturated monomer | n-butyl acrylate | 58.8 | 57.2 | 28 | 49 | 61.6 | 67.2 | | | | 65.8 | 67.2 |
| | | 2-ethylhexyl acrylate | | | | | | | | 46.2 | 51.6 | | |
| | | dodecyl methacrylate | | | | | | | 33.6 | | 6 | | |
| | | tridecyl methacrylate | | | | | | | 33.6 | | | | |
| | | Isostearyl Acrylate | | | | | | | | 21 | | | |
| | monomer (c-2) polymerizable unsaturated monomer having at least two polymerizable unsaturated groups per molecule | allyl methacrylate | 2.8 | 2.8 | 2.8 | 2.8 | | 2.8 | 2.8 | 2.8 | 2.4 | | 2.8 |
| | | 1,6-hexanediol diacrylate | | | | | 5.6 | | | | | 4.2 | |
| | | ethyl acrylate | | | 39.2 | | | | | | | | |
| | | styrene | | | | 18.2 | | | | | | | |
| Monomer emulsion (2) | deionized water | | 18 | 18 | 18 | 18 | 18 | 18 | 14 | 14 | 24 | 18 | 18 |
| | AQUALON KH-10 | | 0.31 | 0.31 | 0.31 | 0.31 | 0.31 | 0.31 | | | 0.41 | 0.31 | 0.31 |
| | Newcol 707 SF | | | | | | | | 3 | 3 | | | |
| | ammonium persulfate | | 0.03 | 0.03 | 0.03 | 0.03 | 0.03 | 0.03 | | | 0.04 | 0.03 | 0.03 |
| | monomer (c-5) functional group-containing polymerizable unsaturated monomer | glycidyl methacrylate | 1.4 | 1.4 | 1.4 | 1.4 | 1.4 | 1.4 | 1.4 | 1.4 | 1.8 | 1.4 | 1.4 |
| | monomer (c-6) polymerizable unsaturated monomer complementally reactable with the functional group in polymerizable unsaturated monomer (c-5) | methacrylic acid | 0.8 | 0.8 | 0.8 | 0.8 | 0.8 | 0.8 | 0.8 | 0.8 | 1.1 | 0.8 | 2.0 |
| | monomer (c-7) hydroxyl-containing polymerizable unsaturated monomer | 2-hydroxypropyl acrylate | | | | | | | | | | | |
| | | 4-hydroxybutyl acrylate | 4.5 | | 4.5 | 4.5 | 4.5 | 4.5 | 4.5 | 4.5 | 6 | 4.2 | 4.5 |
| | C$_1$ or C$_2$ alkyl group-containing polymerizable unsaturated monomer | methyl methacrylate | 23.3 | 27.8 | 23.3 | 23.3 | 23.3 | 23.3 | 23.3 | 23.3 | 31.1 | 23.6 | 22.1 |
| | Solid content (%) | | 30 | 30 | 30 | 30 | 30 | 30 | 30 | 30 | 30 | 30 | 30 |
| | Hydroxyl value (mgKOH/g) | | 18 | 0 | 18 | 18 | 18 | 18 | 18 | 18 | 23 | 18 | 18 |
| | Acid value (mgKOH/g) | | 0 | 0 | 0 | 0 | 0 | 0 | 0 | 0 | 0 | 0 | 0 |
| | Glass transition temp.: Tg (° C.) | glass transition temp. (Tg$_1$) of (copolymer (I)) | −51 | −51 | −24 | −39 | −43 | −51 | −63 | −29 | −51 | −52 | −51 |
| | | glass transition temp. (Tg$_3$) of (copolymer (III)) | 65 | 104 | 65 | 65 | 65 | 65 | 65 | 65 | 65 | 67 | 68 |
| | Average particle size (nm) | | 141 | 148 | 173 | 162 | 158 | 155 | 166 | 169 | 164 | 142 | 151 |

| | | | Production Example | | | | | | | | | | | |
|---|---|---|---|---|---|---|---|---|---|---|---|---|---|---|
| | | | 43 | 44 | 45 | 46 | 47 | 48 | 49 | 50 | 51 | 52 | 53 |
| | | | C2-12 | C2-13 | C2-14 | C2-15 | C2-16 | C2-17 | C2-18 | C2-19 | C2-20 | C2-21 | C2-22 |
| Monomer emulsion (1) | Crosslinked resin particle dispersion | | 42 | 42 | 42 | 42 | 42 | 42 | 42 | 42 | 42 | 42 | 42 |
| | deionized water | | 0.72 | 0.72 | 0.72 | 0.72 | 0.72 | 0.72 | 0.72 | 0.72 | 0.72 | 0.72 | 0.72 |
| | AQUALON KH-10 | | | | | | | | | | | | |
| | monomer (c-1) C$_{4-22}$ alkyl group-containing polymerizable unsaturated monomer | n-butyl acrylate | 67.2 | 70 | 67.2 | 67.2 | 65 | 67.2 | 67.2 | 67.2 | 67.2 | 18.2 | 18.2 |
| | | 2-ethylhexyl acrylate | | | | | | | | | | | |

TABLE 2-continued

|  |  |  |  |  |  |  |  |  |  |  |  |  |  |  |
|---|---|---|---|---|---|---|---|---|---|---|---|---|---|---|
| monomer (c-2) | carboxyl-containing polymerizable unsaturated monomer | methacrylic acid | 2.8 |  | 2.8 | 2.8 |  | 2.8 | 2.8 | 2.8 | 2.8 | 2.8 | 2.8 | 2.8 |
|  | polymerizable unsaturated monomer having at least two polymerizable unsaturated groups per molecule | allyl methacrylate |  |  |  |  | 1.9 |  |  |  |  |  |  |  |
| Monomer emulsion (2) |  | deionized water | 18 | 18 | 18 | 18 | 18 | 18 | 18 | 18 | 18 | 18 | 18 | 18 |
|  |  | AQUALON KH-10 | 0.31 | 0.31 | 0.31 | 0.31 | 0.31 | 0.31 | 0.31 | 0.31 | 0.31 | 0.31 | 0.31 | 0.31 |
|  |  | ammonium persulfate | 0.03 | 0.03 | 0.03 | 0.03 | 0.03 | 0.03 | 0.03 | 0.03 | 0.03 | 0.03 | 0.03 | 0.03 |
|  |  | methyl methacrylate |  |  | 1.5 |  |  |  |  |  |  |  |  |  |
|  |  | ethyl acrylate |  |  |  |  |  |  |  |  |  | 49 |  | 21 |
|  |  | glycidyl methacrylate |  |  |  |  | 3.2 |  |  |  |  |  |  | 28 |
| monomer (c-5) | functional group-containing polymerizable unsaturated monomer | N-(n-butoxymethyl)-acrylamide | 1.4 | 1.4 |  | 2.4 | 1.4 | 1.4 | 1.4 | 1.4 | 1.4 | 1.4 | 1.4 | 1.4 |
|  |  | glycidyl methacrylate |  |  |  |  |  | 2.7 |  |  |  |  |  |  |
|  |  | γ-methacryloxypropyl trimethoxysilane |  |  |  |  |  |  |  |  |  |  |  |  |
| monomer (c-6) | polymerizable unsaturated monomer having functional group complementally reactable with the functional group in polymerizable unsaturated monomer (c-5) | methacrylic acid | 2.9 | 0.8 | 6.2 | 5.9 | 0.8 | 1.7 | 0.8 | 0.8 | 0.8 | 0.8 | 0.8 | 0.8 |
|  |  | 4-hydroxybutyl acrylate |  |  |  |  |  |  |  |  |  |  |  |  |
| monomer (c-7) | hydroxyl-containing polymerizable unsaturated monomer | 2-hydroxyethyl acrylate |  |  |  |  |  |  | 1.2 |  |  |  |  |  |
|  |  | 4-hydroxybutyl acrylate | 4.5 | 4.5 | 22.3 | 21.8 | 4.5 | 4.5 | 3 | 4.5 | 4.2 | 4.5 | 4.5 | 4.5 |
|  | $C_1$ or $C_2$ alkyl group-containing polymerizable unsaturated monomer | methyl methacrylate | 21.2 | 23.3 |  |  | 23.3 | 21.2 |  | 17.3 |  |  |  |  |
|  |  | ethyl acrylate |  |  |  |  |  |  | 23.6 | 6 | 23.6 | 23.3 | 23.3 | 23.3 |
|  |  | isobornyl acrylate |  |  |  |  |  |  |  |  |  |  |  |  |
|  |  | 2-ethylhexyl acrylate |  |  |  |  |  |  |  |  |  |  |  |  |
|  | Solid content (%) |  | 30 | 30 | 30 | 30 | 30 | 30 | 30 | 30 | 30 | 30 | 30 | 30 |
|  | Hydroxyl value (mgKOH/g) |  | 18 | 18 | 19 | 18 | 18 | 18 | 17 | 18 | 16 | 18 | 18 | 18 |
|  | Acid value (mgKOH/g) |  | 14 | 0 | 0 | 0 | 0 | 0 | 0 | 0 | 0 | 0 | 0 | 0 |
|  | Glass transition temp. Tg (° C.) |  | -51 | -53 | -51 | -51 | -46 | -51 | -51 | -51 | -51 | -51 | -16 | 6 |
|  | glass transition temp. (Tg₁) of (co)polymer (I) |  | 70 | 65 | 48 | 46 | 65 | 65 | 41 | 63 | -47 | 65 | 65 | 65 |
|  | glass transition temp. (Tg₃) of (co)polymer (III) |  | 156 | 166 | 163 | 161 | 153 | 146 | 160 | 163 | 164 | 155 | 150 |  |
|  | Average particle size (nm) |  |  |  |  |  |  |  |  |  |  |  |  |  |

Of those crosslinked resin particle dispersions (C2-1)-(C2-22), crosslinked resin particle dispersions (C2-1)-(C2-20) contain the crosslinked resin particles (C2) according to the present invention.

Preparation of Water-based Paint Composition

Example 1

A pigment-dispersed paste was obtained by mixing 56 parts (solid resin content, 25 parts) of the hydroxyl-containing polyester resin solution (A1-1) as obtained in Production Example 1, 60 parts of JR-806 (tradename, Tayca Corporation, rutile type titanium dioxide), 1 part of CARBON MA-100 (tradename, Mitsubishi Chemicals Co., carbon black), 15 parts of BARIACE B-35 (tradename, Sakai Chemical Industry Co., Ltd., barium sulfate powder, average primary particle size, 0.5 μm), 3 parts of MICRO ACE S-3 (tradename, Nippon Talc Co., Ltd., talc powder, average primary particle size, 4.8 μm) and 5 parts of deionized water; adjusting its pH to 8.0 with 2-(dimethylamino)ethanol and dispersing it with a paint shaker for 30 minutes.

Then 140 parts of so obtained pigment-dispersed paste, 29 parts of the hydroxyl-containing polyester resin solution (A1-1) as obtained in Production Example 1, 25 parts of the hydroxyl-containing acrylic resin solution (A2-1) as obtained in Production Example 5, 28 parts of U-COAT UX-8100 (tradename, Sanyo Chemical Industries, Ltd., urethane emulsion, solid content 35%), 33 parts of melamine resin (B-1) (methyl-butyl-mixed etherified melamine resin, solid content 80%, weight-average molecular weight 800), 15 parts of BAYHYDUR VPLS 2310 (tradename, Sumika Bayer Urethane Co., Ltd., blocked polyisocyanate compound, solid content 38%), 33 parts of the resin particle dispersion (C1-1) as obtained in Production Example 7 and 10 parts of 2-ethyl-1-hexanol (soluble mass in 100 g of water at 20° C.: 0.1 g) were uniformly mixed.

Thereafter UH-752 (tradename, ADEKA Corporation, urethane association type thickener), 2-(dimethylamino)ethanol and deionized water were added to the formed mixture to provide a water-based paint composition (X-1) whose pH was 8.0, solid content, 48%, and viscosity, 30 seconds as measured with Ford cup No. 4 at 20° C.

Examples 2-35, 38-73, Comparative Examples 1-8

Example 1 was repeated except that the composition of the blend was changed to those as shown in Table 3, to provide water-based paint compositions (X-2)-(X-35), (X-38)-(X-73) and (X-76)-(X-83) whose pH was 8.0, solid content was 48% and the viscosity, 30 seconds as measured with Ford cup No. 4 at 20° C.

Example 36

A pigment-dispersed paste was obtained by mixing 56 parts (solid resin content, 25 parts) of the hydroxyl-containing polyester resin solution (A1-1) as obtained in Production Example 1, 60 parts of JR-806, 1 part of CARBON MA-100, 15 parts of BARIACE B-35, 3 parts of MICRO ACE S-3 and 5 parts of deionized water; adjusting its pH to 8.0 with 2-(dimethylamino)ethanol and dispersing it with a paint shaker for 30 minutes.

Then 140 parts of so obtained pigment-dispersed paste, 29 parts of the hydroxyl-containing polyester resin solution (A1-1) as obtained in Production Example 1, 25 parts of the hydroxyl-containing acrylic resin solution (A2-1) as obtained in Production Example 5, 28 parts of U-COAT UX-8100, 33 parts of melamine resin (B-1), 15 parts of BAYHYDUR VPLS 2310, 33 parts of the resin particle dispersion (C1-6) as obtained in Production Example 12 and 10 parts of 2-ethyl-1-hexanol (soluble mass in 100 g of water at 20° C.:0.1 g) were uniformly mixed.

To the resulting mixture then PRIMAL ASE-60 (tradename, Rohm & Haas Co., polyacrylic thickener), 2-(dimethylamino)ethanol and deionized water were added, to provide a water-based paint composition (X-36) whose pH was 8.0, solid content, 48%, and viscosity, 30 seconds as measured with Ford cup No. 4 at 20° C.

Example 37

A pigment-dispersed paste was obtained by mixing 56 parts (solid resin content, 25 parts) of the hydroxyl-containing polyester resin solution (A1-1) as obtained in Production Example 1, 60 parts of JR-806, 1 part of CARBON MA-100, 15 parts of BARIACE B-35, 3 parts of MICRO ACE S-3 and 5 parts of deionized water; adjusting its pH to 8.0 with 2-(dimethylamino)ethanol and dispersing it with a paint shaker for 30 minutes.

Then 140 parts of so obtained pigment-dispersed paste, 29 parts of the hydroxyl-containing polyester resin solution (A1-1) as obtained in Production Example 1, 25 parts of the hydroxyl-containing acrylic resin solution (A2-1) as obtained in Production Example 5, 28 parts of U-COAT UX-8100, 33 parts of melamine resin (B-1), 15 parts of BAYHYDUR VPLS 2310, 33 parts of the resin particle dispersion (C1-6) as obtained in Production Example 12 and 10 parts of 2-ethyl-1-hexanol (soluble mass in 100 g of water at 20° C.: 0.1 g) were uniformly mixed.

Thereafter 2-(dimethylamino)ethanol and deionized water were added to the formed mixture to provide a water-based paint composition (X-37) whose pH was 8.0 and the viscosity, 30 seconds as measured with Ford cup No. 4 at 20° C.

Example 74

A pigment-dispersed paste was obtained by mixing 56 parts (solid resin content, 25 parts) of the hydroxyl-containing polyester resin solution (A1-1) as obtained in Production Example 1, 60 parts of JR-806, 1 part of CARBON MA-100, 15 parts of BARIACE B-35, 3 parts of MICRO ACE S-3 and 5 parts of deionized water; adjusting its pH to 8.0 with 2-(dimethylamino)ethanol and dispersing it with a paint shaker for 30 minutes.

Then 140 parts of so obtained pigment-dispersed paste, 29 parts of the hydroxyl-containing polyester resin solution (A1-1) as obtained in Production Example 1, 25 parts of the hydroxyl-containing acrylic resin solution (A2-1) as obtained in Production Example 5, 28 parts of U-COAT UX-8100, 33 parts of melamine resin (B-1), 15 parts of BAYHYDUR VPLS 2310, 33 parts of the resin particle dispersion (C2-6) as obtained in Production Example 37 and 10 parts of 2-ethyl-1-hexanol (soluble mass in 100 g of water at 20° C.; 0.1 g) were uniformly mixed.

To the resulting mixture then PRIMAL ASE-60 (tradename, Rohm & Haas Co., polyacrylic thickener), 2-(dimethylamino)ethanol and deionized water were added, to provide a water-based paint composition (X-74) whose pH was 8.0, solid content, 48%, and viscosity, 30 seconds as measured with Ford cup No. 4 at 20° C.

Example 75

A pigment-dispersed paste was obtained by mixing 56 parts (solid resin content, 25 parts) of the hydroxyl-containing polyester resin solution (A1-1) as obtained in Production Example 1, 60 parts of JR-806, 1 part of CARBON MA-100, 15 parts of BARIACE B-35, 3 parts of MICRO ACE S-3 and 5 parts of deionized water; adjusting its pH to 8.0 with 2-(dimethylamino)ethanol and dispersing it with a paint shaker for 30 minutes.

Then 140 parts of so obtained pigment-dispersed paste, 29 parts of the hydroxyl-containing polyester resin solution (A1-1) as obtained in Production Example 1, 25 parts of the hydroxyl-containing acrylic resin solution (A2-1) as obtained in Production Example 5, 28 parts of U-COAT UX-8100, 33 parts of melamine resin (B-1), 15 parts of BAYHYDUR VPLS 2310, 33 parts of the resin particle dispersion (C2-6) as obtained in Production Example 37 and 10 parts of 2-ethyl-1-hexanol (soluble mass in 100 g of water at 20° C.; 0.1 g) were uniformly mixed.

Thereafter 2-(dimethylamino)ethanol and deionized water were added to the formed mixture to provide a water-based paint composition (X-75) whose pH was 8.0 and the viscosity, 30 seconds as measured with Ford cup No. 4 at 20° C.

TABLE 3

| | | | | | Example | | | | | | | | | |
|---|---|---|---|---|---|---|---|---|---|---|---|---|---|---|
| | | | | | 1 | 2 | 3 | 4 | 5 | 6 | 7 | 8 | 9 | 10 |
| | | Water-based paint composition | | | X-1 | X-2 | X-3 | X-4 | X-5 | X-6 | X-7 | X-8 | X-9 | X-10 |
| Pigment-dispersed paste | Aqueous film-forming resin (A) | Hydroxyl-containing polyester resin (A1) | | kind | A1-1 | A1-1 | A1-1 | A1-1 | A1-1 | A1-1 | A1-1 | A1-1 | A1-1 | A1-1 |
| | | | | amount | 56 | 56 | 56 | 56 | 56 | 56 | 56 | 56 | 56 | 56 |
| | Pigment (D) | coloring pigment | JR-806 | amount | 60 | 60 | 60 | 60 | 60 | 60 | 60 | 60 | 60 | 60 |
| | | | MA-100 | amount | 1 | 1 | 1 | 1 | 1 | 1 | 1 | 1 | 1 | 1 |
| | | extender pigment | BARIACE B-35 | amount | 15 | 15 | 15 | 15 | 15 | 15 | 15 | 15 | 15 | 15 |
| | | | MICRO ACE S-3 | amount | 3 | 3 | 3 | 3 | 3 | 3 | 3 | 3 | 3 | 3 |
| Aqueous film-forming resin (A) | | hydroxyl-containing polyester resin (A1) | | kind | A1-1 | A1-1 | A1-1 | A1-1 | A1-1 | A1-1 | A1-1 | A1-1 | A1-1 | A1-1 |
| | | | | amount | 29 | 29 | 29 | 29 | 29 | 29 | 29 | 29 | 29 | 29 |
| | | hydroxyl-containing acrylic resin (A2) | | kind | A2-1 | A2-1 | A2-1 | A2-1 | A2-1 | A2-1 | A2-1 | A2-1 | A2-1 | A2-1 |
| | | | | amount | 25 | 25 | 25 | 25 | 25 | 25 | 25 | 25 | 25 | 25 |
| | | urethane emulsion | U-COAT UX-5100 | amount | 28 | 28 | 28 | 28 | 28 | 28 | 28 | 28 | 28 | 28 |
| Curing agent (B) | | melamine resin | | kind | B-1 | B-1 | B-1 | B-1 | B-1 | B-1 | B-1 | B-1 | B-1 | B-1 |
| | | | | amount | 33 | 33 | 33 | 33 | 33 | 33 | 33 | 33 | 33 | 33 |
| | | blocked polyisocyanate compound | BAYHYDUR VPLS2310 | amount | 15 | 15 | 15 | 15 | 15 | 15 | 15 | 15 | 15 | 15 |
| Crosslinked resin particles (C) | | | | kind | C1-1 | C1-2 | C1-3 | C1-4 | C1-5 | C1-6 | C1-7 | C1-8 | C1-9 | C1-10 |
| | | | | amount | 33 | 33 | 33 | 33 | 33 | 33 | 33 | 33 | 33 | 33 |
| Hydrophobic solvent (E) | | | 2-ethyl-1-hexanol | amount | 10 | 10 | 10 | 10 | 10 | 10 | 10 | 10 | 10 | 10 |

| | | | | | Example | | | | | | | | | |
|---|---|---|---|---|---|---|---|---|---|---|---|---|---|---|
| | | | | | 11 | 12 | 13 | 14 | 15 | 16 | 17 | 18 | 19 | 20 |
| | | Water-based paint composition | | | X-11 | X-12 | X-13 | X-14 | X-15 | X-16 | X-17 | X-18 | X-19 | X-20 |
| Pigment-dispersed paste | Aqueous film-forming resin (A) | Hydroxyl-containing polyester resin (A1) | | kind | A1-1 | A1-1 | A1-1 | A1-1 | A1-1 | A1-1 | A1-1 | A1-1 | A1-1 | A1-1 |
| | | | | amount | 56 | 56 | 56 | 56 | 56 | 56 | 56 | 56 | 56 | 56 |
| | Pigment (D) | coloring pigment | JR-806 | amount | 60 | 60 | 60 | 60 | 60 | 60 | 60 | 60 | 60 | 60 |
| | | | MA-100 | amount | 1 | 1 | 1 | 1 | 1 | 1 | 1 | 1 | 1 | 1 |
| | | extender pigment | BARIACE B-35 | amount | 15 | 15 | 15 | 15 | 15 | 15 | 15 | 15 | 15 | 15 |
| | | | MICRO ACE S-3 | amount | 3 | 3 | 3 | 3 | 3 | 3 | 3 | 3 | 3 | 3 |
| Aqueous film-forming resin (A) | | hydroxyl-containing polyester resin (A1) | | kind | A1-1 | A1-1 | A1-1 | A1-1 | A1-1 | A1-1 | A1-1 | A1-1 | A1-1 | A1-1 |
| | | | | amount | 29 | 29 | 29 | 29 | 29 | 29 | 29 | 29 | 29 | 29 |
| | | hydroxyl-containing acrylic resin (A2) | | kind | A2-1 | A2-1 | A2-1 | A2-1 | A2-1 | A2-1 | A2-1 | A2-1 | A2-1 | A2-1 |
| | | | | amount | 25 | 25 | 25 | 25 | 25 | 25 | 25 | 25 | 25 | 25 |
| | | urethane emulsion | U-COAT UX-5100 | amount | 28 | 28 | 28 | 28 | 28 | 28 | 28 | 28 | 28 | 28 |
| Curing agent (B) | | melamine resin | | kind | B-1 | B-1 | B-1 | B-1 | B-1 | B-1 | B-1 | B-1 | B-1 | B-1 |
| | | | | amount | 33 | 33 | 33 | 33 | 33 | 33 | 33 | 33 | 33 | 33 |
| | | blocked polyisocyanate compound | BAYHYDUR VPLS2310 | amount | 15 | 15 | 15 | 15 | 15 | 15 | 15 | 15 | 15 | 15 |
| Crosslinked resin particles (C) | | | | kind | C1-11 | C1-12 | C1-13 | C1-14 | C1-15 | C1-16 | C1-17 | C1-18 | C1-19 | C1-20 |
| | | | | amount | 33 | 33 | 33 | 33 | 33 | 33 | 33 | 33 | 33 | 33 |
| Adipic dihydrazide | | | | amount | | | 1.5 | | | | | | | |
| Hydrophobic solvent (E) | | | 2-ethyl-1-hexanol | amount | 10 | 10 | 10 | 10 | 10 | 10 | 10 | 10 | 10 | 10 |

| | | | | | Example | | | | | | | | | |
|---|---|---|---|---|---|---|---|---|---|---|---|---|---|---|
| | | | | | 21 | 22 | 23 | 24 | 25 | 26 | 27 | 28 | 29 | 30 |
| | | Water-based paint composition | | | X-21 | X-22 | X-23 | X-24 | X-25 | X-26 | X-27 | X-28 | X-29 | X-30 |
| Pigment dispersed paste | Aqueous film-forming resin (A) | Hydroxyl-containing polyester resin (A1) | | kind | A1-2 | A1-3 | A1-1 | A1-1 | A1-1 | A1-1 | A1-1 | A1-1 | A1-1 | A1-1 |
| | | | | amount | 56 | 56 | 56 | 56 | 56 | 56 | 56 | 56 | 56 | 56 |
| | Pigment (D) | coloring pigment | JR-806 | amount | 60 | 60 | 60 | 60 | 60 | 60 | 60 | 60 | 60 | 60 |
| | | | MA-100 | amount | 1 | 1 | 1 | 1 | 1 | 1 | 1 | 1 | 1 | 1 |

TABLE 3-continued

|  |  |  |  |  |  |  |  |  |  |  |  |  |
|---|---|---|---|---|---|---|---|---|---|---|---|---|
|  | extender pigment | BARIACE B-35 | amount | 15 | 15 | 15 | 15 | 15 | 15 | 15 | 15 | 15 | 15 |
|  |  | MICRO ACE S-3 | amount | 3 | 3 | 3 | 3 | 3 | 3 | 3 | 3 | 3 | 3 |
| Aqueous film-forming resin (A) | hydroxyl-containing polyester resin (A1) | | kind | A1-2 | A1-3 | A1-1 | A1-1 | A1-1 | A1-1 | A1-1 | A1-4 | A1-4 | A1-1 |
|  |  |  | amount | 29 | 29 | 23 | 29 | 29 | 42 | 42 | 78 | 100 | 22 |
|  |  |  | kind |  |  |  |  |  |  |  |  |  | A1-4 |
|  |  |  | amount |  |  |  |  |  |  |  |  |  | 22 |
|  | hydroxyl-containing acrylic resin (A2) | | kind | A2-1 | A2-1 | A2-1 | A2-1 | A2-1 | A2-1 | A2-1 |  |  | A2-1 |
|  |  |  | amount | 25 | 25 | 12 | 25 | 25 | 25 | 25 |  |  | 12 |
|  |  |  | kind |  |  | A2-1 |  |  |  |  |  |  | A2-2 |
|  |  |  | amount |  |  | 25 |  |  |  |  |  |  | 12 |
|  | urethane emulsion | U-COAT UX-5100 | amount | 28 | 28 | 28 | 28 | 28 |  |  |  |  |  |
| Curing agent (B) | melamine resin | | kind | B-1 | B-1 | B-1 | B-1 | B-2 (note 2) |  |  |  |  | B-1 |
|  |  |  | amount | 33 | 33 | 33 | 40 | 33 |  |  |  |  | 19 |
|  | polyisocyanate compound | BAYHYDUR XP2570 (note 3) | amount |  |  |  |  |  | 26 |  |  |  |  |
|  |  | BAYHYDUR VPLS2319 (note 4) | amount |  |  |  |  |  |  | 26 |  |  |  |
|  | blocked polyisocyanate compound | BAYHYDUR VPLS2310 | amount | 15 | 15 | 10 |  | 15 |  |  |  |  |  |
|  | carbodiimido group-containing compound | CARBODILITE SV-02 (note 5) | amount |  |  |  |  |  |  |  | 75 |  | 38 |
|  | oxazoline group-containing compound | EPOCROS WS-500 (note 6) | amount |  |  |  |  |  |  |  |  | 50 |  |
| Crosslinked resin particles (C) | | | kind | C1-6 | C1-6 | C1-2 | C1-17 | C1-11 | C1-6 | C1-6 | C1-6 | C1-6 | C1-6 |
|  |  |  | amount | 33 | 33 | 33 | 33 | 33 | 66 | 66 | 33 | 33 | 50 |
| Hydrophobic solvent (E) | 2-ethyl-1-hexanol | | amount | 10 | 10 | 10 | 10 | 10 | 10 | 10 | 10 | 10 | 10 |

|  |  |  |  |  | Example | | | | | | | | | |
|---|---|---|---|---|---|---|---|---|---|---|---|---|---|---|
|  |  |  |  |  | 31 | 32 | 33 | 34 | 35 | 36 | 37 | 38 | 39 | 40 |
|  |  | Water-based paint composition | | kind | X-31 | X-32 | X-33 | X-34 | X-35 | X-36 | X-37 | X-38 | X-39 | X-40 |
| Pigment dispersed paste | Aqueous film-forming resin (A) | Hydroxyl-containing polyester resin (A1) | | kind | A1-1 | A1-1 | A1-1 | A1-1 | A1-1 | A1-1 | A1-1 | A1-1 | A1-1 | A1-1 |
|  |  |  |  | amount | 56 | 56 | 56 | 56 | 56 | 56 | 56 | 56 | 56 | 56 |
|  | Pigment (D) | coloring pigment | JR-806 | amount | 60 | 60 | 60 | 60 | 60 | 60 | 60 | 60 | 60 | 60 |
|  |  |  | MA-100 | amount | 1 | 1 | 1 | 1 | 1 | 1 | 1 | 1 | 1 | 1 |
|  |  | extender pigment | BARIACE B-35 | amount |  | 15 | 15 | 15 | 15 | 15 | 15 | 15 | 15 | 15 |
|  |  |  | SPARWITE W-5HB (note 1) | amount | 15 |  |  |  |  |  |  |  |  |  |
|  |  |  | MICRO ACE S-3 | amount | 3 |  | 3 | 3 | 3 | 3 | 3 | 3 | 3 | 3 |
| Aqueous film-forming resin (A) | hydroxyl-containing polyester resin (A1) | | kind | A1-1 | A1-1 | A1-1 | A1-1 | A1-1 | A1-1 | A1-1 | A1-1 | A1-1 | A1-1 |
|  |  |  | amount | 29 | 29 | 29 | 29 | 21 | 29 | 29 | 29 | 29 | 29 |
|  |  |  | kind |  |  |  |  | A1-3 |  |  |  |  |  |
|  |  |  | amount |  |  |  |  | 18 |  |  |  |  |  |
|  | hydroxyl-containing acrylic resin (A2) | | kind | A2-1 | A2-1 | A2-1 | A2-1 | A2-1 | A2-1 | A2-1 | A2-1 | A2-1 | A2-1 |
|  |  |  | amount | 25 | 18 | 25 | 12 | 12 | 25 | 25 | 25 | 25 | 25 |
|  |  |  | kind |  |  |  | A2-2 | A2-2 |  |  |  |  |  |
|  |  |  | amount |  |  |  | 25 | 20 |  |  |  |  |  |
|  | urethane emulsion | U-COAT UX-5100 | amount | 34 | 28 | 28 | 28 |  | 28 | 28 | 28 | 28 | 28 |
| Curing agent (B) | melamine resin | | kind | B-1 | B-1 | B-1 | B-1 | B-1 | B-1 | B-1 | B-1 | B-1 | B-1 |
|  |  |  | amount | 33 | 30 | 33 | 30 | 33 | 33 | 33 | 33 | 33 | 33 |
|  | blocked polyisocyanate compound | BAYHYDUR VPLS2310 | amount | 15 | 15 | 15 | 15 | 15 | 15 | 15 | 15 | 15 | 15 |
| Crosslinked resin particles (C) | | | kind | C1-6 | C1-6 | C1-6 | C1-17 | C1-17 | C1-6 | C1-6 | C2-1 | C2-2 | C2-3 |
|  |  |  | amount | 27 | 50 | 33 | 33 | 40 | 33 | 33 | 33 | 33 | 33 |
| Hydrophobic solvent (E) | 2-ethyl-1-hexanol | | amount | 10 | 10 |  | 10 | 10 | 10 | 10 | 10 | 10 | 10 |
|  | Ethylene glycol mono-n-butyl ether (note 7) | | amount |  |  | 10 |  |  |  |  |  |  |  |
| Diester compound (F) | diester compound (F-1) (note 8) | | amount |  |  |  |  | 10 |  |  |  |  |  |

TABLE 3-continued

|  |  |  |  | Example | | | | | | | | | |
|---|---|---|---|---|---|---|---|---|---|---|---|---|---|
|  |  |  |  | 41 | 42 | 43 | 44 | 45 | 46 | 47 | 48 | 49 | 50 |
| Water-based paint composition | | | | X-41 | X-42 | X-43 | X-44 | X-45 | X-46 | X-47 | X-48 | X-49 | X-50 |
| Pigment dispersed paste | Aqueous film-forming resin (A) | Hydroxyl-containing polyester resin (A1) | kind | A1-1 | A1-1 | A1-1 | A1-1 | A1-1 | A1-1 | A1-1 | A1-1 | A1-1 | A1-1 |
|  |  |  | amount | 56 | 56 | 56 | 56 | 56 | 56 | 56 | 56 | 56 | 56 |
|  | Pigment (D) | coloring pigment JR-806 | amount | 60 | 60 | 60 | 60 | 60 | 60 | 60 | 60 | 60 | 60 |
|  |  | MA-100 | amount | 1 | 1 | 1 | 1 | 1 | 1 | 1 | 1 | 1 | 1 |
|  |  | extender pigment BARIACE B-35 | amount | 15 | 15 | 15 | 15 | 15 | 15 | 15 | 15 | 15 | 15 |
|  |  | MICRO ACE S-3 | amount | 3 | 3 | 3 | 3 | 3 | 3 | 3 | 3 | 3 | 3 |
| Aqueous film-forming resin (A) | | hydroxyl-containing polyester resin (A1) | kind | A1-1 | A1-1 | A1-1 | A1-1 | A1-1 | A1-1 | A1-1 | A1-1 | A1-1 | A1-1 |
|  |  |  | amount | 29 | 29 | 29 | 29 | 29 | 29 | 29 | 29 | 29 | 29 |
|  |  | hydroxyl-containing acrylic resin (A2) | kind | A2-1 | A2-1 | A2-1 | A2-1 | A2-1 | A2-1 | A2-1 | A2-1 | A2-1 | A2-1 |
|  |  |  | amount | 25 | 25 | 25 | 25 | 25 | 25 | 25 | 25 | 25 | 25 |
|  |  | urethane emulsion U-COAT UX-5100 | amount | 28 | 28 | 28 | 28 | 28 | 28 | 28 | 28 | 28 | 28 |
| Curing agent (B) | | melamine resin | kind | B-1 | B-1 | B-1 | B-1 | B-1 | B-1 | B-1 | B-1 | B-1 | B-1 |
|  |  |  | amount | 33 | 33 | 33 | 33 | 33 | 33 | 33 | 33 | 33 | 33 |
|  |  | blocked polyisocyanate compound BAYHYDUR VPLS2310 | amount | 15 | 15 | 15 | 15 | 15 | 15 | 15 | 15 | 15 | 15 |
| Crosslinked resin particles (C) | | | kind | C2-4 | C2-5 | C2-6 | C2-7 | C2-8 | C2-9 | C2-10 | C2-11 | C2-12 | C2-13 |
|  |  |  | amount | 33 | 33 | 33 | 33 | 33 | 33 | 33 | 33 | 33 | 33 |
| Hydrophobic solvent (E) | | 2-ethyl-1-hexanol | amount | 10 | 10 | 10 | 10 | 10 | 10 | 10 | 10 | 10 | 10 |

|  |  |  |  | Example | | | | | | | | | |
|---|---|---|---|---|---|---|---|---|---|---|---|---|---|
|  |  |  |  | 51 | 52 | 53 | 54 | 55 | 56 | 57 | 58 | 59 | 60 |
| Water-based paint composition | | | | X-51 | X-52 | X-53 | X-54 | X-55 | X-56 | X-57 | X-58 | X-59 | X-60 |
| Pigment dispersed paste | Aqueous film-forming resin (A) | Hydroxyl-containing polyester resin (A1) | kind | A1-1 | A1-1 | A1-1 | A1-1 | A1-1 | A1-1 | A1-1 | A1-1 | A1-1 | A1-1 |
|  |  |  | amount | 56 | 56 | 56 | 56 | 56 | 56 | 56 | 56 | 56 | 56 |
|  | Pigment (D) | coloring pigment JR-806 | amount | 60 | 60 | 60 | 60 | 60 | 60 | 60 | 60 | 60 | 60 |
|  |  | MA-100 | amount | 1 | 1 | 1 | 1 | 1 | 1 | 1 | 1 | 1 | 1 |
|  |  | extender pigment BARIACE B-35 | amount | 15 | 15 | 15 | 15 | 15 | 15 | 15 | 15 | 15 | 15 |
|  |  | MICRO ACE S-3 | amount | 3 | 3 | 3 | 3 | 3 | 3 | 3 | 3 | 3 | 3 |
| Aqueous film-forming resin (A) | | hydroxyl-containing polyester resin (A1) | kind | A1-1 | A1-1 | A1-1 | A1-1 | A1-1 | A1-1 | A1-1 | A1-2 | A1-3 | A1-1 |
|  |  |  | amount | 29 | 29 | 29 | 29 | 29 | 29 | 29 | 29 | 29 | 23 |
|  |  | hydroxyl-containing acrylic resin (A2) | kind | A2-1 | A2-1 | A2-1 | A2-1 | A2-1 | A2-1 | A2-1 | A2-1 | A2-1 | A2-1 |
|  |  |  | amount | 25 | 25 | 25 | 25 | 25 | 25 | 25 | 25 | 25 | 12 |
|  |  |  | kind |  |  |  |  |  |  |  |  |  | A2-2 |
|  |  |  | amount |  |  |  |  |  |  |  |  |  | 25 |
|  |  | urethane emulsion U-COAT UX-5100 | amount | 28 | 28 | 28 | 28 | 28 | 28 | 28 | 28 | 28 | 28 |
| Curing agent (B) | | melamine resin | kind | B-1 | B-1 | B-1 | B-1 | B-1 | B-1 | B-1 | B-1 | B-1 | B-1 |
|  |  |  | amount | 33 | 33 | 33 | 33 | 33 | 33 | 33 | 33 | 33 | 33 |
|  |  | blocked polyisocyanate compound BAYHYDUR VPLS2310 | amount | 15 | 15 | 15 | 15 | 15 | 15 | 15 | 15 | 15 | 10 |
| Crosslinked resin particles (C) | | | kind | C2-14 | C2-15 | C2-16 | C2-17 | C2-18 | C2-19 | C2-20 | C2-6 | C2-6 | C2-2 |
|  |  |  | amount | 33 | 33 | 33 | 33 | 33 | 33 | 33 | 33 | 33 | 33 |
| Hydrophobic solvent (E) | | 2-ethyl-1-hexanol | amount | 10 | 10 | 10 | 10 | 10 | 10 | 10 | 10 | 10 | 10 |

|  |  |  |  | Example | | | | | | | | | |
|---|---|---|---|---|---|---|---|---|---|---|---|---|---|
|  |  |  |  | 61 | 62 | 63 | 64 | 65 | 66 | 67 | 68 | 69 | 70 |
| Water-based paint composition | | | | X-61 | X-62 | X-63 | X-64 | X-65 | X-66 | X-67 | X-68 | X-69 | X-70 |
| Pigment dispersed paste | Aqueous film-forming resin (A) | Hydroxyl-containing polyester resin (A1) | kind | A1-1 | A1-1 | A1-1 | A1-1 | A1-1 | A1-1 | A1-1 | A1-1 | A1-1 | A1-1 |
|  |  |  | amount | 56 | 56 | 56 | 56 | 56 | 56 | 56 | 56 | 56 | 56 |
|  | Pigment (D) | coloring pigment JR-806 | amount | 60 | 60 | 60 | 60 | 60 | 60 | 60 | 60 | 60 | 60 |
|  |  | MA-100 | amount | 1 | 1 | 1 | 1 | 1 | 1 | 1 | 1 | 1 | 1 |
|  |  | extender pigment BARIACE B-35 | amount | 15 | 15 | 15 | 15 | 15 | 15 | 15 |  | 15 | 15 |
|  |  | SPARWITE W-5HB (note 1) | amount |  |  |  |  |  |  |  | 15 |  |  |
|  |  | MICRO ACE S-3 | amount | 3 | 3 | 3 | 3 | 3 | 3 | 3 |  |  | 3 |
| Aqueous film-forming resin (A) | | hydroxyl-containing polyester resin (A1) | kind | A1-1 | A1-1 | A1-1 | A1-1 | A1-1 | A1-4 | A1-4 | A1-1 | A1-1 | A1-1 |
|  |  |  | amount | 29 | 29 | 42 | 42 | 78 | 100 |  | 22 | 29 | 29 |
|  |  |  | kind |  |  |  |  |  |  | A1-4 |  |  |  |
|  |  |  | amount |  |  |  |  |  |  | 22 |  |  |  |
|  |  | hydroxyl-containing acrylic resin (A2) | kind | A2-1 | A2-1 | A2-1 | A2-1 |  |  | A2-1 | A2-1 | A2-1 | A2-1 |
|  |  |  | amount | 25 | 25 | 25 | 25 |  |  | 12 | 25 | 18 | 25 |

TABLE 3-continued

| | | | | | | | | | | | | | |
|---|---|---|---|---|---|---|---|---|---|---|---|---|---|
| | | | kind | | | | | | A2-2 | | | | |
| | | | amount | | | | | | 12 | | | | |
| | urethane emulsion | U-COAT UX-5100 | amount | 28 | 28 | | | | | 34 | 28 | 28 | |
| Curing agent (B) | melamine resin | | kind | B-1 | B-2 (note 2) | | | | | B-1 | B-1 | B-1 | B-1 |
| | | | amount | 40 | 33 | | | | | 19 | 33 | 30 | 33 |
| | polyisocyanate compound | BAYHYDUR XP2570 (note 3) | amount | | | 26 | | | | | | | |
| | | BAYHYDUR VPLS2319 (note 4) | amount | | | | 26 | | | | | | |
| | blocked polyisocyanate compound | BAYHYDUR VPLS2310 | amount | | | | | | | | 15 | 15 | 15 |
| | carbodiimido group-containing compound | CARBODILITE SV-02 (note 5) | amount | | | | | 75 | | 38 | | | |
| | oxazoline group-containing compound | EPOCROS WS-500 (note 6) | amount | | 15 | | | | 50 | | | | |
| Crosslinked resin particles (C) | | | kind | C2-17 | C2-11 | C2-6 | C2-6 | C2-6 | C2-6 | C2-6 | C2-6 | C2-6 | C2-6 |
| | | | amount | 33 | 33 | 66 | 66 | 33 | 33 | 50 | 27 | 50 | 33 |
| Hydrophobic solvent (E) | | 2-ethyl-1-hexanol | amount | 10 | 10 | 10 | 10 | 10 | 10 | 10 | 10 | 10 | 10 |
| Ethylene glycol mono-n-butyl ether (note 7) | | | amount | | | | | | | | | | 10 |

| | | | | | Example | | | | |
|---|---|---|---|---|---|---|---|---|---|
| | | | | | 71 | 72 | 73 | 74 | 75 |
| | | Water-based paint composition | | | X-71 | X-72 | X-73 | X-74 | X-75 |
| Pigment dispersed paste | Aqueous film-forming resin (A) | Hydroxyl-containing polyester resin (A1) | | kind | A1-1 | A1-1 | A1-1 | A1-1 | A1-1 |
| | | | | amount | 56 | 56 | 56 | 56 | 56 |
| | Pigment (D) | coloring pigment | JR-806 | amount | 60 | 60 | 60 | 60 | 60 |
| | | | MA-100 | amount | 1 | 1 | 1 | 1 | 1 |
| | | extender pigment | BARIACE B-35 | amount | 15 | 15 | 15 | 15 | 15 |
| | | | MICRO ACE S-3 | amount | 3 | 3 | 3 | 3 | 3 |
| Aqueous film-forming resin (A) | | hydroxyl-containing polyester resin (A1) | | kind | A1-1 | A1-1 | A1-1 | A1-1 | A1-1 |
| | | | | amount | 23 | 23 | 21 | 29 | 29 |
| | | | | kind | | | A1-3 | | |
| | | | | amount | | | 18 | | |
| | | hydroxyl-containing acrylic resin (A2) | | kind | A2-1 | A2-1 | A2-1 | A2-1 | A2-1 |
| | | | | amount | 12 | 12 | 12 | 25 | 25 |
| | | | | kind | A2-2 | A2-2 | A2-2 | | |
| | | | | amount | 25 | 25 | 20 | | |
| | | urethane emulsion | U-COAT UX-5100 | amount | 28 | 28 | | 28 | 28 |
| Curing agent (B) | | melamine resin | | kind | B-1 | B-1 | B-1 | B-1 | B-1 |
| | | | | amount | 38 | 30 | 33 | 33 | 33 |
| | | blocked polyisocyanate compound | BAYHYDUR VPLS2310 | amount | | 15 | 15 | 15 | 15 |
| Crosslinked resin particles (C) | | | | kind | C2-6 | C2-6 | C2-17 | C2-6 | C2-6 |
| | | | | amount | 33 | 33 | 40 | 33 | 33 |
| Hydrophobic solvent (E) | | | 2-ethyl-1-hexanol | amount | 10 | 10 | 10 | 10 | 10 |
| Diester compound (F) | | | diester compound (F-1) (note 8) | amount | 10 | | | | |

| | | | | | Comparative Example | | | | | | | |
|---|---|---|---|---|---|---|---|---|---|---|---|---|
| | | | | | 1 | 2 | 3 | 4 | 5 | 6 | 7 | 8 |
| | | Water-based paint composition | | | X-76 | X-77 | X-78 | X-79 | X-80 | X-81 | X-82 | X-83 |
| Pigment dispersed paste | Aqueous film-forming resin (A) | Hydroxyl-containing polyester resin (A1) | | kind | A1-1 | A1-1 | A1-1 | A1-1 | A1-1 | A1-1 | A1-1 | A1-1 |
| | | | | amount | 56 | 56 | 56 | 56 | 56 | 56 | 56 | 56 |
| | Pigment (D) | coloring pigment | JR-806 | amount | 60 | 60 | 60 | 60 | 60 | 60 | 60 | 60 |
| | | | MA-100 | amount | 1 | 1 | 1 | 1 | 1 | 1 | 1 | 1 |
| | | extender pigment | BARIACE B-35 | amount | 15 | 15 | 15 | 15 | 15 | 15 | 15 | 15 |
| | | | MICRO ACE S-3 | amount | 3 | 3 | 3 | 3 | 3 | 3 | 3 | 3 |
| Aqueous film-forming resin (A) | | hydroxyl-containing polyester resin (A1) | | kind | A1-1 | A1-1 | A1-1 | A1-1 | A1-1 | A1-1 | A1-1 | A1-1 |
| | | | | amount | 29 | 29 | 29 | 29 | 29 | 29 | 29 | 29 |
| | | hydroxyl-containing acrylic resin (A2) | | kind | A2-1 | A2-1 | A2-1 | A2-1 | A2-1 | A2-1 | A2-1 | A2-1 |
| | | | | amount | 25 | 25 | 25 | 25 | 25 | 25 | 25 | 25 |
| | | urethane emulsion | U-COAT UX-5100 | amount | 56 | 28 | 28 | 28 | 28 | 28 | 28 | 28 |

TABLE 3-continued

| Curing agent (B) | melamine resin | | kind | B-1 | B-1 | B-1 | B-1 | B-1 | B-1 | B-1 | B-1 |
|---|---|---|---|---|---|---|---|---|---|---|---|
| | | | amount | 33 | 33 | 33 | 33 | 33 | 33 | 33 | 33 |
| | blocked polyisocyanate compound | BAYHYDUR VPLS2310 | amount | 15 | 15 | 15 | 15 | 15 | 15 | 15 | 15 |
| Crosslinked resin particles (C) | | | kind | C1-21 | C1-22 | C2-21 | C2-22 | C1-23 | C1-24 | C1-25 | |
| | | | amount | 33 | 33 | 33 | 33 | 33 | 33 | 33 | |
| Hydrophobic solvent (E) | 2-ethyl-1-hexanol | | amount | 10 | 10 | 10 | 10 | 10 | 10 | 10 | 10 |

(note 1) SPARWITE W-5HB: tradename, Wilbur-Ellis Co., barium sulfate powder, average primary particle size, 1.6 μm
(note 2) Melamine resin (B-2): methyl-etherified melamine resin, solid content 80%, weight-average molecular weight 800
(note 3) BAYHYDUR XP2570: tradename, Sumika Bayer Urethane Co., Ltd., anionic hydrophilic polyisocyanate compound, solid content 100%
(note 4) BAYHYDUR VPLS2319: tradename, Sumika Bayer Urethane Co., Ltd., nonionic hydrophilic polyisocyanate compound, solid content 100%
(note 5) CARBODILITE V-02: tradename, Nisshinbo Industries, Inc., carbodiimido group-containing compound, solid content 40%
(note 6) EPOCROS WS-500: tradename, Nippon Shokubai Co., Ltd., oxazoline group-containing compound, solid content 40%
(note 7) Ethylene glycol mono-n-butyl ether: its mass soluble in 100 g of water at 20° C. is infinite
(note 8) Diester compound (F-1): a diester compound of polyoxyethylene glycol with 2-ethylhexanoic acid, corresponding to the compound of the general formula (1) in which $R^1$ and $R^2$ are 2-ethylheptyl groups, $R^3$ is ethylene group and m is 7; molecular weight 578

Production Example of Acrylic Resin Emulsion for Water-based Top Coat Paint and Water-based Base Coat Paint Production Example 54

A reactor equipped with a thermometer, thermostat, stirrer, reflux condenser, nitrogen-inlet pipe and dropping device was charged with 130 parts of deionized water and 0.52 part of AQUALON KH-10 which were stirred and mixed in gaseous nitrogen current. The temperature was raised to 80° C., and then 1% of the total amount of a later specified monomer emulsion (1) and 5.3 parts of 6% aqueous ammonium persulfate solution were introduced into the reactor and kept at 80° C. for 15 minutes. Then the remainder of the monomer emulsion (1) was dropped into the reactor which was maintained at the same temperature, over 3 hours, followed by an hour's aging. Thereafter a monomer emulsion (2) as specified later was added dropwise over an hour, aged for an hour, and the reaction mixture was cooled to 30° C. under gradual addition of 40 parts of a 5% aqueous dimethylethanolamine solution into the reactor. The reaction mixture was discharged from the reactor while being filtered through 100 mesh Nylon cloth, to provide an acrylic resin emulsion (AC) having a solid content of 30%, the average particle size of the emulsion being 100 nm [as measured with a submicron particle size distribution measuring device, COULTER N4 Model (tradename, Beckman Coulter, Inc.), as to a sample diluted with deionized water at 20° C.]. Thus obtained acrylic resin had an acid value of 33 mgKOH/g and a hydroxyl value of 25 mgKOH/g.

Monomer emulsion (1): the monomer emulsion (1) was obtained by mixing by stirring 42 parts of deionized water, 0.72 part of AQUALON KH-10, 2.1 parts of methylenebisacrylamide, 2.8 parts of styrene, 16.1 parts of methyl methacrylate, 28 parts of ethyl acrylate and 21 parts of n-butyl acrylate.

Monomer emulsion (2): the monomer emulsion (2) was obtained by mixing by stirring 18 parts of deionized water, 0.31 part of AQUALON KH-10, 0.03 part of ammonium persulfate, 5.1 parts of methacrylic acid, 5.1 parts of 2-hydroxyethyl acrylate, 3 parts of styrene, 6 parts of methyl methacrylate, 1.8 parts of ethyl acrylate and 9 parts of n-butyl acrylate.

Production of Polyester Resin for Water-based Top Coat Paint and Water-based Base Coat Paint Production Example 55

A reactor equipped with a thermometer, thermostat, stirrer, reflux condenser and water separator was charged with 109 parts of trimethylolpropane, 141 parts of 1,6-hexanediol, 126 parts of hexahydrophthalic anhydride and 120 parts of adipic acid, and the temperature therein was raised from 160° C. to 230° C. over 3 hours, followed by 4 hours' condensation reaction at 230° C. Then further 38.3 parts of trimellitic anhydride was added to add carboxyl group to the formed condensation reaction product and reacted at 170° C. for 30 minutes. The reaction product was diluted with 2-ethyl-1-hexanol (whose soluble mass in 100 g of water at 20° C.: 0.1 g) to provide a polyester resin solution (PE1) having a solid content of 70%. The resultant polyester resin had an acid value of 46 mgKOH/g, hydroxyl value of 150 mgKOH/g, solid content of 70% and weight-average molecular weight of 6,400.

Production Example 56

Production Example 55 was repeated except that the diluting solvent was changed from 2-ethyl-1-hexanol to ethylene glycol mono-n-butyl ether (whose soluble mass in 100 g of water at 20° C.: infinite) to provide a polyester resin solution (PE2).

Production Example of Pigment-Dispersed Paste for Water-based Top Coat

Production Example 57

A pigment-dispersed paste was obtained by mixing 56 parts (solid resin content, 25 parts) of the hydroxyl-containing polyester resin solution (A1-1) as obtained in Production Example 1, 60 parts of JR-806 (tradename, Tayca Corporation, rutile type titanium dioxide) and 5 parts of deionized water, adjusting its pH to 8.0 with 2-(dimethylamino)ethanol and dispersing the mixture with a paint shaker for 30 minutes.

Production Example of Effect Pigment Dispersion for Water-based Base Coat Paint

Production Example 58

Within an agitation mixing vessel, 19 parts of aluminum pigment paste, GX-180A (Asahikasei Metals Co., Ltd., metal content 74%), 35 parts of 2-ethyl-1-hexanol, 8 parts of phosphoric acid group-containing resin solution (note 9) and 0.2 part of 2-(dimethylamino)ethanol were uniformly mixed to provide an effect pigment dispersion (P1).

(note 9) Phosphoric acid group-containing resin solution: A reactor equipped with a thermometer, thermostat, stirrer, reflux condenser, nitrogen inlet pipe and dropping device was charged with a mixed solvent of 27.5 parts of methoxypropanol and 27.5 parts of isobutanol. After heating it to 110° C., 121.5 parts of a mixture consisting of 25 parts of styrene, 27.5 parts of n-butyl methacrylate, 20 parts of Isostearyl Acrylate (tradename, Osaka Organic Chemical Industry, Ltd., branched higher alkyl acrylate), 7.5 parts of 4-hydroxybutyl acrylate, 15 parts of phosphoric acid group-containing polymerizable monomer (note 10), 12.5 parts of 2-methacryloyloxy-ethyl acid phosphate, 10 parts of isobutanol and 4 parts of t-butyl peroxyoctanoate was added to the mixed solvent dropwise over 4 hours, and thereafter further a mixture of 0.5 part of t-butyl peroxyoctanoate and 20 parts of isopropanol was added dropwise over an hour. Stirring and aging the reaction mixture for a subsequent hour, a phosphoric acid group-containing resin solution having a solid content of 50% was obtained. The acid value of this resin attributable to the phosphoric acid groups was 83 mgKOH/g, hydroxyl value was 29 mgKOH/g and weight-average molecular weight was 10,000.

(note 10) Phosphoric acid group-containing polymerizable monomer: A reactor equipped with a thermometer, thermostat, stirrer, reflux condenser, nitrogen inlet pipe and dropping device was charged with 57.5 parts of monobutylphosphoric acid and 41 parts of isobutanol. Raising the temperature to 90° C., 42.5 parts of glycidyl methacrylate was added dropwise over 2 hours, followed by an hour's aging under stirring. Then 59 parts of isopropanol was added to provide a phosphoric acid group-containing polymerizable monomer solution having a solid content of 50%. Thus obtained monomer had an acid value attributable to the phosphoric acid groups of 285 mgKOH/g.

Production Example 59

Production Example 58 was repeated except that 35 parts of the 2-ethyl-1-hexanol was replaced with 35 parts of ethylene glycol mono-n-butyl ether, to provide an effect pigment dispersion (P2).

Preparation of Water-based Top Coat Paint

Production Example 60

A water-based top coat paint (Y-1) of pH 8.0, having a solid content of 48% and a viscosity of 60 seconds as measured with Ford cup No. 4 at 20° C. was obtained by uniformly mixing 100 parts of the acrylic resin emulsion (AC) as obtained in Production Example 54, 21 parts of the polyester resin solution (PE1) as obtained in Production Example 55, 121 parts of the pigment-dispersed paste as obtained in Production Example 57, 35 parts of 2-ethyl-1-hexanol and 37.5 parts of CYMEL 325 (tradename, Nihon Cytec Industries, Inc., melamine resin, solid content 80%) and further adding thereto PRIMAL ASE-60, 2-(dimethylamino)ethanol and deionized water.

Preparation of Water-based Base Coat Paint

Production Example 61

A water-based base coat paint (Y-2) of pH8.0, having a solid content of 25% and a viscosity of 40 seconds as measured with Ford cup No. 4 at 20° C. was obtained by uniformly mixing 100 parts of the acrylic resin emulsion (AC) as obtained in Production Example 54, 57 parts of the polyester resin solution (PE1) as obtained in Production Example 55, 62 parts of the effect pigment dispersion (P1) as obtained in Production Example 58 and 37.5 parts of CYMEL 325, and further adding thereto PRIMAL ASE-60, 2-(dimethylamino) ethanol and deionized water.

Production Example 62

A water-based base coat paint (Y-3) of pH8.0, having a solid content of 25% and a viscosity of 40 seconds as measured with Ford cup No. 4 at 20° C. was obtained by uniformly mixing 100 parts of the acrylic resin emulsion (AC) as obtained in Production Example 54, 57 parts of the polyester resin solution (PE2) as obtained in Production Example 56, 62 parts of the effect pigment dispersion (P2) as obtained in Production Example 59 and 37.5 parts of CYMEL 325, and further adding thereto PRIMAL ASE-60, 2-(dimethylamino) ethanol and deionized water.

Coating Film-forming Method

Test plates were prepared using each of the water-based paint compositions (X-1)-(X-83) as obtained in Examples 1-75 and Comparative Examples 1-8, the water-based top coat paint (Y-1) of Production Example 60 and water-based base coat paints (Y-2)-(Y-3) as obtained in Production Examples 61-62, by the following procedure, and their evaluation tests were conducted.

(Preparation of Test Coating Object)

Onto cold-rolled steel sheets which had been given a zinc phosphate chemical conversion treatment, ELECRON GT-10 (tradename, Kansai Paint Co., cationic electrodeposition paint) was electrocoated to a dry film thickness of 20 μm, and dried at 170° C. for 30 minutes to be cured, to provide the test coating object.

Example 76

Onto the above test coating object, the water-based paint composition (X-1) as obtained in Example 1 was electrostatically coated with a rotary atomizing type electrostatic coater, to a cured film thickness of 20 μm to form an intermediate coating film. Leaving the object for 3 minutes and then pre-heating the same at 80° C. for 3 minutes, the water-based top coat paint (Y-1) as obtained in Production Example 60 was electrostatically coated on the uncured intermediate coating film with a rotary atomizing type electrostatic coater, to a cured film thickness of 35 μm, to form a top coating film. After leaving the object for 3 minutes and then pre-heating the same at 80° C. for 3 minutes, the intermediate coating film and the top coating film were simultaneously cured by heating at 140° C. for 30 minutes, to provide the test plate.

Examples 77-150, Comparative Examples 9-16

Example 76 was repeated except that the water-based paint composition (X-1) as obtained in Example 1 was replaced with one of the water-based paint compositions (X-2)-(X-83) as shown in the following Table 4 to provide the test plates.

Example 151

Onto the above test coating object, the water-based paint composition (X-1) as obtained in Example 1 was electrostatically coated with a rotary atomizing type electrostatic coater, to a cured film thickness of 20 μm to form an intermediate coating film. Leaving the object for 3 minutes and then pre-heating the same at 80° C. for 3 minutes, the water-based base coat paint (Y-2) as obtained in Production Example 61 was electrostatically coated on the uncured intermediate coating film with a rotary atomizing type electrostatic coater, to a cured film thickness of 15 μm, to form a base coat coating film. After leaving the object for 3 minutes and then preheating the same at 80° C. for 3 minutes, onto the uncured base coat coating film, MAGICRON KINO-1210 (tradename, Kansai Paint Co., an acrylic resin-containing, solvent-based top clear paint which may be hereafter referred to as "clear paint (Z-1)") was electrostatically applied to a cured film thickness of 35 μm to form a clear coating film. After allowing the so coated object to stand for 7 minutes, the intermediate coating film, base coat coating film and clear coating film were simultaneously cured by heating at 140° C. for 30 minutes, to provide the test plate.

Examples 152-227, Comparative Examples 17-24

Example 151 was repeated except that the water-based paint composition (X-1) as obtained in Example 1 was replaced with one of those water-based paint compositions (X-2)-(X-83) as shown in the following Table 5, and the water-based base coat paint (Y-2) was replaced with the water-based base coat paint (Y-2) or (Y-3) as shown in Table 5, to provide the test plates.
Evaluation Tests
The test plates as obtained in above Examples 76-227 and Comparative Examples 9-24 were evaluated by the following test methods. The results of the evaluation were as shown in the following Tables 4 and 5.
(Test Method)
Smoothness: Evaluated Using we Value Measured with Wave Scan DOI (tradename, BYK Gardner Co.). We value is an index of an amplitude of surface roughness of the wavelengths ranging around 1-3 mm. The less the measured value, the higher the smoothness of the coated surface.
Distinctness of image: Evaluated using Wb value measured with Wave Scan DOI (tradename, BYK Gardner Co.). Wb value is an index of an amplitude of surface roughness of the wavelengths ranging around 0.3-1 mm. The less the measured value, the higher the distinctness of image of the coated surface.

Water resistance: The test plates were immersed in 40° C. warm water for 240 hours, withdrawn and dried at 20° C. for 12 hours. The multilayer coating film on each test plate was crosscut with a cutter to the depth reaching the substrate, to form one-hundred 2 mm×2 mm squares. Then an adhesive cellophane tape was stuck thereon, and rapidly peeled off at 20° C. The remaining condition of the coating film squares was examined.

⊙: One-hundred squares of the coating film remained, and no minor peeling of the coating film occurred at the cutting edges with the cutter.

○: One-hundred squares of the coating film remained, but minor peeling of the coating film occurred at the cutting edges with the cutter.

Δ: Remaining number of the squares was 90-99.

x: Remaining number of the square was not more than 89.

Chipping Resistance:

Each of the test plates was mounted on a test piece support in Suga Test Instruments Co., Ltd.'s gravel chipping test instrument JA-400 type (tradename, a chipping test device), and 50 g of crushed granite rock of particle size No. 7 was impinged at the coated surface at an angle of 45° over a distance of 30 cm, with compressed air of 0.392 MPa (4 $kg/cm^2$) at −20° C. Thereafter the test plates were washed with water, dried, and a cloth adhesive tape (Nichiban Co., Ltd.) was stuck on the coated surface. After peeling the tape off, the extent of thereby incurred damage on the coated film was visually observed and evaluated according to the following standard.

⊙: Size of the damage was very small, and the electrocoated surface or substrate steel sheet was not exposed.

○: Size of the damage was small, and the electrocoated surface or substrate steel sheet was not exposed.

Δ: Size of the damage was small but the electrocoated surface or substrate steel sheet was exposed.

x: Size of the damage was considerably large and the substrate steel sheet also was heavily exposed.

TABLE 4

| | | Water-based paint composition | Water-based top coat paint | Results of Evaluation | | | |
|---|---|---|---|---|---|---|---|
| | | | | smoothness | distinctness of image | water resistance | chipping resistance |
| Example | 76 | X-1 | Y-1 | 28.8 | 27.8 | ○ | ⊙ |
| | 77 | X-2 | Y-1 | 22.7 | 25.0 | ○ | ○ |
| | 78 | X-3 | Y-1 | 29.8 | 29.7 | ○ | ○ |
| | 79 | X-4 | Y-1 | 29.6 | 28.9 | ○ | ○ |
| | 80 | X-5 | Y-1 | 26.6 | 25.2 | ⊙ | ○ |
| | 81 | X-6 | Y-1 | 21.4 | 23.4 | ⊙ | ⊙ |
| | 82 | X-7 | Y-1 | 22.6 | 23.6 | ○ | ⊙ |
| | 83 | X-8 | Y-1 | 23.5 | 23.5 | ○ | ⊙ |
| | 84 | X-9 | Y-1 | 25.9 | 24.9 | ○ | ○ |
| | 85 | X-10 | Y-1 | 22.3 | 25.3 | ○ | ○ |
| | 86 | X-11 | Y-1 | 24.6 | 25.7 | ⊙ | ⊙ |
| | 87 | X-12 | Y-1 | 26.4 | 27.4 | ⊙ | ⊙ |
| | 88 | X-13 | Y-1 | 26.4 | 24.4 | ○ | ○ |
| | 89 | X-14 | Y-1 | 25.5 | 25.5 | ○ | ○ |
| | 90 | X-15 | Y-1 | 26.6 | 27.6 | ⊙ | ⊙ |
| | 91 | X-16 | Y-1 | 21.7 | 23.9 | ⊙ | ⊙ |
| | 92 | X-17 | Y-1 | 19.6 | 21.6 | ⊙ | ⊙ |
| | 93 | X-18 | Y-1 | 22.4 | 23.8 | ⊙ | ⊙ |
| | 94 | X-19 | Y-1 | 24.5 | 24.5 | ○ | ⊙ |
| | 95 | X-20 | Y-1 | 24.5 | 23.5 | ○ | ⊙ |
| | 96 | X-21 | Y-1 | 22.4 | 24.4 | ⊙ | ○ |
| | 97 | X-22 | Y-1 | 23.4 | 25.4 | ○ | ⊙ |
| | 98 | X-23 | Y-1 | 22.2 | 23.2 | ⊙ | ⊙ |
| | 99 | X-24 | Y-1 | 20.6 | 22.6 | ⊙ | ○ |

TABLE 4-continued

|  | | Water-based paint composition | Water-based top coat paint | Results of Evaluation | | | |
|---|---|---|---|---|---|---|---|
|  | | | | smoothness | distinctness of image | water resistance | chipping resistance |
| | 100 | X-25 | Y-1 | 25.0 | 26.0 | ○ | ○ |
| | 101 | X-26 | Y-1 | 22.2 | 22.7 | ⊙ | ⊙ |
| | 102 | X-27 | Y-1 | 22.4 | 23.7 | ○ | ⊙ |
| | 103 | X-28 | Y-1 | 23.5 | 23.9 | ○ | ○ |
| | 104 | X-29 | Y-1 | 23.9 | 24.0 | ○ | ○ |
| | 105 | X-30 | Y-1 | 22.5 | 22.8 | ⊙ | ⊙ |
| | 106 | X-31 | Y-1 | 23.2 | 24.2 | ⊙ | ⊙ |
| | 107 | X-32 | Y-1 | 22.8 | 25.8 | ○ | ○ |
| | 108 | X-33 | Y-1 | 26.3 | 26.3 | ○ | ○ |
| | 109 | X-34 | Y-1 | 19.4 | 20.4 | ⊙ | ⊙ |
| | 110 | X-35 | Y-1 | 22.6 | 22.6 | ⊙ | ○ |
| | 111 | X-36 | Y-1 | 23.7 | 23.7 | ⊙ | ⊙ |
| | 112 | X-37 | Y-1 | 24.6 | 25.6 | ⊙ | ⊙ |
| | 113 | X-38 | Y-1 | 29.3 | 28.4 | ○ | ○ |
| | 114 | X-39 | Y-1 | 23.2 | 25.7 | ○ | ○ |
| | 115 | X-40 | Y-1 | 29.6 | 29.6 | ○ | ○ |
| | 116 | X-41 | Y-1 | 29.4 | 29.1 | ○ | ○ |
| | 117 | X-42 | Y-1 | 26.9 | 25.4 | ⊙ | ○ |
| | 118 | X-43 | Y-1 | 21.9 | 23.6 | ⊙ | ⊙ |
| | 119 | X-44 | Y-1 | 23.2 | 23.9 | ○ | ⊙ |
| | 120 | X-45 | Y-1 | 24.1 | 23.7 | ○ | ⊙ |
| | 121 | X-46 | Y-1 | 26.5 | 25.4 | ○ | ○ |
| | 122 | X-47 | Y-1 | 22.8 | 25.4 | ○ | ○ |
| | 123 | X-48 | Y-1 | 25.2 | 26.1 | ⊙ | ⊙ |
| | 124 | X-49 | Y-1 | 26.6 | 27.9 | ⊙ | ⊙ |
| | 125 | X-50 | Y-1 | 26.9 | 24.6 | ○ | ○ |
| | 126 | X-51 | Y-1 | 23.8 | 26.0 | ⊙ | ⊙ |
| | 127 | X-52 | Y-1 | 23.2 | 24.9 | ⊙ | ⊙ |
| | 128 | X-53 | Y-1 | 25.3 | 26.5 | ⊙ | ⊙ |
| | 129 | X-54 | Y-1 | 20.2 | 21.9 | ⊙ | ⊙ |
| | 130 | X-55 | Y-1 | 22.7 | 24.5 | ⊙ | ⊙ |
| | 131 | X-56 | Y-1 | 24.7 | 25.1 | ○ | ○ |
| | 132 | X-57 | Y-1 | 25.0 | 23.8 | ○ | ○ |
| | 133 | X-58 | Y-1 | 23.0 | 24.6 | ⊙ | ○ |
| | 134 | X-59 | Y-1 | 23.8 | 25.7 | ○ | ⊙ |
| | 135 | X-60 | Y-1 | 22.5 | 23.4 | ⊙ | ⊙ |
| | 136 | X-61 | Y-1 | 21.0 | 23.1 | ⊙ | ○ |
| | 137 | X-62 | Y-1 | 25.7 | 26.6 | ○ | ○ |
| | 138 | X-63 | Y-1 | 22.5 | 23.2 | ⊙ | ⊙ |
| | 139 | X-64 | Y-1 | 22.7 | 24.2 | ○ | ⊙ |
| | 140 | X-65 | Y-1 | 24.0 | 24.0 | ○ | ○ |
| | 141 | X-66 | Y-1 | 24.5 | 24.1 | ○ | ○ |
| | 142 | X-67 | Y-1 | 22.9 | 23.0 | ⊙ | ⊙ |
| | 143 | X-68 | Y-1 | 23.5 | 24.4 | ⊙ | ⊙ |
| | 144 | X-69 | Y-1 | 23.4 | 26.3 | ○ | ○ |
| | 145 | X-70 | Y-1 | 26.5 | 26.7 | ○ | ○ |
| | 146 | X-71 | Y-1 | 20.8 | 22.9 | ⊙ | ⊙ |
| | 147 | X-72 | Y-1 | 20.8 | 22.7 | ⊙ | ⊙ |
| | 148 | X-73 | Y-1 | 23.2 | 22.8 | ⊙ | ○ |
| | 149 | X-74 | Y-1 | 24.3 | 24.1 | ⊙ | ⊙ |
| | 150 | X-75 | Y-1 | 25.2 | 25.9 | ⊙ | ⊙ |

TABLE 5

|  | | Water-based paint composition | Water-based base coat paint | Clear-paint | Results of Evaluation | | | |
|---|---|---|---|---|---|---|---|---|
|  | | | | | smoothness | distinctness of image | water resistance | chipping resistance |
| Example | 151 | X-1 | Y-2 | Z-1 | 27.1 | 26.2 | ○ | ⊙ |
| | 152 | X-2 | Y-2 | Z-1 | 21.1 | 23.3 | ○ | ○ |
| | 153 | X-3 | Y-2 | Z-1 | 29.2 | 28.1 | ○ | ○ |
| | 154 | X-4 | Y-2 | Z-1 | 28.0 | 27.2 | ○ | ○ |
| | 155 | X-5 | Y-2 | Z-1 | 24.9 | 23.8 | ⊙ | ○ |
| | 156 | X-6 | Y-2 | Z-1 | 20.1 | 21.8 | ⊙ | ⊙ |
| | 157 | X-7 | Y-2 | Z-1 | 21.2 | 21.9 | ○ | ⊙ |
| | 158 | X-8 | Y-2 | Z-1 | 22.2 | 21.8 | ○ | ⊙ |
| | 159 | X-9 | Y-2 | Z-1 | 24.3 | 23.1 | ○ | ○ |
| | 160 | X-10 | Y-2 | Z-1 | 21.1 | 23.7 | ○ | ○ |
| | 161 | X-11 | Y-2 | Z-1 | 23.2 | 24.0 | ⊙ | ⊙ |
| | 162 | X-12 | Y-2 | Z-1 | 24.8 | 26.1 | ⊙ | ⊙ |
| | 163 | X-13 | Y-2 | Z-1 | 25.1 | 22.8 | ○ | ○ |

TABLE 5-continued

|  |  | Water-based paint composition | Water-based base coat paint | Clear-paint | smoothness | distinctness of image | water resistance | chipping resistance |
|---|---|---|---|---|---|---|---|---|
|  | 164 | X-14 | Y-2 | Z-1 | 23.9 | 24.1 | ○ | ○ |
|  | 165 | X-15 | Y-2 | Z-1 | 25.2 | 25.9 | ⊙ | ⊙ |
|  | 166 | X-16 | Y-2 | Z-1 | 20.3 | 22.2 | ⊙ | ⊙ |
|  | 167 | X-17 | Y-2 | Z-1 | 18.2 | 19.9 | ⊙ | ⊙ |
|  | 168 | X-18 | Y-2 | Z-1 | 20.9 | 22.3 | ⊙ | ⊙ |
|  | 169 | X-19 | Y-2 | Z-1 | 22.8 | 23.2 | ○ | ⊙ |
|  | 170 | X-20 | Y-2 | Z-1 | 23.1 | 21.9 | ○ | ○ |
|  | 171 | X-21 | Y-2 | Z-1 | 21.2 | 22.7 | ⊙ | ○ |
|  | 172 | X-22 | Y-2 | Z-1 | 22.0 | 23.9 | ○ | ⊙ |
|  | 173 | X-23 | Y-2 | Z-1 | 20.9 | 21.8 | ⊙ | ⊙ |
|  | 174 | X-24 | Y-2 | Z-1 | 19.0 | 21.1 | ⊙ | ○ |
|  | 175 | X-25 | Y-2 | Z-1 | 23.3 | 24.2 | ○ | ○ |
|  | 176 | X-26 | Y-2 | Z-1 | 20.8 | 21.1 | ⊙ | ⊙ |
|  | 177 | X-27 | Y-2 | Z-1 | 20.9 | 22.1 | ○ | ⊙ |
|  | 178 | X-28 | Y-2 | Z-1 | 22.1 | 22.2 | ○ | ○ |
|  | 179 | X-29 | Y-2 | Z-1 | 22.3 | 22.3 | ○ | ○ |
|  | 180 | X-30 | Y-2 | Z-1 | 20.9 | 21.2 | ⊙ | ⊙ |
|  | 181 | X-31 | Y-2 | Z-1 | 21.9 | 22.8 | ⊙ | ⊙ |
|  | 182 | X-32 | Y-2 | Z-1 | 21.2 | 24.1 | ○ | ○ |
|  | 183 | X-33 | Y-2 | Z-1 | 24.8 | 25.0 | ○ | ○ |
|  | 184 | X-34 | Y-2 | Z-1 | 18.0 | 18.9 | ⊙ | ⊙ |
|  | 185 | X-35 | Y-2 | Z-1 | 21.3 | 20.8 | ⊙ | ○ |
|  | 186 | X-36 | Y-2 | Z-1 | 22.2 | 22.0 | ⊙ | ⊙ |
|  | 187 | X-37 | Y-2 | Z-1 | 23.2 | 23.9 | ⊙ | ⊙ |
|  | 188 | X-6 | Y-3 | Z-1 | 20.4 | 22.3 | ⊙ | ⊙ |
|  | 189 | X-38 | Y-2 | Z-1 | 27.9 | 27.1 | ○ | ⊙ |
|  | 190 | X-39 | Y-2 | Z-1 | 21.9 | 24.3 | ○ | ○ |
|  | 191 | X-40 | Y-2 | Z-1 | 29.5 | 28.9 | ○ | ○ |
|  | 192 | X-41 | Y-2 | Z-1 | 28.7 | 28.1 | ○ | ○ |
|  | 193 | X-42 | Y-2 | Z-1 | 25.5 | 24.3 | ⊙ | ⊙ |
|  | 194 | X-43 | Y-2 | Z-1 | 20.9 | 22.3 | ⊙ | ⊙ |
|  | 195 | X-44 | Y-2 | Z-1 | 22.1 | 22.5 | ○ | ○ |
|  | 196 | X-45 | Y-2 | Z-1 | 23.1 | 22.3 | ○ | ⊙ |
|  | 197 | X-46 | Y-2 | Z-1 | 25.2 | 23.9 | ○ | ○ |
|  | 198 | X-47 | Y-2 | Z-1 | 21.9 | 24.1 | ⊙ | ○ |
|  | 199 | X-48 | Y-2 | Z-1 | 24.1 | 24.7 | ⊙ | ⊙ |
|  | 200 | X-49 | Y-2 | Z-1 | 25.3 | 26.9 | ⊙ | ⊙ |
|  | 201 | X-50 | Y-2 | Z-1 | 25.9 | 23.3 | ○ | ○ |
|  | 202 | X-51 | Y-2 | Z-1 | 22.5 | 24.9 | ⊙ | ⊙ |
|  | 203 | X-52 | Y-2 | Z-1 | 22.1 | 23.5 | ⊙ | ⊙ |
|  | 204 | X-53 | Y-2 | Z-1 | 24.2 | 25.1 | ⊙ | ⊙ |
|  | 205 | X-54 | Y-2 | Z-1 | 19.1 | 20.5 | ⊙ | ⊙ |
|  | 206 | X-55 | Y-2 | Z-1 | 21.5 | 23.3 | ⊙ | ⊙ |
|  | 207 | X-56 | Y-2 | Z-1 | 23.3 | 24.1 | ○ | ⊙ |
|  | 208 | X-57 | Y-2 | Z-1 | 23.9 | 22.5 | ○ | ⊙ |
|  | 209 | X-58 | Y-2 | Z-1 | 22.1 | 23.2 | ⊙ | ○ |
|  | 210 | X-59 | Y-2 | Z-1 | 22.7 | 24.5 | ○ | ⊙ |
|  | 211 | X-60 | Y-2 | Z-1 | 21.5 | 22.3 | ⊙ | ⊙ |
|  | 212 | X-61 | Y-2 | Z-1 | 19.7 | 21.9 | ⊙ | ○ |
|  | 213 | X-62 | Y-2 | Z-1 | 24.3 | 25.1 | ○ | ○ |
|  | 214 | X-63 | Y-2 | Z-1 | 21.4 | 21.9 | ⊙ | ⊙ |
|  | 215 | X-64 | Y-2 | Z-1 | 21.4 | 22.8 | ○ | ⊙ |
|  | 216 | X-65 | Y-2 | Z-1 | 22.9 | 22.8 | ○ | ○ |
|  | 217 | X-66 | Y-2 | Z-1 | 23.2 | 23.0 | ○ | ○ |
|  | 218 | X-67 | Y-2 | Z-1 | 21.6 | 21.8 | ⊙ | ⊙ |
|  | 219 | X-68 | Y-2 | Z-1 | 22.5 | 23.3 | ⊙ | ⊙ |
|  | 220 | X-69 | Y-2 | Z-1 | 22.1 | 24.9 | ○ | ○ |
|  | 221 | X-70 | Y-2 | Z-1 | 25.3 | 25.7 | ○ | ○ |
|  | 222 | X-71 | Y-2 | Z-1 | 19.6 | 21.6 | ⊙ | ⊙ |
|  | 223 | X-72 | Y-2 | Z-1 | 19.7 | 21.5 | ⊙ | ⊙ |
|  | 224 | X-73 | Y-2 | Z-1 | 22.2 | 21.3 | ⊙ | ○ |
|  | 225 | X-74 | Y-2 | Z-1 | 23.1 | 22.7 | ⊙ | ⊙ |
|  | 226 | X-75 | Y-3 | Z-1 | 24.1 | 24.5 | ⊙ | ⊙ |
|  | 227 | X-43 | Y-3 | Z-1 | 21.1 | 22.4 | ⊙ | ⊙ |
| Comparative Example | 17 | X-76 | Y-2 | Z-1 | 39.9 | 39.2 | ○ | ○ |
|  | 18 | X-77 | Y-2 | Z-1 | 33.1 | 32.2 | Δ | ○ |
|  | 19 | X-78 | Y-2 | Z-1 | 38.2 | 32.3 | Δ | Δ |
|  | 20 | X-79 | Y-2 | Z-1 | 33.9 | 33.1 | Δ | ○ |
|  | 21 | X-80 | Y-2 | Z-1 | 39.1 | 33.1 | Δ | Δ |
|  | 22 | X-81 | Y-2 | Z-1 | 34.8 | 33.7 | ○ | Δ |
|  | 23 | X-82 | Y-2 | Z-1 | 31.9 | 31.2 | ○ | Δ |
|  | 24 | X-83 | Y-2 | Z-1 | 33.0 | 33.9 | Δ | ○ |

The invention claimed is:

1. A water-based paint composition, comprising
(A) an aqueous film-forming resin,
(B) a curing agent, and
(C) crosslinked resin particles (C1) or crosslinked resin particles (C2),
wherein the crosslinked resin particles (C1) have a core/shell multilayer structure composed of a core part of a (co)polymer (I) having a glass transition temperature ($Tg_1$) within a range of from −65° C. to -20° C. and obtained by (co)polymerizing a monomer component comprising 30-100 mass % of a polymerizable unsaturated monomer (c-1) having a $C_{6-18}$ alkyl group and 0-70 mass % of another polymerizable unsaturated monomer (c-2), and a shell part having a crosslinked structure of a copolymer (II) having a glass transition temperature ($Tg_1$) within a range of from −50° C. to 110° C. and obtained by copolymerizing a monomer component consisting of 0.1-40 mass % of a polymerizable unsaturated monomer (c-3) having at least two polymerizable unsaturated groups per molecule and 60-99.9 mass % of a polymerizable unsaturated monomer (c-4) having one polymerizable unsaturated group per molecule,
wherein the polymerizable unsaturated monomer (c-4) contains 1-60 mass % of a hydroxyl-containing polymerizable unsaturated monomer, based on the total amount of the polymerizable unsaturated monomers (c-3) and (c-4), and
wherein the crosslinked resin particles (C2) have a core/shell multilayer structure formed of the core part of the (co)polymer (I), and a shell part having a crosslinked structure of a (co)polymer (III) having a glass transition temperature ($Tg_1$) within a range of −50° C. to 110° C. and obtained by (co)polymerizing a monomer component consisting of 0.1-60 mass % of a functional group-containing polymerizable unsaturated monomer (c-5), 0-60 mass % of a polymerizable unsaturated monomer (c-6) having a functional group complementally reactable with the functional group in the polymerizable unsaturated monomer (c-5), 0-99.9 mass % of another polymerizable unsaturated monomer (c-7), and 1-60 mass % of a hydroxyl-containing polymerizable unsaturated monomer, based on the total amount of the polymerizable unsaturated monomers (c-5), (c-6), and (c-7).

2. The water-based paint composition according to claim 1, wherein the aqueous film-forming resin (A) is selected from the group consisting of a hydroxyl-containing polyester resin (A1) and a hydroxyl-containing acrylic resin (A2).

3. The water-based paint composition according to claim 1, wherein the polymerizable unsaturated monomer (c-4) further contains 20-99.9 mass % of a $C_1$ or $C_2$ alkyl group-containing polymerizable unsaturated monomer, based on the total amount of the polymerizable unsaturated monomers (c-3) and (c-4); and the other polymerizable unsaturated monomer (c-7) contains 20-99.9 mass % of a $C_1$ or $C_2$ alkyl group-containing polymerizable unsaturated monomer, based on the total amount of the polymerizable unsaturated monomers (c-5), (c-6) and (c-7).

4. The water-based paint composition according to claim 1, wherein the crosslinked resin particles (C1) contain the (co)polymer (I) and the copolymer (II) at a ratio within a range of 5/95-95/5 in terms of a solid mass of (co)polymer (I)/a solid mass of copolymer (II), and wherein the crosslinked resin particles (C2) contain the (co)polymer (I) and the (co)polymer (III) at a ratio within a range of 5/95-95/5 in terms of a solid mass of (co)polymer (I)/a solid mass of (co)polymer (III).

5. The water-based paint composition according to claim 1, wherein the crosslinked resin particles (C1) and the crosslinked resin particles (C2) each have an average particle size within a range of 0.01-5 μm.

6. The water-based paint composition according to claim 1, which comprises, per 100 mass parts in total of the aqueous film-forming resin (A) and curing agent (B), 30-95 mass parts of the aqueous film-forming resin (A), 5-70 mass parts of the curing agent (B) and 1-100 mass parts of the crosslinked resin particles (C1) or the crosslinked resin particles (C2).

7. An article coated with the water-based paint composition according to claim 1.

8. A method of forming a multilayer coating film, which comprises:
(1) a step of applying the water-based paint composition according to claim 1 onto a coating object to form an uncured intermediate coating film,
(2) a step of applying onto the formed uncured intermediate coating film of step (1) a water-based top coat paint to form an uncured top coating film, and
(3) a step of simultaneously heat-curing the uncured intermediate coating film and uncured top coating film of step (2) to form the multilayer coating film.

9. A method of forming a multilayer coating film, which comprises:
(1) a step of applying the water-based paint composition according to claim 1 onto a coating object to form an uncured intermediate coating film,
(2) a step of applying onto the formed uncured intermediate coating film of step (1) a water-based base coat paint composition to form an uncured base coating film,
(3) a step of applying onto the formed uncured base coating film of step (2) a clear paint composition to form an uncured clear coating film, and
(4) a step of simultaneously heat-curing the uncured intermediate coating film, uncured base coating film and uncured clear coating film of step (3) to form the multilayer coating film.

10. An article comprising a multilayer coating film coated by the method according to claim 8.

11. A water-based paint composition, which comprises:
(A) an aqueous film-forming resin,
(B) a curing agent, and
(C) crosslinked resin particles (C) are:
(i) crosslinked resin particles having a core/shell multilayer structure composed of a core part comprising a (co)polymer (I) having a glass transition temperature ($Tg_1$) within a range of from −65° C. to −20° C. and a shell part comprising a copolymer (II) having a glass transition temperature ($Tg_1$) within a range of from −50° C. to 110° C., wherein the (co)polymer (I) and copolymer (II) are obtained by emulsion polymerizing a monomer mixture containing 30-100 mass % of a polymerizable unsaturated monomer (c-1) having a $C_{6-18}$ alkyl group and 0-70 mass % of another polymerizable unsaturated monomer (c-2) to obtain an emulsion, adding to the obtained emulsion containing the (co)polymer (I) a monomer mixture of 0.1-40 mass % of a polymerizable unsaturated monomer (c-3) having at least two polymerizable unsaturated groups per molecule and 60-99.9 mass % of a polymerizable unsaturated monomer (c-4) having one polymerizable unsaturated group per molecule, wherein the polymerizable unsaturated monomer (c-4) contains 1-60 mass % of a hydroxyl-containing polymerizable unsaturated monomer, based on the total amount of the polymerizable unsaturated monomers (c-3) and (c-4), and then forming the copolymer (II) by further emulsion polymerization, wherein a solid mass ratio of the (co)polymer (I)/copolymer (II) is within a range of 5/95-95/5; or (ii) crosslinked resin particles having a core/shell multilayer structure composed of a core part comprising the (co)polymer (I) and a shell part comprising a (co)polymer (III) having a glass transition temperature ($Tg_1$) within a range of −50° C. to 110° C., wherein the (co)polymer (I) and (co)polymer (III) are obtained by emulsion polymerizing a monomer mixture containing 30-100 mass % of the polymerizable unsaturated monomer (c-1) having the $C_{6-18}$ alkyl group and 0-70 mass % of the other polymerizable unsaturated monomer (c-2) to obtain the emulsion, adding to the obtained emulsion containing the (co) polymer (I) a monomer mixture of 0.1-60 mass % of a functional group-containing monomer (c-5), 0-60 mass % of a polymerizable unsaturated monomer (c-6) having a functional group complementally reactable with the functional group in the polymerizable unsaturated monomer (c-5) 0-99.9 mass % of another polymerizable unsaturated monomer (c-7) and 1-60 mass % of a hydroxyl-containing polymerizable unsaturated monomer, based on the total amount of the polymerizable unsaturated monomers (c-5), (c-6), and (c-7), and then forming the (co)polymer (III) by further emulsion polymerization, wherein a solid mass ratio of the (co)polymer (I)/copolymer (III) is within a range of 5/95-95/5.

12. An article comprising a multilayer coating film coated by the method according to claim 9.

* * * * *